US009858054B2

United States Patent
Koju et al.

(10) Patent No.: US 9,858,054 B2
(45) Date of Patent: *Jan. 2, 2018

(54) METHOD FOR OPTIMIZING BINARY CODE IN LANGUAGE HAVING ACCESS TO BINARY CODED DECIMAL VARIABLE, AND COMPUTER AND COMPUTER PROGRAM

(71) Applicant: INTERNATIONAL BUSINESS MACHINES CORPORATION, Armonk, NY (US)

(72) Inventors: Toshihiko Koju, Chiba (JP); Ali I Sheikh, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/016,510

(22) Filed: Feb. 5, 2016

(65) Prior Publication Data
US 2016/0154635 A1 Jun. 2, 2016

Related U.S. Application Data

(63) Continuation of application No. 14/248,500, filed on Apr. 9, 2014, now Pat. No. 9,280,328.

(30) Foreign Application Priority Data

Apr. 17, 2013 (JP) ................................. 2013-086606

(51) Int. Cl.
G06F 9/45 (2006.01)
(52) U.S. Cl.
CPC ............ *G06F 8/443* (2013.01); *G06F 8/4441* (2013.01)

(58) Field of Classification Search
CPC .................................. G06F 8/443; G06F 8/447
(Continued)

(56) References Cited

U.S. PATENT DOCUMENTS 6,611,956 B1 * 8/2003 Ogawa .................... G06F 8/443
717/152

FOREIGN PATENT DOCUMENTS

JP 05324313 A * 12/1993
JP 2000132404 A 5/2000
(Continued)

*Primary Examiner* — Hang Pan
*Assistant Examiner* — Hui-Wen Lin
(74) *Attorney, Agent, or Firm* — Rabin Bhattacharya

(57) ABSTRACT

A method for optimizing binary code in a language having access to binary coded decimal variable. The method includes: generating a first compiler expression of the binary code; analyzing a use-definition and/or a definition-use for the first compiler expression; generating a second compiler expression by identifying logical binary coded decimal (BCD) variables in the first compiler expression; assigning temporary variables to the logical BCD variables, wherein the second compiler expression includes packed decimal operations and the assigned temporary variables; and converting a packed decimal operation in the second compiler expression and an assigned temporary variable to a decimal floating point (DFP) if sign information and precision information are not lost during conversion from BCD to DFP, wherein identifying logical BCD variables includes: in the use-definition and/or definition-use of operands, regarding an operand of definition and an operand of use as the same logical BCD variables.

18 Claims, 31 Drawing Sheets

(58) Field of Classification Search
USPC .......................................................... 717/151
See application file for complete search history.

(56) References Cited

FOREIGN PATENT DOCUMENTS

| | | | |
|---|---|---|---|
| JP | 2001034482 A | | 2/2001 |
| JP | 2001236235 A | | 8/2001 |
| JP | 2002342089 A | * | 11/2002 |
| JP | 2004295398 A | | 10/2004 |
| JP | 2012248139 A | | 12/2012 |

* cited by examiner

ORIGINAL BINARY CODE    601

1  AP    307(13,R13),324(12,R13)
2  NI    311(R13),0xf
3  UNPK  80(16,R3),311(9,R13)
4  CVD   R4,312(R13)
5  MVC   304(8,R13),18(R12)
6  SRP   314(6,R13),2,0
7  AP    311(9,R13),336(9,R13)

⇧ 611

COMPILER EXPRESSION OF
BINARY CODE                  602
(FIRST COMPILER EXPRESSION)

1  packed_add          307(13,R13),324(12,R13)
2  byte_and            311(R13),0xf
3  packed_to_zoned     80(16,R3),311(9,R13)
4  int_to_packed       R4,312(R13)
5  memory_copy         304(8,R13),18(R12)
6  packed_shift_left   314(6,R13),2,0
7  packed_add          311(9,R13),336(9,R13)

⇧ 612

COMPILER EXPRESSION AFTER IDENTIFYING LOGICAL BCD
VARIABLE AND ASSIGNING TEMPORARY VARIABLE TO
THE IDENTIFIED LOGICAL BCD VARIABLE          603
(SECOND COMPILER EXPRESSION)

1  packed_add          TMP1,TMP2
2  packed_truncate     TMP1,16digits
3  packed_to_zoned     80(16,R3),TMP1
4  int_to_packed       R4,TMP3
5  packed_shift_left   TMP3,2
6  packed_add          TMP3,TMP4

⇧ 613

CONVERSION OF TYPE OF PACKED DECIMAL       604
OPERATION AND TYPE OF TEMPORARY VARIABLE
TO DFP TYPE
(THIRD COMPILER EXPRESSION)

1  dfp_add          FPR1,FPR2
2  dfp_truncate     FPR1,16digits
3  dfp_to_zoned     80(16,R3),FPR1
4  int_to_dfp       R4,FPR3
5  dfp_shift_left   FPR3,2
6  dfp_truncate     FPR3,11digits
7  dfp_add          FPR3,FPR4

⇧ 614

OPTIMIZED MACHINE CODE       605

1  AXTR   FPR1,FPR1,FPR2
2  SLXT   FPR1,FPR1,18
3  SRXT   FPR1,FPR1,18
4  CZXT   80(16,R3),FPR1
5  CXGTR  FRP3,R4
6  SLXT   FPR3,FPR3,2
7  SLXT   FPR3,FPR3,23
8  SRXT   FPR3,FPR3,23
9  AXTR   FPR3,FPR3,FPR4

FIG. 6A

- CONVERSION FROM MINUS ZERO (minus zero) TO PLUS ZERO (plus zero)
  -- LOAD CONSTANT VALUE ZERO TO TMP0
  -- AXTR FPR, FPR, TMP0# ADDITION

- DIGIT TRUNCATION (truncate)
  -- N=7 (FOR SINGLE-PRECISION REGISTER), 16 (FOR DOUBLE-PRECISION REGISTER), 34 (FOR EXTENDED PRECISION REGISTER)
  -- SLXT FPR, FPR, (N-PRECISION)# SHIFT MANTISSA TO LEFT (CHARACTERISTIC DOES NOT CHANGE)
  -- SRXT FPR, FPR, (N-PRECISION)# SHIFT MANTISSA TO RIGHT (CHARACTERISTIC DOES NOT CHANGE)

- SHIFT TO RIGHT AND ROUND (Rounded shift right)
  -- LOAD CONSTANT VALUE "ROUNDED VALUE*(10^(THE NUMBER OF DIGITS TO BE SHIFTED-1)) TO TMP0
  -- CPSDR TMP0, FPR, TMP0# COPY SIGN
  -- AXTR FPR, FPR, TMP0# ADDITION
  -- SRXT FPR, FPR, SHIFT# SHIFT MANTISSA TO RIGHT

ORIGINAL BINARY CODE 701

```
1  PACK  32(7,R13),112(4,R3)
2  PACK  38(8,R13),115(15,R3)
3  CVD   R4,8(R13)
4  MVC   0(8,R13),18(R12)
5  SRP   10(6,R13),2,0
6  AP    7(9,R13),36(10,R13)
7  NI    7(R13),0xf
8  UNPK  96(16,R3),7(9,R13)
```

↑ 711

COMPILER EXPRESSION OF 702
BINARY CODE
(FIRST COMPILER EXPRESSION)

```
1  zoned_to_packed      32(7,R13),112(4,R3)
2  zoned_to_packed      38(8,R13),115(15,R3)
3  int_to_packed        R4,8(8,R13)
4  memory_copy          0(8,R13),18(R12)
5  packed_shift_left    10(6,R13),2
6  packed_add           7(9,R13),36(10,R13)
7  byte_and             7(R13),0xf
8  packed_to_zoned      96(16,R3),7(9,R13)
```

↑ 712

COMPILER EXPRESSION AFTER COMBINATION OF 703
TWO BCD OPERATIONS INTO ONE BCD OPERATION

```
1  zoned_to_packed      32(14,R13),112(18,R2)
2  int_to_packed        R4,8(8,R13)
3  memory_copy          0(8,R13),18(R12)
4  packed_shift_left    10(6,R13),2
5  packed_add           7(9,R13),36(10,R13)
6  byte_and             7(R13),0xf
7  packed_to_zoned      96(16,R3),7(9,R13)
```

↑ 713

COMPILER EXPRESSION AFTER 704
CONVERSION OF NON-BCD OPERATION TO BCD
OPERATION

```
1  zoned_to_packed      32(14,R13),112(18,R2)
2  int_to_packed        R4,8(8,R13)
3  memory_copy          0(8,R13),18(R12)
4  packed_shift_left    10(6,R13),2
5  packed_add           7(9,R13),36(10,R13)
6  packed_truncate      7(9,R13),16digits
7  packed_to_zoned      96(16,R3),7(9,R13)
```

↑ 714

COMPILER EXPRESSION SHOWN AT STEP 404 AND 705
INFORMATION OBTAINED BY ANALYZING THE NUMBER OF
ZERO DIGITS FROM LEFT-END DIGIT OF EACH OPERAND
IN THE COMPILER EXPRESSION

```
1  zoned_to_packed      32(14,R13),112(18,R2)
   # 8(R13) == 0 && 9(R13) == 0
2  int_to_packed        R4,8(8,R13)
   # 18(R12) is an array of zeros
3  memory_copy          0(8,R13),18(R12)
4  packed_shift_left    10(6,R13),2
5  packed_add           7(9,R13),36(10,R13)
6  packed_truncate      7(9,R13),16digits
7  packed_to_zoned      96(16,R3),7(9,R13)
```

↑ 715

COMPILER EXPRESSION AFTER IDENTIFYING LOGICAL 706
BCD VARIABLE AND REASSIGNING TEMPORARY
VARIABLE TO THE IDENTIFIED LOGICAL BCD VARIABLE
(SECOND COMPILER EXPRESSION)

```
1  zoned_to_packed_27   TMP1,112(18,R2)
2  int_to_packed_15     R4,TMP2
3  packed_truncate_11   TMP2,11digits
4  packed_shift_left_11 TMP2,2
5  packed_truncate_19   TMP1,19digits
6  packed_add_17        TMP2,TMP1
7  packed_truncate_16   TMP2,16digits
8  packed_to_zoned_16   96(16,R3),TMP2
```

↑ 716

CONVERSION OF TYPE OF PACKED DECIMAL OPERATION 707
AND TYPE OF TEMPORARY VARIABLE TO DFP TYPE
(THIRD COMPILER EXPRESSION)

```
1   zoned_to_dfp      VFPR1,112(18,R2)
2   int_to_dfp        R4,VFPR2
3   dfp_truncate      VFPR2,11digits
4   dfp_shift_left    VFPR2,2
5   dfp_truncate      VFPR2,11digits
6   dfp_truncate      VFPR1,19digits
7   dfp_add           VFPR2,VFPR1
8   dfp_truncate      VFPR2,17digits
9   dfp_truncate      VFPR2,16digits
10  dfp_to_zoned      VFPR2,96(16,R3)
```

717

OPTIMIZATION BY OPTIMIZATION TECHNIQUE 708
OTHER THAN EMBODIMENT OF PRESENT INVENTION
(JUDGMENT OF DELETABLE OR COMBINABLE OPERATION)

```
1   zoned_to_dfp      VFPR1,112(18,R2)
2   int_to_dfp        R4,VFPR2
3   dfp_truncate      VFPR2,11digits : can be omitted since int_to_dfp <= 11 digits
4   dfp_shift_left    VFPR2,2
5   dfp_truncate      VFPR2,11digits
6   dfp_truncate      VFPR1,19digits ; can be combined to the 1st zoned_to_dfp
7   dfp_add           VFPR2,VFPR1
8   dfp_truncate      VFPR2,17digits : can be combined to the last dfp_to_zoned
9   dfp_truncate      VFPR2,16digits : can be combined to the last dfp_to_zoned
10  dfp_to_zoned      VFPR2,96(16,R3)
```

718

COMPILER EXPRESSION AFTER OPTIMIZATION BY 709
OPTIMIZATION TECHNIQUE OTHER THAN EMBODIMENT OF
PRESENT INVENTION

```
1   zoned_to_dfp      VFPR1,112(18,R2)
2   int_to_dfp        R4,VFPR2
3   dfp_shift_left    VFPR2,2
4   dfp_truncate      VFPR2,11digits
5   dfp_add           VFPR2,VFPR1
6   dfp_to_zoned      VFPR2,96(16,R3)
```

OPTIMIZED MACHINE CODE 710

```
1   CXZT    FPR1,112(18,R2)
2   CXGTR   FPR2,R4
3   SLXT    FPR2,FPR2,2
4   SLXT    FPR2,FPR2,(34-11)
5   SRXT    FPR2,FPR2,(34-11)
6   AXTR    FPR2,FPR2,FPR1
7   CZXT    FPR2,96(16,R3)
```

1. ADVANCE-CONVERSION PROCESS (COMBINATION OF TWO BCD OPERATIONS INTO ONE BCD OPERATION)

(1) COMBINATION OF TWO zoned_to_packeds INTO ONE zoned_to_packed

ORIGINAL BINARY CODE  801   COMPILER EXPRESSION OF BINARY CODE  802   COMPILER EXPRESSION AFTER COMBINATION OF  803
                            (FIRST COMPILER EXPRESSION)               TWO BCD OPERATIONS INTO ONE BCD OPERATION

PACK 32(7,R13),112(4,R3)    zoned_to_packed 32(7,R13),112(4,R3)   ⇨   zoned_to_packed 32(14,R13),112(18,R3)
PACK 38(8,R13),115(15,R3)   zoned_to_packed 38(8,R13),115(15,R3)

ORIGINAL BINARY CODE  811   COMPILER EXPRESSION OF BINARY CODE  812   COMPILER EXPRESSION AFTER COMBINATION OF  813
                            (FIRST COMPILER EXPRESSION)               TWO BCD OPERATIONS INTO ONE BCD OPERATION

PACK 368(7,R13),800(4,R2)   zoned_to_packed 368(7,R13),800(4,R2)  ⇨   zoned_to_packed 368(14,R13),800(18,R2)
PACK 374(8,R13),803(15,R2)  zoned_to_packed 374(8,R13),803(15,R2)

(2) COMBINATION OF TWO packed_to_zoneds INTO ONE packed_to_zoned

ORIGINAL BINARY CODE  821   COMPILER EXPRESSION OF BINARY CODE  822   COMPILER EXPRESSION AFTER COMBINATION OF  823
                            (FIRST COMPILER EXPRESSION)               TWO BCD OPERATIONS INTO ONE BCD OPERATION

UNPK 836(4,R2),368(3,R13)   packed_to_zoned 836(4,R2),368(3,R13)  ⇨   packed_to_zoned 836(18,R2),368(10,R13)
UNPK 839(15,R2),370(8,R13)  packed_to_zoned 839(15,R2),370(8,R13)

2. ADVANCE-CONVERSION PROCESS (CONVERTING NON-BCD OPERATION TO BCD OPERATION)

(1) CONVERSION OF byte_or TO packed_set_sign OR zoned_set_sign

| ORIGINAL BINARY CODE | 901 | COMPILER EXPRESSION OF BINARY CODE (FIRST COMPILER EXPRESSION) | 902 | ⇨ | COMPILER EXPRESSION AFTER CONVERSION OF 903 NON-BCD OPERATION TO BCD OPERATION |

PACK 376(6,R13),2(10,R2)
OI   381(R13),0xf

COMPILER EXPRESSION OF BINARY CODE (FIRST COMPILER EXPRESSION):
zoned_to_packed 376(6,R13),2(10,R2)
byte_or         381(R13),0xf COMPILER EXPRESSION AFTER CONVERSION OF 903:
zoned_to_packed  376(6,R13),2(10,R2)
packed_set_sign  376(6,R13),0xf

ORIGINAL BINARY CODE  911

UNPK 32(10,R2),339(6,R13)
OI   41(R2),0xf0

COMPILER EXPRESSION OF BINARY CODE (FIRST COMPILER EXPRESSION) 912:
packed_to_zoned 32(10,R2),339(6,R13)
byte_or         41(R2),0xf0

COMPILER EXPRESSION AFTER CONVERSION OF 913:
packed_to_zoned 32(10,R2),339(6,R13)
zoned_set_sign  32(10,R2),0xf (2) CONVERSION OF byte_and TO packed_truncate

ORIGINAL BINARY CODE 921

AP 307(13,R13),324(12,R13)
NI 311(R13),0xf

COMPILER EXPRESSION OF BINARY CODE (FIRST COMPILER EXPRESSION) 922:
packed_add     307(13,R13),324(12,R13)
byte_and       311(R13),0xf COMPILER EXPRESSION AFTER CONVERSION OF 923:
packed_add      307(13,R13),324(12,R13)
packed_truncate 311(9,R13),16digits

ORIGINAL BINARY CODE 931

AP 7(9,R13),36(10,R13)
NI 7(R13),0xf

COMPILER EXPRESSION OF BINARY CODE (FIRST COMPILER EXPRESSION) 932:
packed_add     7(9,R13),36(10,R13)
byte_and       7(R13),0xf COMPILER EXPRESSION AFTER CONVERSION OF 933:
packed_add      7(9,R13),36(10,R13)
packed_truncate 7(9,R13),16digits

FIG. 9A (3) CONVERSION OF memory_cmp TO packed_cmp

ORIGINAL BINARY CODE  941

1  PACK  264(3,R13),64(5,R2)
2  OI    266(R13),0xf
3  PACK  272(3,R13),8(5,R2)
4  OI    274(R13),0xf
5  CLC   264(3,R13),272(R13)

⇨

COMPILER EXPRESSION OF BINARY CODE  942
(FIRST COMPILER EXPRESSION)

1  zoned_to_packed  264(3,R13),64(5,R2)
2  byte_or          266(R13),0xf
3  zoned_to_packed  272(3,R13),8(5,R2)
4  byte_or          274(R13),0xf
5  memory_cmp       264(3,R13),272(R13)

COMPILER EXPRESSION AFTER CONVERSION  943
OF NON-BCD OPERATION TO BCD OPERATION
(DURING CONVERSION)

1  zoned_to_packed   264(3,R13),64(5,R2)
2  packed_set_sign   264(3,R13),0xf
3  zoned_to_packed   272(3,R13),8(5,R2)
4  packed_set_sign   272(3,R13),0xf
5  memory_cmp        264(3,R13),272(R13)

⇨

COMPILER EXPRESSION AFTER CONVERSION  944
OF NON-BCD OPERATION TO BCD OPERATION 1  zoned_to_packed   264(3,R13),64(5,R2)
2  packed_set_sign   264(3,R13),0xf
3  zoned_to_packed   272(3,R13),8(5,R2)
4  packed_set_sign   272(3,R13),0xf
5  packed_cmp        264(3,R13),272(3,R13)

(4) CONVERSION OF memory_copy TO packed_copy

ORIGINAL BINARY CODE  951

MP   308(12,R13),336(6,R13)
MVC  336(13,R13),307(R13)

⇨

COMPILER EXPRESSION OF BINARY CODE  952
(FIRST COMPILER EXPRESSION)

packed_mul    308(12,R13),336(6,R13)
memory_copy   336(13,R13),307(R13)

⇨

COMPILER EXPRESSION AFTER CONVERSION  953
OF NON-BCD OPERATION TO BCD OPERATION packed_mul    308(12,R13),336(6,R13)
packed_copy   336(13,R13),307(13,R13)

NOTE: 307(R13)==0 IS ASSUMED

FIG. 9B

3. ADVANCE-CONVERSION PROCESS (ANALYSIS OF THE NUMBER OF ZERO DIGITS FROM LEFT-END DIGIT OF EACH OPERAND)

(1) IT IS ANALYZED THAT left_zero_len=packed_len−(zoned_len+2)/2 IS SATISFIED WHEN OPERATION IS zoned_to_packed ORIGINAL BINARY CODE   1001   COMPILER EXPRESSION OF BINARY CODE   1002   INFORMATION OBTAINED BY ANALYZING THE   1003
                              (FIRST COMPILER EXPRESSION)                 NUMBER OF ZERO DIGITS FROM LEFT-END DIGIT OF
                                                                          OPERAND PACK 304(16,R13),2(10,R2)   ⇨   zoned_to_packed 304(16,R13),2(10,R2)   ⇨   left_zero_len = 16 − (10 + 2) / 2 = 10

(2) IT IS ANALYZED THAT left_zero_len=left_zero_len_of_prev_def IS SATISFIED WHEN OPERATION IS packed_set_sign ORIGINAL BINARY CODE   1011   COMPILER EXPRESSION OF BINARY CODE   1012   INFORMATION OBTAINED BY ANALYZING THE   1013
                              (FIRST COMPILER EXPRESSION)                 NUMBER OF ZERO DIGITS FROM LEFT-END DIGIT OF
                                                                          OPERAND PACK 304(16,R13),2(10,R2)   ⇨   zoned_to_packed 304(16,R13),2(10,R2)   ⇨   left_zero_len = 10
OI   319(R13),0xf               packed_set_sign 304(16,R13),0xf (3) IT IS ANALYZED THAT left_zero_len=packed_len−6 IS SATISFIED WHEN OPERATION IS int_to_packed
(FROM −2147483648 TO +2147483647: FITTABLE WITHIN 6 BYTES)

ORIGINAL BINARY CODE   1021   COMPILER EXPRESSION OF BINARY CODE   1022   INFORMATION OBTAINED BY ANALYZING THE   1023
                              (FIRST COMPILER EXPRESSION)                 NUMBER OF ZERO DIGITS FROM LEFT-END DIGIT OF
                                                                          OPERAND

CVD R4,312(R13)   ⇨   int_to_packed R4,312(8,R13)   ⇨   left_zero_len = 8 − 6 = 2

(4) IT IS ANALYZED THAT left_zero_len=copy_length 6 SATISFIED WHEN OPERATION IS memory_copy FROM ARRAY OF CONSTANT ZEROS IN LITERAL POOL ORIGINAL BINARY CODE   1031   COMPILER EXPRESSION OF BINARY CODE   1032   INFORMATION OBTAINED BY ANALYZING THE   1033
                              (FIRST COMPILER EXPRESSION)                 NUMBER OF ZERO DIGITS FROM LEFT-END DIGIT OF
                                                                          OPERAND MVC 304(8,R13),18(R12)   ⇨   memory_copy 304(8,R13),18(R12)   ⇨   left_zero_len = 8

NOTE: 18(R12) IS ASSUMED TO BE ARRAY OF CONSTANT ZEROS IN LITERAL POOL

FIG. 10

CONDITIONS FOR REGARDING OPERAND OF DEFINITION (def) AND OPERAND OF USE (use) AS THE SAME LOGICAL BCD VARIABLES:

(1) WITH REGARD TO USE-DEFINITION CHAIN OF OPERAND IN FIRST COMPILER EXPRESSION
- SIZE OF OPERAND OF USE (use) (sizeof(use)) AND SIZE OF OPERAND OF DEFINITION (def) (sizeof(def)) ARE THE SAME (sizeof(def)==size of(use));
- RIGHT-END ADDRESSES OF OPERANDS OF USE (use) AND DEFINITION (def) ARE THE SAME (right aligned); AND
- TYPES OF OPERANDS OF USE (use) AND DEFINITION (def) ARE THE SAME BCD TYPE

```
                                              1101
1   zoned_to_packed      32(14,R13),112(18,R2)
    # 8(R13) == 0 && 9(R13) == 0
2   int_to_packed        R4,8(8,R13)
    # 18(R12) is an array of zeros
3   memory_copy          0(8,R13),18(R12)
4   packed_shift_left    10(6,R13),2
5   packed_add           7(9,R13),36(10,R13)      def=7(9,R13), use=7(9,R13): right aligned && sizeof(def) == sizeof(use)   1103
6   packed_truncate      7(9,R13),16digits
7   packed_to_zoned      96(16,R3),7(9,R13)       def=7(9,R13), use=7(9,R13): right aligned && sizeof(def) == sizeof(use)   1104

1102
1   zoned_to_packed_27   TMP1,112(18,R2)
2   int_to_packed_15     R4,TMP2
3   packed_truncate_11   TMP2,11digits
4   packed_shift_left_11 TMP2,2
5   packed_truncate_19   TMP1,19digits
6   packed_add_17        TMP2,TMP1
7   packed_truncate_16   TMP2,16digits
8   packed_to_zoned_16   96(16,R3),TMP2
```

FIG. 11A

CONDITIONS FOR REGARDING OPERAND OF DEFINITION (def) AND OPERAND OF USE (use) AS THE SAME LOGICAL BCD VARIABLES:

(2) WITH REGARD TO USE-DEFINITION CHAIN OF OPERAND IN FIRST COMPILER EXPRESSION
- SIZE OF OPERAND OF USE (use) (sizeof(use)) IS SMALLER THAN SIZE OF OPERAND OF DEFINITION (def) (sizeof(def));
- RIGHT-END ADDRESSES OF OPERANDS OF USE (use) AN DEFINITION (def) ARE THE SAME (right aligned);
- TYPES OF OPERANDS OF USE (use) AND DEFINITION (def) ARE THE SAME BCD TYPE; AND
- IN GENERATION OF SECOND COMPILER EXPRESSION, INSTRUCTION FOR DIGIT ADJUSTMENT IS INSERTED INTO FIRST COMPILER EXPRESSION
  1111

```
1   zoned_to_packed    32(14,R13),112(18,R2)
#   8(R13) == 0 && 9(R13) == 0               def=32(14,R13), use=36(10,R13): right aligned && sizeof(def) > sizeof(use) 1113
2   int_to_packed      R4,8(8,R13)           ⇨ INSERT INSTRUCTION FOR    ("packed_truncate_19   TMP1,19digits")
#   18(R12) is an array of zeros               DIGIT ADJUSTMENT
3   memory_copy        0(8,R13),18(R12)
4   packed_shift_left  10(6,R13),2           def=8(8,R13), use=10(6,R13): right aligned && sizeof(def) > sizeof(use)   1114
5   packed_add         7(9,R13),36(10,R13)   ⇨ INSERT INSTRUCTION FOR    ("packed_truncate_11   TMP2,11digits")
6   packed_truncate    7(9,R13),16digits       DIGIT ADJUSTMENT
7   packed_to_zoned    96(16,R3),7(9,R13)
```

1112

```
1   zoned_to_packed_27    TMP1,112(18,R2)
2   int_to_packed_15      R4,TMP2
3   packed_truncate_11    TMP2,11digits
4   packed_shift_left_11  TMP2,2
5   packed_truncate_19    TMP1,19digits
6   packed_add_17         TMP2,TMP1
7   packed_truncate_16    TMP2,16digits
8   packed_to_zoned_16    96(16,R3),TMP2
```

FIG. 11B

CONDITIONS FOR REGARDING OPERAND OF DEFINITION (def) AND OPERAND OF USE (use) AS THE SAME LOGICAL BCD VARIABLES:

(3) WITH REGARD TO USE-DEFINITION CHAIN OF OPERAND IN FIRST COMPILER EXPRESSION
- SIZE OF OPERAND OF USE (use) (sizeof(use)) IS LARGER THAN SIZE OF OPERAND OF DEFINITION (def) (sizeof(def));
- RIGHT-END ADDRESSES OF OPERANDS OF USE (use) AND DEFINITION (def) ARE THE SAME (right aligned);
- TYPES OF OPERANDS OF USE (use) AND DEFINITION (def) ARE THE SAME BCD TYPE; AND
- ZERO IS PUT IN AREA WHERE OPERAND OF USE (use) AND OPERAND OF DEFINITION (def) DO NOT OVERLAP

1121

```
1   zoned_to_packed      32(14,R13),112(18,R2)
    # 8(R13) == 0 && 9(R13) == 0
2   int_to_packed        R4,8(8,R13)                  def=10(6,R13), use=7(9,R13): right aligned && sizeof(def) < sizeof(use) &&   1123
    # 18(R12) is an array of zeros                    7(R13) == 0 && 8(R13) == 0 && 9(R13) == 0
3   memory_copy          0(8,R13),18(R12)
4   packed_shift_left    10(6,R13),2
5   packed_add           7(9,R13),36(10,R13)
6   packed_truncate      7(9,R13),16digits
7   packed_to_zoned      96(16,R3),7(9,R13)
```

1122

```
1   zoned_to_packed_27        TMP1,112(18,R2)
2   int_to_packed_15          R4,TMP2
3   packed_truncate_11        TMP2,11digits
4   packed_shift_left_11      TMP2,2
5   packed_truncate_19        TMP1,19digits
6   packed_add_17             TMP2,TMP1
7   packed_truncate_16        TMP2,16digits
8   packed_to_zoned_16        96(16,R3),TMP2
```

FIG. 11C

ORIGINAL BINARY CODE          IT IS ASSUMED THAT 336(9,R13) AND 376(6,R13) ARE DEAD

1  PACK  336(9,R13),48(16,R3)
2  PACK  376(6,R13),2(10,R2)
3  AP    336(9,R13),376(6,R13)
4  UNPK  48(16,R3),336(9,R13)

FIRST COMPILER EXPRESSION (USING RESULT OF ANALYZING THE NUMBER OF
ZERO DIGITS FROM LEFT-END DIGIT OF EACH OPERAND)          1132

1  zoned_to_packed  336(9,R13),48(16,R3)
2  zoned_to_packed  376(6,R13),2(10,R2)
3  packed_add       336(9,R13),376(6,R13)   # same-size
4  packed_to_zoned  48(16,R3),336(9,R13)    # same-size

SECOND COMPILER EXPRESSION          1133

1  zoned_to_packed  TMP1,48(16,R3)
2  zoned_to_packed  TMP2,2(10,R2)
3  packed_add       TMP1,TMP2
4  packed_to_zoned  48(16,R3),TMP1

FIG. 11D

ORIGINAL BINARY CODE                IT IS ASSUMED THAT 18(8,R12) IS ARRAY OF ZEROS AND   1141
                                    THAT 304(16,R13) AND 336(9,R13) ARE DEAD

1  CVD   R4,312(R13)
2  MVC   304(8,R13),18(R12)
3  SRP   314(6,R13),2,0
4  PACK  336(9,R13),96(16,R3)
5  AP    311(9,R13),336(9,R13)
6  UNPK  96(16,R3),311(9,R13)

FIRST COMPILER EXPRESSION (USING RESULT OF ANALYZING THE NUMBER OF
ZERO DIGITS FROM LEFT-END DIGIT OF EACH OPERAND)                                  1142

1  int_to_packed       R4,312(R13)                    # left_zero_len = 2
2  memory_copy         304(8,R13),18(R12)             # left_zero_len = 8
3  packed_shift_left   314(6,R13),2                   # truncate copy
4  zoned_to_packed     336(9,R13),96(16,R3)
5  packed_add          311(9,R13),336(9,R13)          # zero-extend copy, same-size copy
6  packed_to_zoned     96(16,R3),311(9,R13)           # same-size copy

SECOND COMPILER EXPRESSION                    1143

1  int_to_packed       R4,TMP1
2  packed_shift_left   TMP1,2
3  zoned_to_packed     TMP2,96(16,R3)
4  packed_add          TMP1,TMP2
5  packed_to_zoned     96(16,R3),TMP1

FIG. 11E

FIRST COMPILER EXPRESSION  1201
```
1  int_to_packed       R4,8(8,R13)
2  fill_zero           0(8,R13)
3  packed_shift_left   10(6,R13),2
4  zoned_to_packed     32(9,R13),96(16,R3)
5  packed_add          7(9,R13),32(9,R13)
6  byte_and            7(R13),0xf
7  packed_to_zoned     96(16,R3),7(9,R13)
```

SECOND COMPILER EXPRESSION  1202
```
1  int_to_packed       R4,TMP1
2  packed_truncate     TMP1,11digits
3  packed_shift_left   TMP1,2
4  zoned_to_packed     TMP2,96(16,R3)
5  packed_add          TMP1,TMP2
6  packed_truncate     TMP1,16digits
7  packed_to_zoned     96(16,R3),TMP1
```

THIRD COMPILER EXPRESSION  1203
```
1  int_to_dfp          R4,VFPR1
2  dfp_truncate        VFPR1,11digits
3  dfp_shift_left      VFPR1,2
4  dfp_truncate        VFPR1,11digits
5  zoned_to_dfp        VFPR2,96(16,R3)
6  dfp_add             VFPR1,VFPR2
7  dfp_truncate        VFPR1,16digits
8  dfp_to_zoned        96(16,R3),VFPR1
```

OPTIMIZED MACHINE CODE  1204
(INCLUDING OTHER OPTIMIZATION)
```
1  CXGTR   FPR1,R4
2  SLXT    FPR1,FPR1,2
3  SLXT    FPR1,FPR1,2
4  SRXT    FPR1,FPR1,23
5  CXZT    96(16,R3),FPR2
6  AXTR    FPR1,FPR1,FPR2
7  CZXT    96(16,R3),FPR1
```

METHOD FOR OPTIMIZING BINARY CODE IN LANGUAGE HAVING ACCESS TO BINARY CODED DECIMAL VARIABLE, AND COMPUTER AND COMPUTER PROGRAM

CROSS-REFERENCE TO RELATED APPLICATION

This application is a Continuation of U.S. patent application Ser. No. 14/248,500, filed on Apr. 9, 2014, which claims priority under 35 U.S.C. §119 from Japanese Patent Application No. 2013-086606, filed Apr. 17, 2013. The entire contents of both applications are incorporated herein by reference.

BACKGROUND OF THE INVENTION

1. Field of the Invention

The present invention relates to a technique for optimizing a binary code in a language having access to a binary coded decimal (hereinafter referred to as BCD) variable. In particular, the present invention relates to a technique for optimizing the binary code by converting a (BCD) operation to a decimal floating point (hereinafter referred to as DFP) operation.

2. Description of the Related Art

COBOL is a high-level language born in United States in 1959, and it has a long history among various languages. Even now, the COBOL language is still used for mission critical systems (for example, mainframes) because programs for clerical work can be efficiently developed. For example, a COBOL binary code is often used on IBM (registered trademark) System z (registered trademark), a mainframe sold by International Business Machines Corporation (registered trademark).

In COBOL, when the integer type is not specified at all, a figure is shown in a zoned decimal format (also referred to as an external decimal format). In order to perform an ordinary binary operation in COBOL, a binary modifier is necessary. However, a lot of COBOL programmers do not specify anything as an integer type. Therefore, a zoned decimal format is often used in COBOL.

When COBOL is executed, the zoned decimal format is internally converted to a packed format (also referred to as an internal decimal format) each time. Therefore, significant performance deterioration and speed decrease occur.

Therefore, optimization of a source code at the time of compiling the COBOL source code has been performed in order to improve the performance deterioration and speed decrease described above. The optimization is, for example, to perform type conversion of the source code from a decimal format to binary operations.

PL/I is one of general-purpose programming languages, which was born in 1964. PL/I is widely used in mainframes of IBM (registered trademark), for example, OS/390, z/OS, IMS (Information Management System) or CICS (Customer Information Control System).

Japanese Paten Application No. 2001-34482A describes a technique capable of making it possible to generalize an optimization process in a compilation process (paragraph 0009). This technique includes converting a source program to binary-tree-format internal data and optimizing the internal data (claim 1).

Japanese Patent Application No. 2012-248139A describes a technique for optimizing a binary code in a language having access to a BCD variable (paragraph 0001). This technique includes detecting, for each variable, an area which includes access to a zoned-decimal-format variable and does not include an instruction which can cause a side effect, from the binary code; and performing, within the detected area, a process of converting the zoned-decimal-format variable to a binary type, a process of deleting such a pack/unpack code that a result of the conversion does not change even if the pack/unpack code is deleted, from the binary code; or a combination of the processes (claim 1).

Japanese Patent Application No. 2000-132404A describes an instruction sequence optimization apparatus which estimates the size of a constant to be solved as an address difference value before performing linkage (abstract).

Japanese Patent Application No. P2001-236235A describes an instruction sequence optimization apparatus which generates an optimized code from an instruction sequence.

Japanese Patent Application No. 2004-295398A describes a compiler capable of optimizing a statement which performs an operation equal to a processing operation using a built-in function defined by a user, to be in a machine language corresponding to the built-in function defined by the user (paragraph 0009).

Japanese Patent No. 05-324313A describes that, in a data processing apparatus capable of executing a decimal operation instruction, unpack-format and pack-format decimal data are converted to fixed-point-number-format binary data when a central processing unit executes an instruction (claim 1).

SUMMARY OF THE INVENTION

According to one aspect of the present invention, a computer implemented method of optimizing a binary code in a language having access to a BCD variable by converting a BCD operation to a decimal floating point DFP operation is provided. The method includes: generating a first compiler expression of the binary code; analyzing a use-definition chain and/or a definition-use chain for the first compiler expression; generating a second compiler expression by identifying logical BCD variables in the first compiler expression based on a result of the analysis; assigning temporary variables to the identified logical BCD variables, wherein the second compiler expression includes packed decimal operations and the assigned temporary variables; and converting at least one of the packed decimal operations in the second compiler expression and at least one of the assigned temporary variables to the DFP operation if sign information and precision information are not lost by the conversion from the BCD operation to the DFP operation, wherein identifying logical BCD variables in the first compiler expression based the result of the analysis includes, in the use-definition and/or definition-use chains of operands in the first compiler expression, regarding an operand of definition (def) and an operand of use (use) as the same logical BCD variables.

According to a second aspect of the present invention, a computer implemented method for optimizing a compiler expression generated from a binary code in a language having access to a BCD variable and converting the optimized compiler expression to a machine code by converting a BCD operation to a DFP operation is provided. The method includes: generating a first compiler expression of the binary code; analyzing a use-definition chain and/or a definition-use chain for the first compiler expression; generating a second compiler expression by identifying logical BCD variables in the first compiler expression on the basis of a result of the analysis; assigning temporary variables to the identified logical BCD variables, wherein the second compiler expression includes packed decimal operations and the assigned temporary variables; and converting at least one of the packed decimal operations in the second compiler expression and at least one of the assigned temporary variables to the DFP operation if sign information and precision information are not lost by the conversion from the BCD operation to the DFP operation; wherein identifying logical BCD variables in the first compiler expression on the basis of a result of the analysis further includes, in the use-definition and/or definition-use chains of operands in the first compiler expression, regarding an operand of definition (def) and an operand of use (use) as the same logical BCD variables; and converting a third compiler expression generated by the conversion of at least one of the packed decimal operations in the second compiler expression and at least one of the assigned temporary variables to the DFP operation if sign information and precision information are not lost by the conversion from the BCD operation to the DFP operation to a machine code.

According to a third aspect of the present invention, a system for optimizing a binary code in a language having access to a binary coded decimal (hereinafter referred to as BCD) variable by converting a BCD operation to a decimal floating point (hereinafter referred to as DFP) operation is provided. The system includes: a memory; a processor coupled to the memory; a module for optimizing a binary code communicatively coupled to the memory and the processor to carry out the steps of: generating a first compiler expression of the binary code; analyzing a use-definition chain and/or a definition-use chain for the first compiler expression; identifying logical BCD variables in the first compiler expression on the basis of a result of the analysis; generating a second compiler expression by assigning temporary variables to the identified logical BCD variables, wherein the second compiler expression includes packed decimal operations and the assigned temporary variables; and generating a third compiler expression by converting at least one of the packed decimal operations in the second compiler expression and at least one of the assigned temporary variables to the DFP operation if sign information and precision information are not lost by the conversion from the BCD operation to the DFP operation, wherein identifying logical BCD variables in the first compiler expression on the basis of a result of the analysis further includes: regarding an operand of definition (def) and an operand of use (use) as the same logical BCD variables in the use-definition and/or definition-use chains of operands in the first compiler expression.

BRIEF DESCRIPTION OF THE DRAWINGS

FIG. 6A shows examples of an original binary code before being converted, each compiler expression of the binary code, a compiler expression, and a machine code obtained by converting the optimized compiler expression, according to an embodiment of the present invention.

FIG. 6C shows examples of operations which can be used in a machine code when a compiler expression optimized is converted to the machine code, according to an embodiment of the present invention.

FIG. 7A shows examples of an original binary code before being converted, each compiler expression of the binary code, a compiler expression, and a machine code obtained by converting the optimized compiler expression, according to an embodiment of the present invention.

FIG. 7B shows examples of an original binary code before being converted, a compiler expression of the binary code, a compiler expression, and a machine code obtained by converting the optimized compiler expression, according to an embodiment of the present invention.

FIG. 8 shows examples of a compiler expression generated by a process of combining two BCD operations into one BCD operation in the process of converting an operation in a compiler expression corresponding to a particular pattern to a different operation shown in FIGS. 3A to 3E, according to an embodiment of the present invention.

FIG. 9A shows examples of a compiler expression generated by a process of converting a non-BCD operation to a BCD operation in the process of converting an operation in a compiler expression corresponding to a particular pattern to a different operation shown in FIGS. 3A to 3E, according to an embodiment of the present invention.

FIG. 9B shows examples of a compiler expression generated by the process of converting a non-BCD operation to a BCD operation in the process of converting an operation in a compiler expression corresponding to a particular pattern to a different operation shown in FIGS. 3A to 3E, according to an embodiment of the present invention.

FIG. 10 shows examples of a compiler expression generated by a process of analyzing the number of zero digits from the left end of each operand in the process of converting an operation in a compiler expression corresponding to a particular pattern to a different operation shown in FIGS. 3A to 3E, according to an embodiment of the present invention.

FIG. 11A shows an example of a compiler expression generated by the process of identifying logical BCD variables shown in FIGS. 4A and 4B, according to an embodiment of the present invention.

FIG. 11B shows an example of a compiler expression generated by the process of identifying logical BCD variables shown in FIGS. 4A and 4B, according to an embodiment of the present invention.

FIG. 11C shows an example of a compiler expression generated by the process of identifying logical BCD variables shown in FIGS. 4A and 4B, according to an embodiment of the present invention.

FIG. 11D shows a second compiler expression generated by identifying logical BCD variables and assigning temporary variables to the identified logical BCD variables in the process of identifying logical BCD variables shown in FIGS. 4A and 4B, according to an embodiment of the present invention.

FIG. 11E shows a second compiler expression generated by identifying logical BCD variables and assigning temporary variables to the identified logical BCD variables in the process of identifying logical BCD variables shown in FIGS. 4A and 4B, according to an embodiment of the present invention.

FIG. 12 shows examples of a compiler expression generated by converting the type of packed decimal operations and the type of temporary variables to a DFP type and an optimized machine code obtained by converting the compiler expression, according to an embodiment of the present invention.

DETAILED DESCRIPTION OF THE PREFERRED EMBODIMENTS

Figure 1:
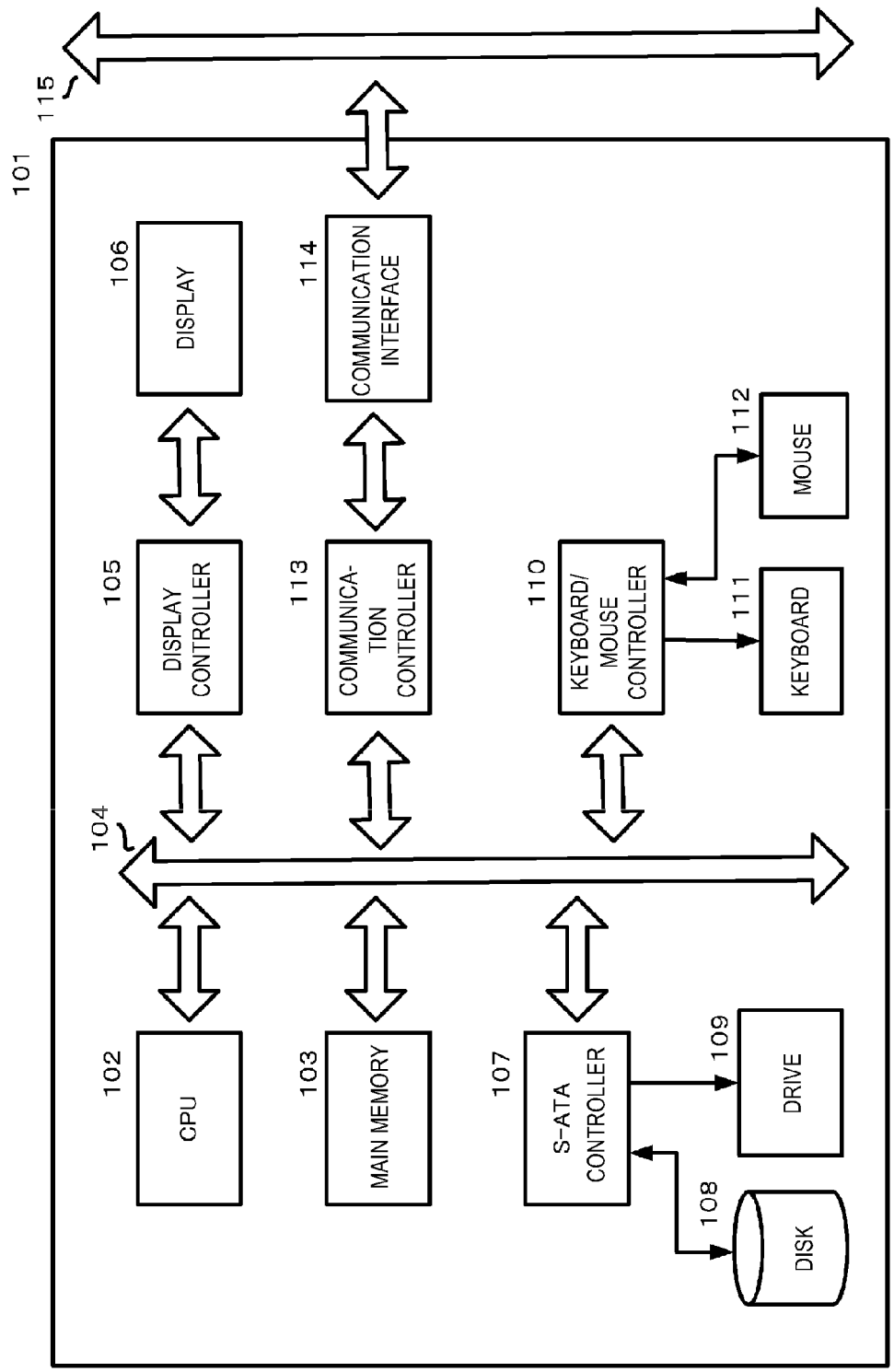
FIG. 1 shows a basic block diagram of computer hardware, according to an embodiment of the present invention.

BCD calculation is widely used in a binary code in a language having access to a BCD variable. However, BCD calculation is not efficient because it is calculation in units of memories. Therefore, it is desirable to convert BCD calculation from calculation in units of memories to calculation in units of registers.

The IBM (registered trademark) zEnterprize EC12 (zEC12) instruction newly supports an instruction for conversion from the zoned decimal type to the DFP type. This new conversion instruction is more efficient than the case of converting the BCD type to the binary type.

DFP is capable of expressing up to 34 digits using a 128-bit floating point register (FPR) or DFP register (DFPR). Using FPR is useful in the point of decreasing register pressure (register pressure indicates "how many registers are required during processing") of a general-purpose register (GPR).

However, identification of a logical BCD variable is difficult because the logical BCD variable does not correspond to an operand of a BCD instruction. For example, the above difficulty is caused by an operation instruction in a binary code accessing a part of bytes of the logical BCD variable, by a BCD instruction accessing a result of an original instruction with a different precision, by a non-BCD instruction accessing a logical BCD variable, and by the same memory position being reused for a different purpose.

Furthermore, conversion from the BCD operation type to the DFP operation type is difficult because the BCD operation type and the DFP operation type have very different characteristics. For example, the BCD operation type has a 4-bit sign-code while the DFP operation type has 1-bit sign-code and has only three types of precision; and, thereby, the above difficulty occurs.

Therefore, the object of the present invention is to, in optimization of a binary code in a language having access to a BCD variable, solve the above difficult point and enable conversion from the BCD operation type, which is calculation in units of memories, to the DFP operation type, which is calculation in units of registers.

Since the COBOL language has a long history as described above, there can be a case where only a COBOL binary code exists (or is stored) but a COBOL source code is lost. In such a case, it is not possible to optimize the binary code by recompiling the COBOL source code. Therefore, there is a demand for optimizing not a COBOL source code but a COBOL binary code itself.

An embodiment of the present invention provides a method for optimizing a binary code in a language having access to a BCD variable by converting the BCD operation to the DFP operation. This method can include a method for optimizing the binary code by converting the BCD operation to the DFP operation, a computer program and computer program product, and a computer for optimizing the binary code by converting the BCD operation to the DFP operation.

It should be noted that the above summary of the present invention does not enumerate all necessary features of the present invention, and a combination or sub-combination of the components can be also the present invention.

Of course, one skilled in the art can easily assume various modifications, such as combining hardware components of a computer used in the embodiment of the present invention with multiple machines and distributing functions thereto to implement the functions. Such modifications are concepts which are naturally included in the spirit of the present invention. However, the components are shown merely as examples, and all the components are not necessarily indispensable components of the present invention.

The present invention can be realized as hardware, software or a combination of hardware and software. As a typical example of execution by combination of hardware and software, execution in a computer in which the above computer program is installed can be given. In such a case, by the computer program being loaded onto the memory of the computer and executed, the computer program controls the computer to execute the process according to the present invention. The computer program can be configured by a group of instructions which can be expressed in an arbitrary language, by a code or by notation. Such a group of instructions enables the computer to execute a particular function directly or after any one or both of the following is performed: 1. conversion to another language, code or notation, and 2. copy to another medium.

In an optimization method for the present invention, conversion from the BCD operation, which is calculation in units of memories, to the DFP operation, which is calculation in units of registers, is enabled. The speed of reading data into a central processing unit is slow in calculation in units of memories in comparison with calculation in units of registers. Therefore, it is useful that, by converting the BCD operation to the DFP operation in accordance with the embodiment of the present invention, the processing speed in the central processing unit is improved.

Furthermore, in the optimization method for the present invention, even in the case where a COBOL source code does not exist, in other words, under a situation that a COBOL source code cannot be recompiled, it is possible to apply the optimization method, according to an embodiment of the present invention, to a COBOL binary code. Therefore, the optimization method for the present invention is useful especially in business in the point that the optimization method is directly applicable to a COBOL binary code.

An embodiment of the present invention will be described below in accordance with drawings. Through the figures below, the same reference numerals refer to the same objects unless otherwise stated. It should be understood that the embodiment of the present invention is for the purpose of describing a preferable aspect of the present invention and is not intended to limit the scope of the present invention to what is shown here.

FIG. 1 shows a basic block diagram of computer hardware, according to an embodiment of the present invention.

A computer (101) is provided with a CPU (102) and a main memory (103), and these are connected to a bus (104). CPU (102) is preferably based on a 32-bit or 64-bit architecture, and is, for example, Power (registered trademark) series by International Business Machines Corporation (registered trademark), Core i (trademark) series, Core 2 (trademark) series, Atom (trademark) series, Xeon (trademark) series, Pentium (registered trademark) series or Celeron (registered trademark) series by Intel Corporation, and Phenom (trademark) series, Athlon (trademark) series, Turion (trademark) series or Sempron (trademark) by Advanced Micro Devices, Inc. can be used.

A display (106), for example, a liquid crystal display is connected to bus (104) via a display controller (105). Display (106) is used to display information about software operating on the computer, for example, computer software in accordance with an embodiment of the present invention with an appropriate graphic interface.

A disk (108), for example, a hard disk or a solid state drive, and a drive (109), for example, a CD, DVD or BD drive are also connected to bus (104) via a SATA or IDE controller (107).

Furthermore, a keyboard (111) and a mouse (112) can be connected to bus (104) via a keyboard/mouse controller (110) or a USB bus (not shown).

In disk (108), an operating system, a processing program for creating a COBOL source code or a PL/I code, a COBOL compiler or a PL/I compiler for compiling the COBOL source code or the PL/I code, other programs, a COBOL source code or a PL/I code, an original binary code, an optimized binary code and an optimized machine code can be arbitrarily recorded such that they can be loaded to main memory (103).

Disk (108) can be included in computer (101). It can be connected via a cable so that computer (101) can access it or can be connected via a wired or wireless network so that computer (101) can access it.

Drive (109) can be used to install a program, for example, an operating system or an application from a CD-ROM, a DVD-ROM or a BD into disk (108) as necessary.

A communication interface (114) is, for example, in accordance with the Ethernet (R(registered trademark)) protocol. Communication interface (114) is connected to bus (104) via a communication controller (113), and it plays a role of wiredly or wirelessly connecting computer (101) to a communication line (115) and provides a network interface layer for the TCP/IP communication protocol for the communication function of the operating system of computer (101). The wireless communication line can be, for example, in a wireless LAN environment based on a wireless LAN connection standard, a WiFi wireless LAN environment such as IEEE802.11a/b/g/n or a mobile phone network environment (for example, a 3G or 4G environment).

FIG. 2, FIGS. 3A to 3E, FIGS. 4A to 4C, and FIGS. 5A and 5B show flowcharts for processes for optimizing a compiler expression in a language having access to a BCD variable by converting the BCD operation to the DFP operation, according to an embodiment of the present invention. FIGS. 6A to 6C and FIGS. 7A and 7B show examples of an optimized compiler expression which can be generated, according to an embodiment of the present invention, and a machine code generated by converting the optimized compiler expression.

The kind of the language having access to a BCD variable is not especially limited if it is a language which includes a decimal operation. The language having access to a BCD variable is, for example, COBOL or PL/I.

An optimization method according to an embodiment of the present invention includes: generating a first compiler expression of the binary code read into a memory; analyzing a use-definition chain (hereinafter also referred to as a "UD chain") and/or a definition-use chain (hereinafter also referred to as a "DU chain") for the generated first compiler expression; identifying logical BCD variables in the first compiler expression on the basis of a result of the analysis; generating a second compiler expression by assigning temporary variables to the identified logical BCD variables; and converting at least one packed decimal operation in the generated second compiler expression and at least one of the assigned temporary variables to a DFP operation on condition that sign information and precision information are not lost by the conversion from the BCD operation type to the DFP operation type.

The optimization method according to an embodiment of the present invention can be executed by a computer, for example, a binary code optimization apparatus applying the optimization method to the binary code. Alternatively, the method can be executed by a computer, for example, a compiler apparatus compiling a source code in a language having access to a BCD variable, for example, COBOL or PL/I code by a compiler implemented with the optimization method.

According to an embodiment of the present invention, a computer program and a computer program product cause the computer to execute each step of the optimization method. The computer program can be implemented in a computer program for optimizing the binary code. Alternatively, the computer program can be implemented in a compiler.

Each computer program can be stored in one or more arbitrary computer-readable recording media such as a flexible disk, MO, CD-ROM, DVD, BD, hard disk device, solid state drive, memory medium connectable to USB, ROM, MRAM and RAM. In order to store the computer program into a recoding medium, the computer program can be downloaded from another data processing system connected via a communication line, for example, a server computer or can be copied from another recording medium. The computer program can be compressed or divided into multiple parts, and stored in a single or multiple recording media. It should be noted that a computer program product in accordance with the embodiment of the present invention can be, of course, provided in various forms. The computer program product can include, for example, a recording medium in which the above computer program is recorded or a transmission medium for transmitting the above computer program.

A further embodiment of the present invention includes: a first compiler expression generating section generating a first compiler expression of the binary code; an analysis section analyzing UD and/or DU chains for the first compiler expression; an identification section identifying logical BCD variables in the first compiler expression on the basis of a result of the analysis, wherein the identification section executes, in the UD and/or DU chains of operands in the first compiler expression, a process of regarding an operand of definition (def) and an operand of use (use) as the same logical BCD variables; a second compiler expression generating section generating a second compiler expression by assigning temporary variables to the identified logical BCD variables, wherein the second compiler expression includes at least one packed decimal operation and the assigned temporary variables; and a third compiler expression generating section generating a third compiler expression by at least one of packed decimal operation in the second compiler expression and at least one of the assigned temporary variables to a DFP operation if sign information and precision information are not lost by the conversion from the BCD operation to the DFP operation.

In one embodiment of the present invention, the computer can be further provided with a compiler expression converting section which converts an operation in a compiler expression according to a particular pattern to a different operation before the identification section identifies logical BCD variables.

Furthermore, the computer is provided with a memory for reading in the binary code and a processor for optimizing the binary code on the memory, and the processor performs optimization of the binary code by executing each step of the optimization method, according to an embodiment of the present invention.

Furthermore, the present invention provides a method for converting a compiler expression optimized by the method to a machine code. This method can include the method for conversion to the machine code, a computer program and computer program product, and a computer which performs conversion to the machine code.

Figure 2:
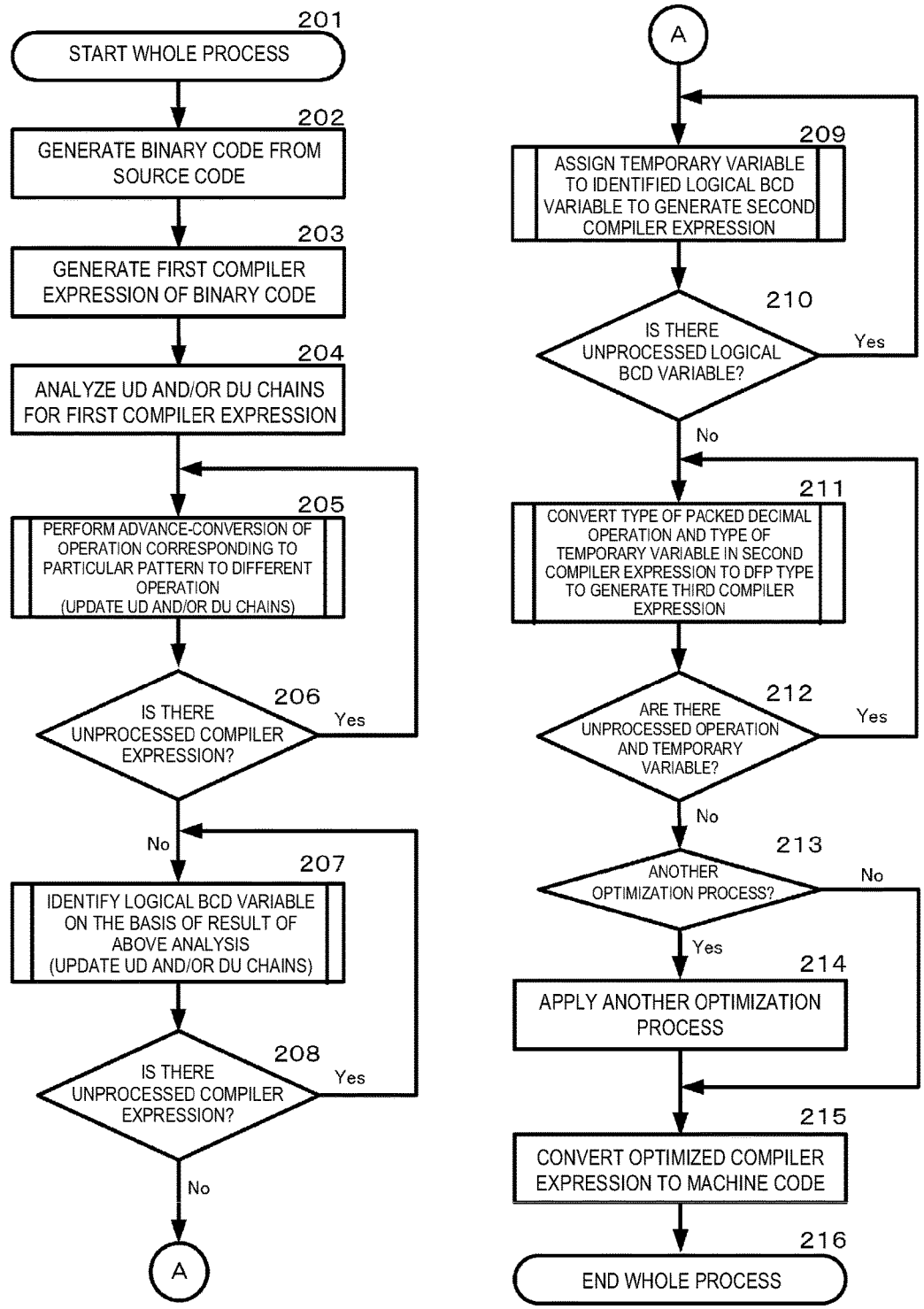
FIG. 2 shows a flowchart for a process of optimizing a binary code in a language having access to a BCD variable by converting the BCD operation to the DFP operation, according to an embodiment of the present invention.

FIG. 2 shows an overall flowchart for a process of optimizing a binary code in a language having access to a BCD variable by converting the BCD operation to the DFP operation, according to an embodiment of the present invention.

At step 201, computer (101) starts the process of optimizing a binary code.

At step 202, computer (101) can judge whether an optimization-target binary code (hereinafter also referred to as an original binary code) exists in the form of a source code, for example, in a storage medium (108), and, if the optimization-target original binary code exists in the form of a source code, read the source code into memory (103), and then, generate the original binary code from the source code read into memory (103). The original binary code is a binary code to which the optimization method of the present invention has not been applied. In order to convert the source code to the original binary code, computer (101) can use any technique known to one skilled in the art, for example, it can use a compiler on an emulator. Computer (101) can generate an original binary code of zEC12 on an emulator implemented on a central processing unit of, for example, power (registered trademark) series by IBM (registered trademark) or Xeon (registered trademark) series by Intel Corporation. On the other hand, if the optimization-target original binary code does not exist in the form of a source code, computer (101) advances the process to step 203. For example, if the original binary code is already stored, for example, in storage medium (108), computer (101) can skip the process of step 202.

Figure 13:
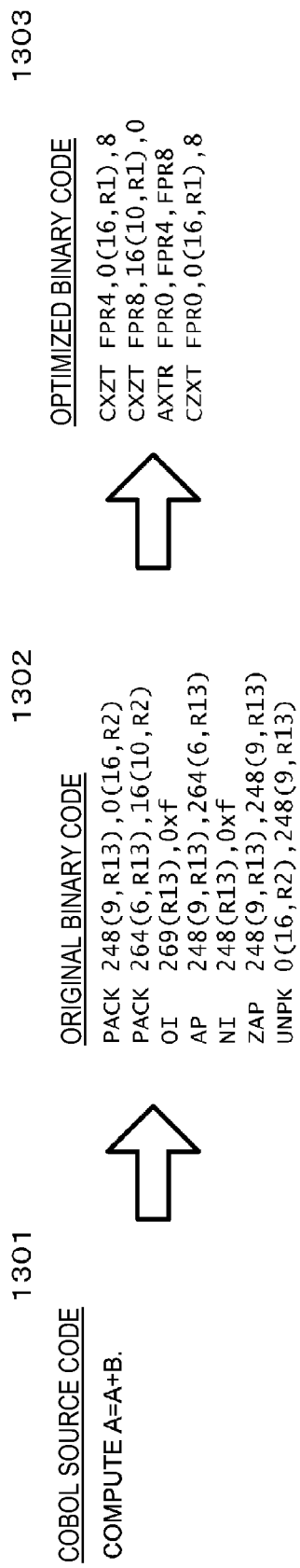
FIG. 13 shows a source code in COBOL, which is a language having access to a BCD variable, an original binary code obtained by converting the COBOL source code, and an optimized binary code obtained by converting the original binary code, according to an embodiment of the present invention.

FIG. 13 shows an example of converting a COBOL source code (1301) to an original binary code (1302).

At step 203, computer (101) generates a compiler expression of the original binary code (corresponding to "first compiler expression" described in the Claims; hereinafter referred to as "first compiler expression").

FIG. 6A shows an example of a first compiler expression (602) obtained by converting an original binary code (601). FIG. 7A shows an example of a first compiler expression (702) obtained by converting an original binary code (701).

At step 204, computer (101) analyzes UD and/or DU chains for the first compiler expression. The UD chain is such that, for use (use) of each variable, by which instruction a value used there is defined (def) or is possibly defined (def) is expressed as a set of instructions. The DU chain is such that, for definition of each variable, by which instruction a value defined (def) there is used (use) or is possibly used (use) is expressed as a set of instructions. Information about chains between use (use) and definition (def) for the first compiler expression can be obtained by the analysis. The information about chains between use (use) and definition (def) is also information chaining places of use (use) to places of definition (def). The UD chain and the DU chain are different from each other in the point which of use (use) and definition (def) is used as a key to access the information. According to an embodiment of the present invention, any method known to one skilled in the art can be used in both of the UD chain analysis and the DU chain analysis (for example, see Japanese Patent Application No. JP2002-342089A).

For example, when UD and/or DU chains are analyzed for the first compiler expression shown in FIG. 6A described below, an analysis result below (partially shown) is obtained, that is, information that 307 to 319 on the first line is def, and 311 on the second line is use (def-use), and that, when the relationship is reversely seen, 311 on the second line is use, and 307 to 319 on the first line is def (use-def).

At step 205, computer (101) can arbitrarily perform advance-conversion of an operation in the compiler expression corresponding to a particular pattern, to a different operation. The purpose of this advance-conversion is, for example, to make it possible to, by converting such instructions that the right-end addresses of operands are not the same (that is, not right-aligned) or non-BCD type instructions to different operations, regard the instructions as the same logical BCD variables at step 207 below. When the advance-conversion ends, computer (101) reanalyzes the UD and/or DU chains to perform update. The details of the process of step 205 will be described with reference to FIGS. 3A to 3E, FIG. 8 (combination of two BCD operations into one BCD operation), FIGS. 9A and 9B (conversion of a non-BCD operation to a BCD operation) and FIG. 10 (analysis of the number of zero digits from the left-end digit of each operand).

FIG. 7A shows examples of such a compiler expression that an operation in the compiler expression corresponding to a particular pattern has been advance-converted to a different operation (703, 704 and 705).

At step 206, computer (101) judges whether there is a compiler expression for which the process of step 205 has not been performed (hereinafter referred to as an "unprocessed compiler expression"). If there is an unprocessed compiler expression, computer (101) returns the process to step 205. On the other hand, if there is not an unprocessed compiler expression, computer (101) advances the process to step 207.

At step 207, computer (101) identifies logical BCD variables on the basis of a result of the analysis of UD and/or DU chains at step 204 and regards a use operand in the first compiler expression and a def operand in the first compiler expression as the same logical BCD variables. When the process of regarding the operands as the same logical BCD variables ends, computer (101) reanalyzes the UD and/or DU chains to perform update. The details of the process of step 207 will be described with reference to FIGS. 4A and 4B and FIGS. 11A to 11C.

At step 208, computer (101) judges whether there is a compiler expression for which the process of step 207 has not been performed (hereinafter referred to as an "unprocessed compiler expression"). If there is an unprocessed compiler expression, computer (101) returns the process to step 207. On the other hand, if there is not an unprocessed compiler expression, computer (101) advances the process to step 209.

At step 209, computer (101) assigns temporary variables to the logical BCD variables identified at step 207 and generates a compiler expression in which the temporary variables are assigned (corresponding to "second compiler expression" described in the Claims; hereinafter referred to as "second compiler expression"). The second compiler expression includes at least one packed decimal operation and the temporary variables assigned at step 208. The details of the process of step 209 will be described with reference to FIG. 4C and FIGS. 11E and 11F.

FIG. 6A shows an example of a compiler expression (603) in which temporary variables (for example, TMP1 to TMP3) are assigned to logical BCD variables. FIG. 7A shows an example of a compiler expression (706) in which temporary variables (for example, TMP1 and TMP2) are assigned to logical BCD variables.

At step 210, computer (101) judges whether there is a logical BCD variable for which the process of step 209 has not been performed (hereinafter referred to as an "unprocessed logical BCD variable"). If there is an unprocessed logical BCD variable, computer (101) returns the process to step 209. On the other hand, if there is not an unprocessed logical BCD variable, computer (101) advances the process to step 211.

At step 211, computer (101) converts the at least one of the packed decimal operations in the second compiler expression and at least one of the temporary variables assigned at step 209 to the DFP type to generate a third compiler expression (which is a compiler expression optimized according to an embodiment of the present invention). The details of the process of step 211 will be described with reference to FIGS. 5A and 5B and FIG. 12.

At step 212, computer (101) judges whether there is an operation or temporary variable for which the conversion to the DFP type has not been performed (hereinafter referred to as an "unprocessed operation or temporary variable") in the second compiler expression. If there is an unprocessed operation or temporary variable, computer (101) returns the process to step 211. On the other hand, if there is not an unprocessed operation or temporary variable, computer (101) advances the process to step 213. The process of conversion from the BCD operation to the DFP operation at step 211 is performed such that it is assured that sign information and precision information are not lost.

FIG. 6A shows an example of a compiler expression (604) obtained by converting each of the at least one packed decimal operations and the at least one temporary variables assigned at step 209 in second compiler expression (603) to the DFP type. FIGS. 7A and 7B show an example of a compiler expression (707) obtained by converting each of the at least one packed decimal operations and the at least one temporary variables assigned at step 209 in second compiler expression (706) to the DFP type.

At step 213, computer (101) judges, to the third compiler expression, whether another optimization process is to be applied or whether a different optimization process is applicable. As that other optimization process, for example, any optimization means known to one skilled in the art can be used. If another optimization process is to be applied, computer (101) advances the process to step 214. On the other hand, if another optimization process is not to be applied, computer (101) advances the process to step 215.

A compiler expression (708) in FIG. 7B shows an example in which it is judged whether another optimization process can be further applied to third compiler expression (707).

At step 214, computer (101) applies another optimization process to the third compiler expression to generate a compiler expression optimized by that other optimization process.

FIG. 7B shows an example of a compiler expression (709) obtained by optimizing third compiler expression (707) by that other optimization process.

At step 215, computer (101) converts the third compiler expression generated at step 211 (which is a compiler expression optimized according to an embodiment of the present invention) or compiler expression (708) further optimized by that other optimization process at step 214 to a machine code.

FIG. 6A shows an example of an optimized machine code (605) obtained by converting third compiler expression (604). FIG. 7B shows an example of an optimized machine code (710) obtained by converting compiler expression (709) further optimized by that other optimization process.

At step 216, computer (101) ends the process of optimizing a binary code.

FIGS. 3A to 3E show a detailed flowchart of the step of advance-converting an operation in a compiler expression corresponding to a particular pattern to a different operation, among steps of the flowchart shown in FIG. 2. As an embodiment of advance-converting an operation corresponding to a particular pattern to a different operation, an embodiment of combining two BCD operations into one BCD operation (steps 302 to 306), an embodiment of converting a non-BCD operation to a BCD operation (steps 311 to 315, steps 321 to 325, steps 331 to 340 and steps 351 to 356), and an embodiment of analyzing the number of zero digits from the left-end digit of the def of an operand in a first compiler expression (steps 361 to 368) are shown below.

At step 301, computer (101) starts a process of advance-converting an operation in a compiler expression corresponding to a particular pattern to a different operation (hereinafter also referred to as an advance-conversion process).

According to an embodiment of the present invention, two BCD operations can be combined into one BCD operation. At step 302, computer (101) judges, for advance-conversion of an operation in a compiler expression corresponding to a particular pattern to a different operation, whether there is an operation to perform conversion from packed decimal operands of two consecutive first and second instructions to zoned decimal operands (for example, "pack_to_zoned") or an operation to perform conversion from zoned decimal operands of two consecutive first and second instructions to packed decimal operands (for example, "zone_to_packed"). If the operation to perform conversion to zoned decimal operands or the operation to perform conversion to packed decimal operands exists, computer (101) advances the process to step 303. On the other hand, if neither the operation to perform conversion to zoned decimal operands nor the operation to perform conversion to packed decimal operands exists, computer (101) advances the process to step 311 (FIG. 3B).

At step 303, computer (101) judges whether the right-end byte address of the packed decimal operand of the first instruction and the left-end byte address of the packed decimal operand of the second instruction are the same. Alternatively, computer (101) judges whether the right-end byte address of a packed decimal operand of the first instruction obtained by converting the zoned decimal operand of the first instruction to the packed decimal operand and the left-end byte address of a packed decimal operand of the second instruction obtained by converting the zoned decimal operand of the second instruction to the packed decimal operand are the same. If the right-end byte address and the left-end byte address are the same, computer (101) advances the process to step 304. On the other hand, if the right-end byte address and the left-end byte address are not the same, computer (101) advances the process to step 311 (FIG. 3B).

At step 304, computer (101) judges whether the right-end byte address of the zoned decimal operand of the first instruction and the left-end byte address of the zoned decimal operand of the second instruction are the same. Alternatively, computer (101) judges whether the right-end byte address of a zoned decimal operand of the first instruction obtained by converting the packed decimal operand of the first instruction to the zoned decimal operand and the left-end byte address of a zoned decimal operand of the second instruction obtained by converting the packed decimal operand of the second instruction to the zoned decimal operand are the same. If the right-end byte address and the left-end byte address are the same, computer (101) advances the process to step 305. On the other hand, if the right-end byte address and the left-end byte address are not the same, computer (101) advances the process to step 311 (FIG. 3B).

At step 305, if the two consecutive first and second instructions are instructions to perform conversion from a packed decimal operand to a zoned decimal operand, computer (101) converts the instructions to an instruction to convert an operand obtained by combining the packed decimal operand of the first instruction and the packed decimal operand of the second instruction to an operand obtained by combining the zoned decimal operand of the first instruction and the zoned decimal operand of the second instruction. If the two consecutive first and second instructions are instructions to perform conversion from a zoned decimal operand to a packed decimal operand, computer (101) converts the instructions to an instruction to convert an operand obtained by combining the zoned decimal operand of the first instruction and the zoned decimal operand of the second instruction to an operand obtained by combining the packed decimal operand of the first instruction and the packed decimal operand of the second instruction. As described above, computer (101) converts two consecutive packed decimal operands to one packed decimal operand and converts two consecutive zoned decimal operands to one zoned decimal operand to generate one BCD operation. When the combination ends, computer (101) advances the process to an end step 306.

The advance-conversion process of combining two BCD operations into one BCD operation makes it possible to, by converting such instructions that the right-end addresses of operands of two BCD operations before conversion are not the same (that is, not right-aligned) to different operations, regard the operations after the conversion as the same logical BCD variables at step 207 shown in FIG. 2.

FIG. 7A shows an example of a compiler expression (703) after combination of two BCD operations into one BCD operation. Similarly, FIG. 8 shows examples of a compiler expression after combination of two BCD operations into one BCD operation (803, 813 and 823).

At step 306, computer (101) ends the advance-conversion process.

According to an embodiment of the present invention, a non-BCD operation can be converted to BCD operation. An embodiment involves the case where a non-BCD operation is a logical sum operation.

At step 311, computer (101) judges whether a non-BCD operation is a logical sum operation of constant values (for example, "byte_or") for a byte-length operand (a memory operand). If the operation is a logical sum operation, computer (101) advances the process to step 312. On the other hand, if the operation is not a logical sum operation, computer (101) advances the process to step 321.

At step 312, computer (101) judges whether the def for the use of the byte-length operand uniquely exists (that is, the def exists as only one def) and the def is a packed or zoned decimal operand. If the uniquely existing def is a packed or zoned decimal operand, computer (101) advances the process to step 313. On the other hand, if the uniquely existing def is neither a packed decimal operand nor a zoned decimal operand, computer (101) advances the process to step 331 (FIG. 3C).

At step 313, computer (101) judges whether the address of the use for the byte-length operand is the same as the right-end address of the def for the use. If the address of the use is the same as the right-end address, computer (101) advances the process to step 314. On the other hand, if the address of the use is not the same as (that is, different from) the right-end address, computer (101) advances the process to step 331 (FIG. 3C).

At step 314, computer (101) judges whether a value expressed as a constant in the first compiler expression (that is, a constant operand of a logical sum) is a value which causes only all bits of sign parts to be 1. As for the value which causes only all bits of sign parts to be 1, for example, the value expressed as a constant in the first compiler expression is 0xf if the type of the def operand can be the packed decimal type, or the value expressed as a constant in the first compiler expression is 0xf0 if the type of the def operand can be the zoned decimal type. If the constant value is the value which causes only all bits of sign parts to be 1, computer (101) advances the process to step 315. On the other hand, if the constant value is not the value which causes only all bits of sign parts to be 1, computer (101) advances the process to step 331 (FIG. 3C).

At step 315, computer (101) converts a logical sum operation (for example, "byte_or") to an operation of, for the packed decimal type or the zoned decimal type, causing all sign bits to be 1 (for example, "packed_set_sign" and "zoned_set_sign", respectively). When the conversion ends, computer (101) advances the process to the end step 306.

FIG. 9A shows examples of a compiler expression after conversion of a non-BCD operation "byte_or" to a BCD operation "packed_set_sign" or "zoned_set_sign" (903 and 913).

An embodiment of the present invention involves the case where a non-BCD operation is a logical product operation.

At step 321, computer (101) judges whether the non-BCD operation is a logical product operation of constant values for a byte-length operand (memory operand) (for example, "byte_and"). If the operation is a logical product operation, computer (101) advances the process to step 322. On the other hand, if the operation is not a logical product operation, computer (101) advances the process to step 331 (FIG. 3C).

At step 322, computer (101) judges whether the def for the use of the byte-length operand uniquely exists (that is, the def exits as only one def) and the def is a packed decimal operand. If the uniquely existing def is a packed decimal operand, computer (101) advances the process to step 323. On the other hand, if the uniquely existing def is not a packed decimal operand, computer (101) advances the process to step 331 (FIG. 3C).

At step 323, computer (101) judges whether the address of the use of the byte-length operand is different from the right-end address of the def for the use. If the address of the use is different from the right-end address, computer (101) advances the process to step 324. On the other hand, if the address of the use is not different from (that is, the same as) the right-end address, computer (101) advances the process to step 331 (FIG. 3C).

At step 324, computer (101) judges whether a value expressed as a constant in the first compiler expression (that is, a constant operand of a logical product) is a value which causes high-order digits to be zero. If the constant value is the value which causes high-order digits to be zero, computer (101) advances the process to step 325. On the other hand, if the constant value is not the value which causes high-order digits to be zero, computer (101) advances the process to step 331 (FIG. 3C).

At step 325, computer (101) converts a logical product operation (for example, byte_and) to a packed decimal type high-order digit truncation operation (for example, "packed_truncate"). When the conversion ends, computer (101) advances the process to the end step 306.

FIG. 7A shows an example of compiler expression (704) after conversion of byte_and, which is a non-BCD operation, to packed_truncate, which is a BCD operation. Similarly, FIG. 9A shows examples of a compiler expression after conversion of byte_and, which is a non-BCD operation, to packed_truncate, which is a BCD operation (923 and 933).

An embodiment of the present invention involves the case where a non-BCD operation is a memory comparison operation.

At step 331, computer (101) judges whether the non-BCD operation is a memory comparison operation (for example, "memory_cmp") for memory operands of first and second operands. If the operation is a memory comparison operation, computer (101) advances the process to step 332. On the other hand, if the operation is not a memory comparison operation, computer (101) advances the process to step 351 (FIG. 3D).

At step 332, computer (101) judges whether a requirement is satisfied that there is def which dominates use of the first operand, there is not another def for the use in any of paths between the def and the use, and the use exists for the def as only one use. If the requirement is satisfied, computer (101) advances the process to step 333. On the other hand, if the requirement is not satisfied, computer (101) advances the process to step 351 (FIG. 3D).

At step 333, computer (101) judges whether the right-end address of the use of the first operand is the same as the right-end address of the def of the first operand. If the right-end address of the use is the same as the right-end address of the def, computer (101) advances the process to step 334. On the other hand, if the right-end address of the use is not the same as the right-end address of the def, computer (101) advances the process to step 351 (FIG. 3D).

At step 334, computer (101) judges whether the def of the first operand is a packed decimal operand. If the def is a packed decimal operand, computer (101) advances the process to step 335. On the other hand, if the def is not a packed decimal operand, computer (101) advances the process to step 351 (FIG. 3D).

At step 335, computer (101) judges whether any one of the following three conditions is satisfied: that is, the size of the use (sizeof(use)) of the first operand is the same as the size of the def (sizeof(def)) of the first operand (sizeof(use)==sizeof(def)); the size of the use of the first operand is smaller than the size of the def of the first operand (sizeof(use)<sizeof(def)); and the size of the use of the first operand is larger than the size of the def of the first operand (sizeof(def)) (sizeof(use)>sizeof(def)) and zero is put in an area where the use of the first operand and the def of the first operand do not overlap. If any one of the above three conditions is satisfied, computer (101) advances the process to step 336. On the other hand, if none of the above three conditions is satisfied, computer (101) advances the process to step 351 (FIG. 3D).

At step 336, computer (101) judges whether a requirement is satisfied that there is def which dominates use of the second operand, there is not another def for the use in any of paths between the def and the use, and the use exists for the def as only one use. If the requirement is satisfied, computer (101) advances the process to step 337. On the other hand, if the requirement is not satisfied, computer (101) advances the process to step 351 (FIG. 3D).

At step 337, computer (101) judges whether the right-end address of the use of the second operand is the same as the right-end address of the def of the second operand. If the right-end address of the use is the same as the right-end address of the def, computer (101) advances the process to step 338. If the right-end address of the use is not the same as the right-end address of the def, computer (101) advances the process to step 351 (FIG. 3D).

At step 338, computer (101) judges whether the def of the second operand is a packed decimal operand. If the def is a packed decimal operand, computer (101) advances the process to step 339. On the other hand, if the def is not a packed decimal operand, computer (101) advances the process to step 351 (FIG. 3D).

At step 339, computer (101) judges whether any one of the following three conditions is satisfied: that is, the size of the use (sizeof(use)) of the second operand is the same as the size of the def (sizeof(def)) of the second operand (sizeof(use)==sizeof(def)); the size of the use of the second operand is smaller than the size of the def of the second operand (sizeof(use)<sizeof(def)); and the size of the use of the second operand is larger than the size of the def of the second operand (sizeof(def)) (sizeof(use)>sizeof(def)) and zero is put in an area where the use of the second operand and the def of the second operand do not overlap. If any one of the above three conditions is satisfied, computer (101) advances the process to step 340. On the other hand, if none of the above three conditions is satisfied, computer (101) advances the process to step 351 (FIG. 3D).

At step 340, computer (101) converts the memory comparison operation (for example, memory_cmp) to a packed decimal comparison operation (for example, packed_cmp). When the conversion ends, computer (101) advances the process to the end step 306.

FIG. 9B shows an example of a compiler expression (944) after conversion of memory_cmp, which is a non-BCD operation, to packed_cmp, which is a BCD operation.

An embodiment of the present invention involves the case where a non-BCD operation is a memory copy operation.

At step 351, computer (101) judges whether the non-BCD operation is a memory copy operation (for example, memory_copy). If the operation is a memory copy operation, computer (101) advances the process to step 352. On the other hand, if the operation is not a memory copy operation, computer (101) advances the process to step 361 (FIG. 3E).

At step 352, computer (101) judges whether a requirement is satisfied that there is def which dominates use of a copy-source operand, there is not another def for the use in any of paths between the def and the use, and the use exists for the def as only one use. If the requirement is satisfied, computer (101) advances the process to step 353. On the other hand, if the requirement is not satisfied, computer (101) advances the process to step 361 (FIG. 3E).

At step 353, computer (101) judges whether the right-end address of the use of the copy-source operand is the same as the right-end address of the def of the copy-source operand. If the right-end address of the use is the same as the right-end address of the def, computer (101) advances the process to step 354. On the other hand, if the right-end address of the use is not the same as the right-end address of the def, computer (101) advances the process to step 361 (FIG. 3E).

At step 354, computer (101) judges whether the def of the copy-source operand is a packed decimal operand. If the def is a packed decimal operand, computer (101) advances the process to step 355. On the other hand, if the def is not a packed decimal operand, computer (101) advances the process to step 361 (FIG. 3E).

At step 355, computer (101) judges whether any one of the following three conditions is satisfied: that is, the size of the use (sizeof(use)) of the copy-source operand is the same as the size of the def (sizeof(def)) of the copy-source operand (sizeof(use)==sizeof(def)); the size of the use of the copy-source operand is smaller than the size of the def of the copy-source operand (sizeof(use)<sizeof(def)); and the size of the use of the copy-source operand is larger than the size of the def of the copy-source operand (sizeof(use)>sizeof(def)), and zero is put in an area where the use of the copy-source operand and the def of the copy-source operand do not overlap. If any of the above three conditions is satisfied, computer (101) advances the process to step 356. On the other hand, if none of the above three conditions is satisfied, computer (101) advances the process to step 361 (FIG. 3E).

At step 356, computer (101) converts a memory copy operation (for example, memory_copy) to a packed decimal value copy operation (for example, packed_copy). When the conversion ends, computer (101) advances the process to the end step 306.

FIG. 9B shows an example of a compiler expression (953) after conversion of memory_copy, which is a non-BCD operation, to packed_copy, which is a BCD operation.

The advance-conversion process of converting a non-BCD operation before conversion to a BCD operation makes it possible to regard the BCD operations after the advance-conversion process as the same logical BCD variables at step 207 shown in FIG. 2.

An embodiment of the present invention includes analyzing the number of zero digits from left-end digit of def of operand in first compiler expression.

At step 361, computer (101) judges whether the operation is conversion from a zoned decimal operand to a packed decimal operand (for example, see step 302). If the operation is conversion from a zoned decimal operand to a packed decimal operand, computer (101) advances the process to step 362. On the other hand, if the operation is not conversion from a zoned decimal operand to a packed decimal operand, computer (101) advances the process to step 363.

At step 362, computer (101) assumes an expression of "the number of zero bytes from left-end digit=packed decimal operand length-(zoned decimal operand length+2)/2" (rounding off is adopted for division; in the case where the number of zero bytes from the left end as a calculation result is larger than 0) to be satisfied. The above expression can be also shown as "the number of zero bytes from left-end digit=MAX(packed decimal operand length-(zoned decimal operand length+2/2,0))." Then, computer (101) advances the process to the end step 306.

At step 363, computer (101) judges whether the operation is setting of sign bits for the packed decimal type (see step 315). If the operation is setting of sign bits for the packed decimal type, computer (101) advances the process to step 364. On the other hand, if the operation is not setting of sign bits for the packed decimal type, computer (101) advances the process to step 365.

At step 364, computer (101) assumes an expression of "the number of zero bytes from left-end digit=the number of zero bytes from left-end digit of def uniquely determined for use of operand for setting sign bits" (in the case where a result of the analysis shown in FIG. 3E exists) to be satisfied. Then, computer (101) advances the process to the end step 306.

At step 365, computer (101) judges whether the operation is conversion from the 4-byte length integer type to the packed decimal type. If the operation is conversion from the 4-byte length integer type to the packed decimal type, computer (101) advances the process to step 366. On the other hand, if the operation is not conversion from the 4-byte length integer type to the packed decimal type, computer (101) advances the process to step 367.

At step 366, computer (101) assumes "the number of zero bytes from left-end digit=packed decimal operand length-6" (in the case where the number of zero bytes from the left end as a calculation result is larger than 0) to be satisfied. The above expression can be also shown as "the number of zero bytes from left-end digit=MAX(packed decimal operand length-6,0)". Then, computer (101) advances the process to the end step 306.

At step 367, computer (101) judges whether the operation is a memory copy from an array of constant zeros in a literal pool. If the operation is a memory copy from an array of constant zeros in a literal pool, computer (101) advances the process to step 368. On the other hand, if the operation is not a memory copy from an array of constant zeros in a literal pool, computer (101) advances the process to the end step 306.

At step 368, computer (101) assumes "the number of zero bytes from left-end digit=the number of bytes of memory copy" to be satisfied. Then, computer (101) advances the process to the end step 306.

Figure 4A:
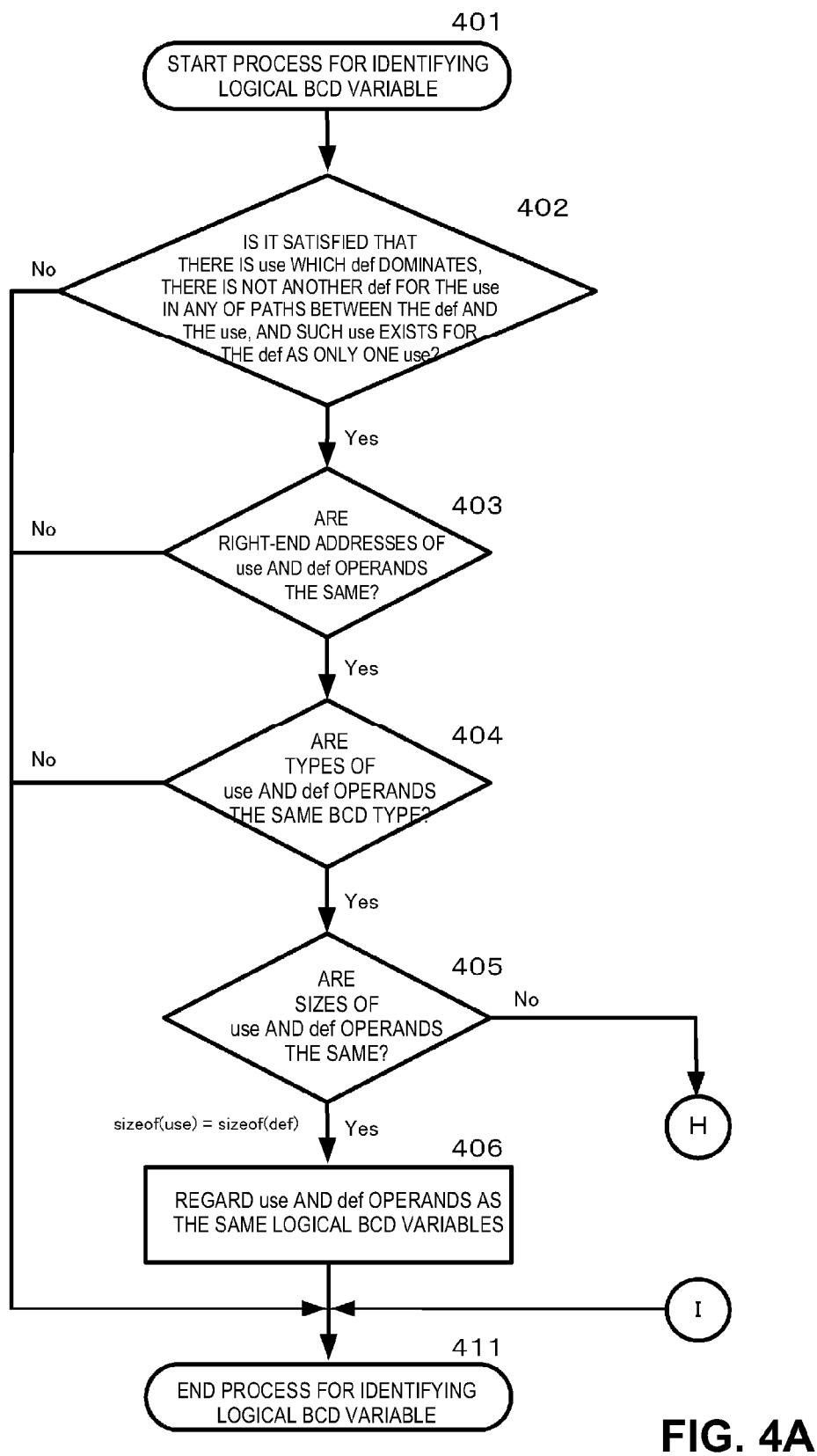
FIG. 4A shows a detailed flowchart of a step of identifying logical BCD variables and regarding a use operand in a first compiler expression and a def operand in the first compiler expression as the same logical BCD variables, among the steps of the flowchart shown in FIG. 2, according to an embodiment of the present invention.
Figure 4B:
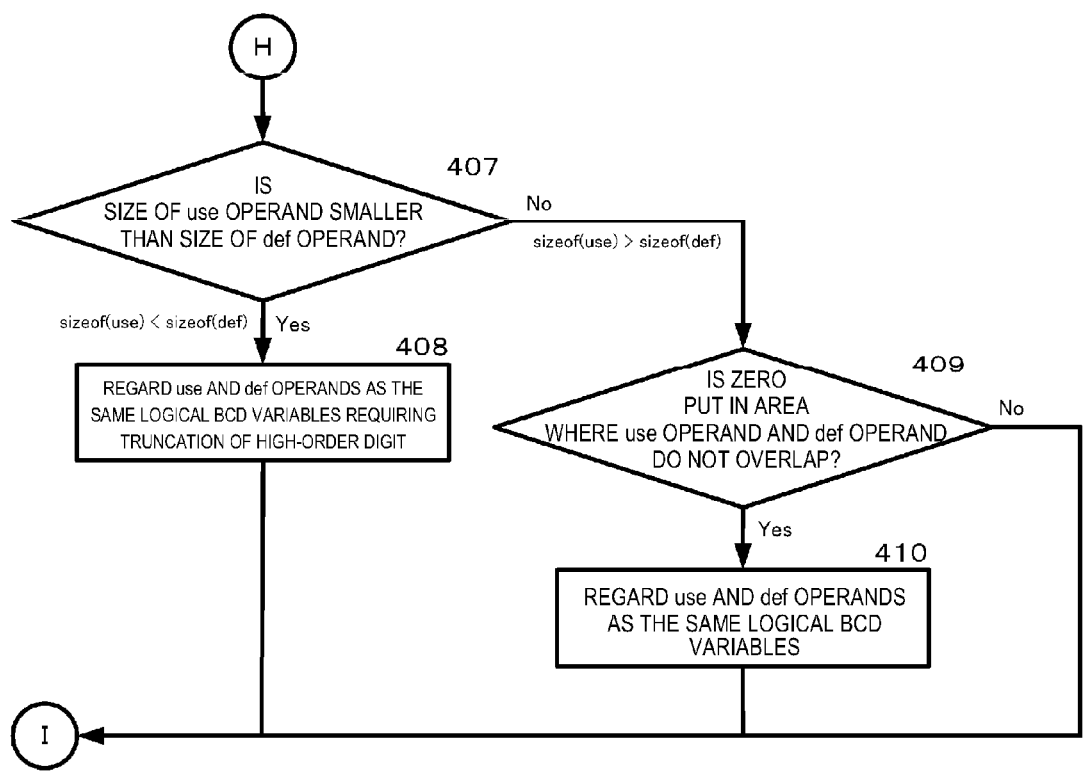
FIG. 4B shows a detailed flowchart of the step of identifying logical BCD variables and regarding a use operand in a first compiler expression and a def operand in the first compiler expression as the same logical BCD variables, among the steps of the flowchart shown in FIG. 2, according to an embodiment of the present invention.

FIGS. 4A and 4B show a detailed flowchart of the step of identifying logical BCD variables and regarding a use operand in a first compiler expression and a def operand in the first compiler expression as the same logical BCD variables, among the steps of the flowchart shown in FIG. 2.

At step 401, computer (101) starts a process of identifying logical BCD variables.

At step 402, computer (101) judges whether a requirement is satisfied that there is use which def dominates in the first compiler expression or a compiler expression generated by performing advance-conversion process of the first compiler expression (hereinafter generically referred to as "the first compiler expression" in description related to the process in FIG. 4A), there is not another def for the use in any of paths between the def and the use, and the use exists for the def as only one use. If the requirement is satisfied, computer (101) advances the process to step 403. On the other hand, if the requirement is not satisfied, computer (101) advances the process to an end step 411.

At step 403, computer (101) judges whether the right-end address of the use in the first compiler expression is the same as the right-end address of the def in the first compiler expression. If the right-end address of the use is the same as (right-aligned with) the right-end address of the def, computer (101) advances the process to step 404. On the other hand, if the right-end address of the use is not the same as the right-end address of the def, computer (101) advances the process to the end step 411.

At step 404, computer (101) judges whether the types of operands of the use and the def in the first compiler expression are the same BCD operation type (especially, the packed decimal type) (hereinafter also referred to as the same BCD type). If the types of the operands are the same BCD type, computer (101) advances the process to step 405.

On the other hand, if the types of the operands are not the same BCD type, computer (101) advances the process to the end step 411.

At step 405, computer (101) judges whether the size of the use operand (sizeof(use)) in the first compiler expression is the same as the size of the def operand (sizeof(def)) in the first compiler expression. If the sizes of the use and def operands are the same (sizeof(use)==sizeof(def)), computer (101) advances the process to step 406. On the other hand, if the sizes of the use def operands are not the same, computer (101) advances the process to step 407 (FIG. 4B).

At step 406, computer (101) regards the use operand in the first compiler expression and the def operand in the first compiler expression as the same logical BCD variables. Then, computer (101) advances the process to the end step 411.

At step 407, computer (101) judges whether the size of the use operand in the first compiler expression is smaller than the size of the def operand in the first compiler expression. If the size of the use operand is smaller than the size of the def operand (sizeof(use)<sizeof(def)), computer (101) advances the process to step 408. On the other hand, if the size of the use operand is not smaller than the size of the def operand, that is, if the size of the use operand is larger than the size of the def operand (sizeof(use)>sizeof(def)), computer (101) advances the process to step 409.

At step 408, computer (101) regards the use and def operands in the first compiler expression as the same logical BCD variables requiring truncation of high-order digits. Therefore, since regarding the use and def operand in the first compiler expression as the same logical BCD variable for which truncation of high-order digits is required, computer (101) is required to insert a high-order digit truncation instruction into the first compiler expression in generation of a second compiler expression (see step 425 in FIG. 4C). At this time, the number of digits of logical BCD variable operands is adjusted to correspond to the def side (for example, see instructions for digit adjustment 1113 and 1114 in FIG. 11B described below). Then, computer (101) advances the process to the end step 411 (FIG. 4A).

At step 409, computer (101) judges whether zero is put in an area where the use operand in the first compiler expression and the def operand in the first compiler expression do not overlap. If zero is put in an area where the use operand in the first compiler expression and the def operand in the first compiler expression do not overlap, computer (101) advances the process to step 410. An area of each operand in which zero is included can be determined by analyzing the length of an operation result of an instruction, zero fill and the like (see the process shown in FIG. 3E). On the other hand, if zero is not put in an area where the use operand in the first compiler expression and the def operand in the first compiler expression do not overlap, computer (101) advances the process to the end step 411 (FIG. 4A).

At step 410, computer (101) regards the use operand in the first compiler expression and the def operand in the first compiler expression as the same logical BCD variables. At this time, the number of digits of logical BCD variable operands is adjusted to correspond to the use side. Then, computer (101) advances the process to the end step 411 (FIG. 4A).

At step 411, computer (101) ends the process of identifying logical BCD variables.

In the flowchart shown in FIGS. 4A and 4B, the three conditions for regarding the use and def operands as the same logical variables are shown (steps 406, 408 and 410). When a first compiler expression satisfies the above conditions, computer (101) can apply one or more of the conditions to the first compiler expression.

Figure 4C:
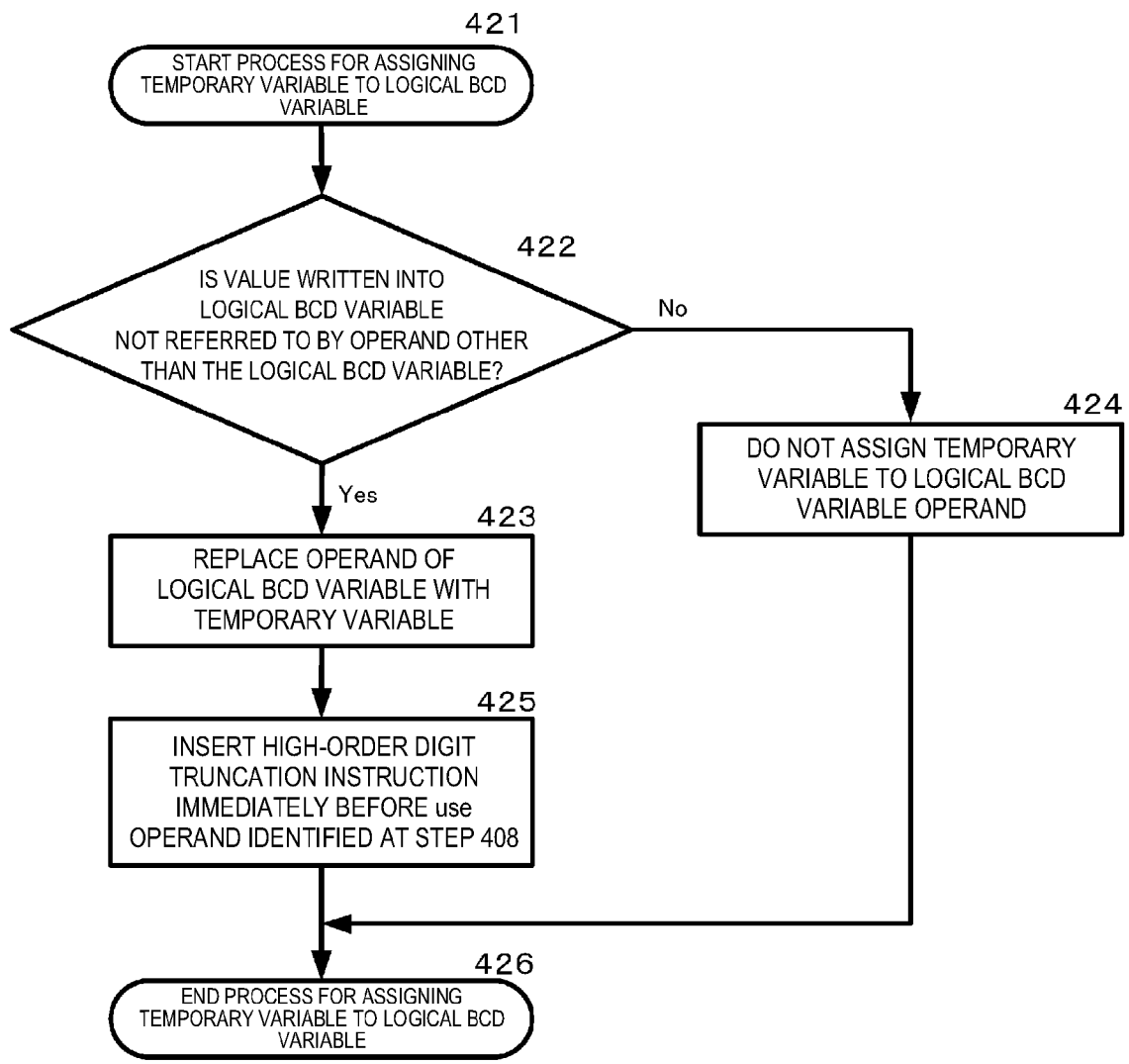
FIG. 4C shows a detailed flowchart of a step of assigning temporary variables to the logical BCD variables, among the steps of the flowchart shown in FIG. 2, according to an embodiment of the present invention.

FIG. 4C shows a detailed flowchart of the step of assigning temporary variables to logical BCD variables, among the steps of the flowchart shown in FIG. 2.

At step 421, computer (101) starts a process of assigning temporary variables to the logical BCD variables identified at step 207.

At step 422, computer (101) judges whether values written to logical BCD variables are not referred to from operands other than the logical BCD variables, on the basis of a result of analysis of UD and/or DU chains. That is, computer (101) judges whether all of uses for defs of operands recognized as logical BCD variables are recognized as the same logical BCD variables. If the values are not referred to, computer (101) advances the process to step 423. On the other hand, if the values are referred to, computer (101) advances the process to step 424.

At step 423, computer (101) assigns temporary variables to the logical BCD variable operands (that is, replaces the logical BCD variable operands with temporary variables). The temporary variables can be, for example, TMP1 to TMPn (n is a positive integer).

At step 424, computer (101) does not assign temporary variables to the logical BCD variable operands (that is, do not replace the logical BCD variable operands with temporary variables). An instruction which includes an operand which has not been replaced is not targeted by subsequent DFP conversion. Then, computer (101) advances the process to an end step 426.

At step 425, for the use operands identified at step 408, computer (101) inserts the high-order digit truncation instruction immediately before instructions having the use operands. For example, the high-order digit truncation instruction is inserted on the sixth line in third compiler expression (707) shown in FIG. 7B described below, the third and fifth lines of a third compiler expression (1112) shown in FIG. 11B described below.

At step 426, computer (101) ends the process of assigning temporary variables to logical BCD variables.

Figure 5A:
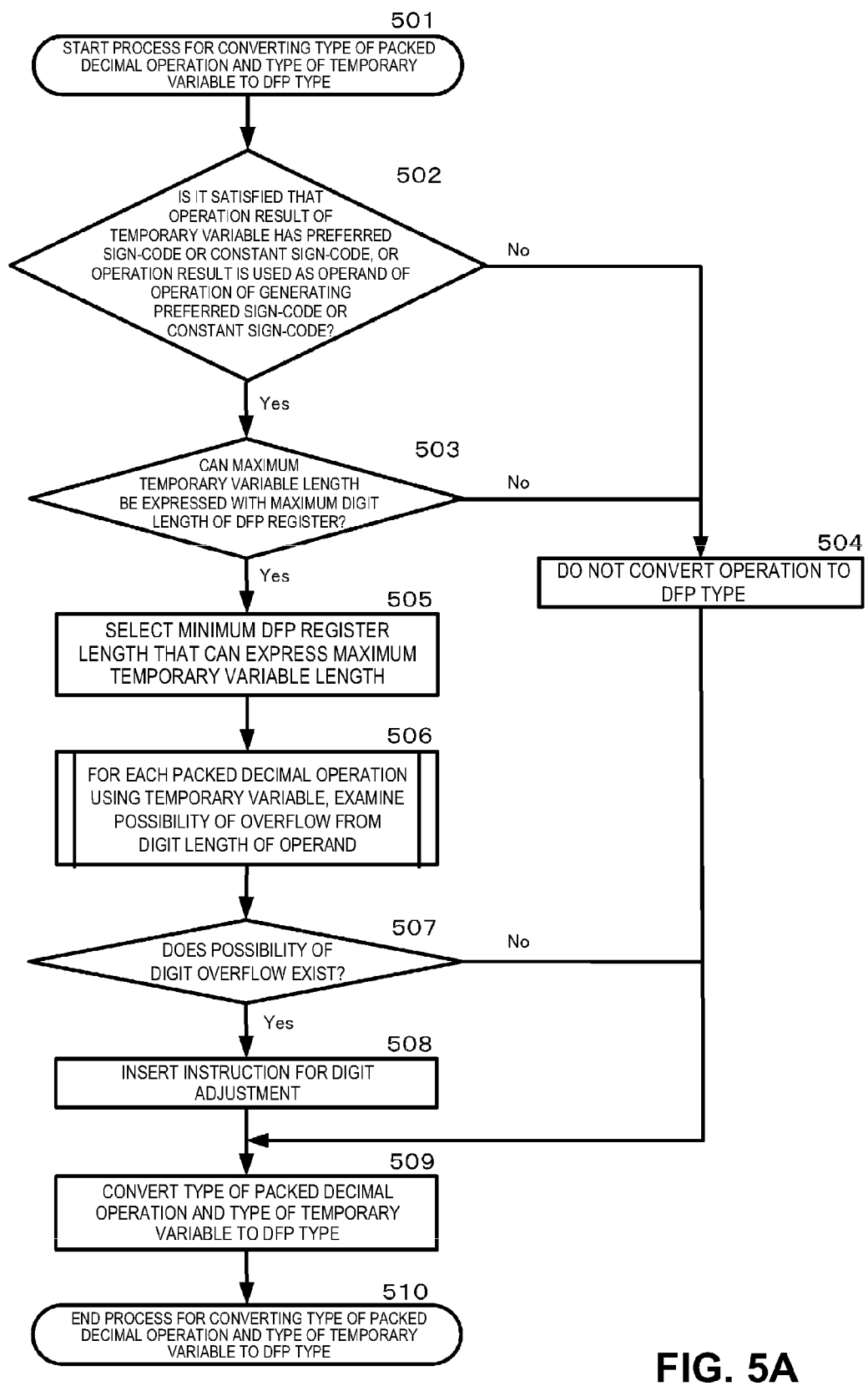
FIG. 5A shows a detailed flowchart of a step of generating a third compiler expression, among the steps of the flowchart shown in FIG. 2, according to an embodiment of the present invention.
Figure 5B:
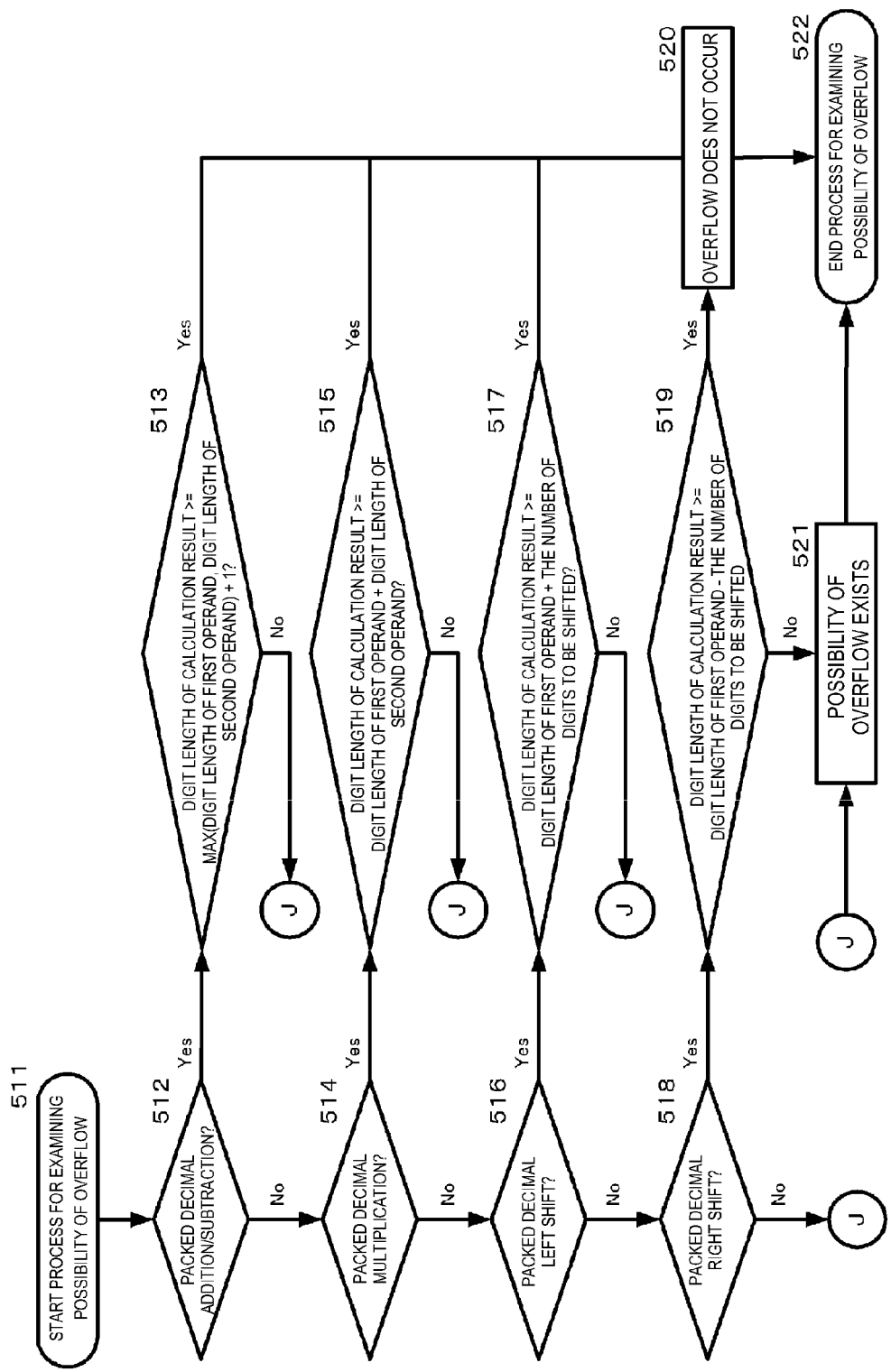
FIG. 5B shows a detailed flowchart of the step of generating a third compiler expression, among the steps of the flowchart shown in FIG. 2, according to an embodiment of the present invention.

FIGS. 5A and 5B show a detailed flowchart of the step of generating a third compiler expression, among the steps of the flowchart shown in FIG. 2.

FIG. 5A is a flowchart showing the whole process of the step of generating a third compiler expression.

At step 501, computer (101) starts a process of converting the type of at least one of packed decimal operations in the second compiler expression generated at step 209, and at least one of temporary variables in the second compiler expression, to the DFP type.

At step 502, computer (101) judges whether an operation result of a temporary variable in the first compiler expression or a compiler expression obtained by performing an advance process (at least one of the advance processes shown in FIGS. 3A to 3E) for the first compiler expression (hereinafter referred to simply as "the first compiler expression" in description of FIGS. 5A to 5B) has a preferred sign-code or a constant sign-code (requirement 1) or whether the operation result of the temporary variable is used as an operand of an operation of generating a preferred sign-code or a constant sign-code (requirement 2). If the requirement 1 or 2 is satisfied, computer (101) advances the process to step 503. On the other hand, if neither the requirement 1 nor 2 is satisfied, computer (101) advances the process to step 504. The former (the requirement 1) corresponds to TMP2 in the second compiler expression in FIG. 7A described below, and the latter (the requirement 2) corresponds to TMP1 in second compiler expression (706) in FIG. 7A. Since an operation result of TMP2 is obtained by "packed_add" in second compiler expression (706), it necessarily has a preferred sign-code. Since an operation result of TMP1 is used as an operand of the "packed_add", it is used as an operand for an operation of generating a preferred sign.

At step 503, computer (101) judges whether the maximum length of the temporary variables in the first compiler expression can be expressed with the maximum digit length of a DFP register. If the maximum length of the temporary variables can be expressed with the maximum digit length of a DFP register, computer (101) advances the process to step 505. If the maximum length of the temporary variables cannot be expressed with the maximum digit length of a DFP register, computer (101) advances the process to step 504.

At step 504, computer (101) advances the process to an end step 509 without converting operations in the first compiler expression to DFP operations.

At step 505, computer (101) selects the minimum DFP register length that can express the maximum length of the temporary variables. The DFP register length is selected, for example, from a single-precision register, a double-precision register or an extended precision register. The single-precision register has, for example, a 7-digit precision; the double-precision has, for example, a 16-digit precision; and the extended precision register has, for example, a 34-digit precision.

At step 506, for each of packed decimal operations using a temporary variable, computer (101) examines a possibility of overflow from the operand digit length. The details of the process of step 506 will be described with reference to FIG. 5B.

At step 507, computer (101) judges whether the possibility of digit overflow exists, on the basis of a result of the examination of step 506. If the possibility of digit overflow exists, computer (101) advances the process to step 508. On the other hand, if the possibility of digit overflow does not exist, computer (101) advances the process to step 509.

At step 508, computer (101) inserts an instruction for digit adjustment into the second compiler expression. For example, the instruction for digit adjustment is inserted on the fifth line in third compiler expression (707) shown in FIG. 7B described below.

At step 509, computer (101) converts the type of at least one of the packed decimal operations in the second compiler expression and the type of at least one of the temporary variables assigned at step 209, to the DFP type. That is, a third compiler expression is generated.

At step 501, computer (101) ends the process of converting a packed decimal operation and a temporary variable to the DFP type.

FIG. 5B is a flowchart showing the details of step 506 shown in FIG. 5A.

At step 511, computer (101) starts the process of examining the possibility of digit overflow.

At step 512, computer (101) judges whether a packed decimal operation using a temporary variable is addition/subtraction. If the packed decimal operation is addition/subtraction, computer (101) advances the process to step 513. On the other hand, if the packed decimal operation is not addition/subtraction, computer (101) advances the process to step 514.

At step 513, computer (101) judges whether the digit length of a calculation result of addition/subtraction of the packed decimal operation satisfies an expression of "digit length>=MAX(digit length of first operand, digit length of second operand)+1". If the digit length of the calculation result satisfies the expression, computer (101) advances the process to step 520. On the other hand, if the digit length of the calculation result does not satisfy the expression, computer (101) advances the process to step 521.

At step 514, computer (101) judges whether the packed decimal operation using a temporary variable is multiplication. If the packed decimal operation is multiplication, computer (101) advances the process to step 515. On the other hand, if the packed decimal operation is not multiplication, computer (101) advances the process to step 516.

At step 515, computer (101) judges whether the digit length of a calculation result of multiplication of the packed decimal operation satisfies an expression of "digit length>=digit length of first operand+digit length of second operand". If the digit length of the calculation result satisfies the expression, computer (101) advances the process to step 520. If the digit length of the calculation result does not satisfy the expression, computer (101) advances the process to step 521.

At step 516, computer (101) judges whether the packed decimal operation using a temporary variable is packed decimal left shift. If the packed decimal operation is left shift, computer (101) advances the process to step 517. On the other hand, if the packed decimal operation is not left shift, computer (101) advances the process to step 518.

At step 517, computer (101) judges whether the digit length of a calculation result of left shift of the packed decimal operation satisfies an expression of "digit length>=digit length of first operand+the number of digits to be shifted". If the digit length of the calculation result satisfies the expression, computer (101) advances the process to step 520. On the other hand, if the digit length of the calculation result does not satisfy the expression, computer (101) advances the process to step 521.

At step 518, computer (101) judges whether the packed decimal operation using a temporary variable is packed decimal right shift. If the packed decimal operation is right shift, computer (101) advances the process to step 519. On the other hand, if the packed decimal operation is not right shift, computer (101) advances the process to step 521.

At step 519, computer (101) judges whether the digit length of a calculation result of right shift of the packed decimal operation satisfies an expression of "digit length>=digit length of first operand−the number of digits to be shifted". If the digit length of the calculation result satisfies the expression, computer (101) advances the process to step 520. On the other hand, if the digit length of the calculation result does not satisfy the expression, computer (101) advances the process to step 521.

At step 520, computer (101) judges that digit overflow does not occur. Then, computer (101) advances the process to the end step 522.

At step 521, computer (101) judges that the possibility of digit overflow exists. Then, computer (101) advances the process to the end step 522.

At step 522, computer (101) ends the process of examining the possibility of digit overflow.

Figure 6B:
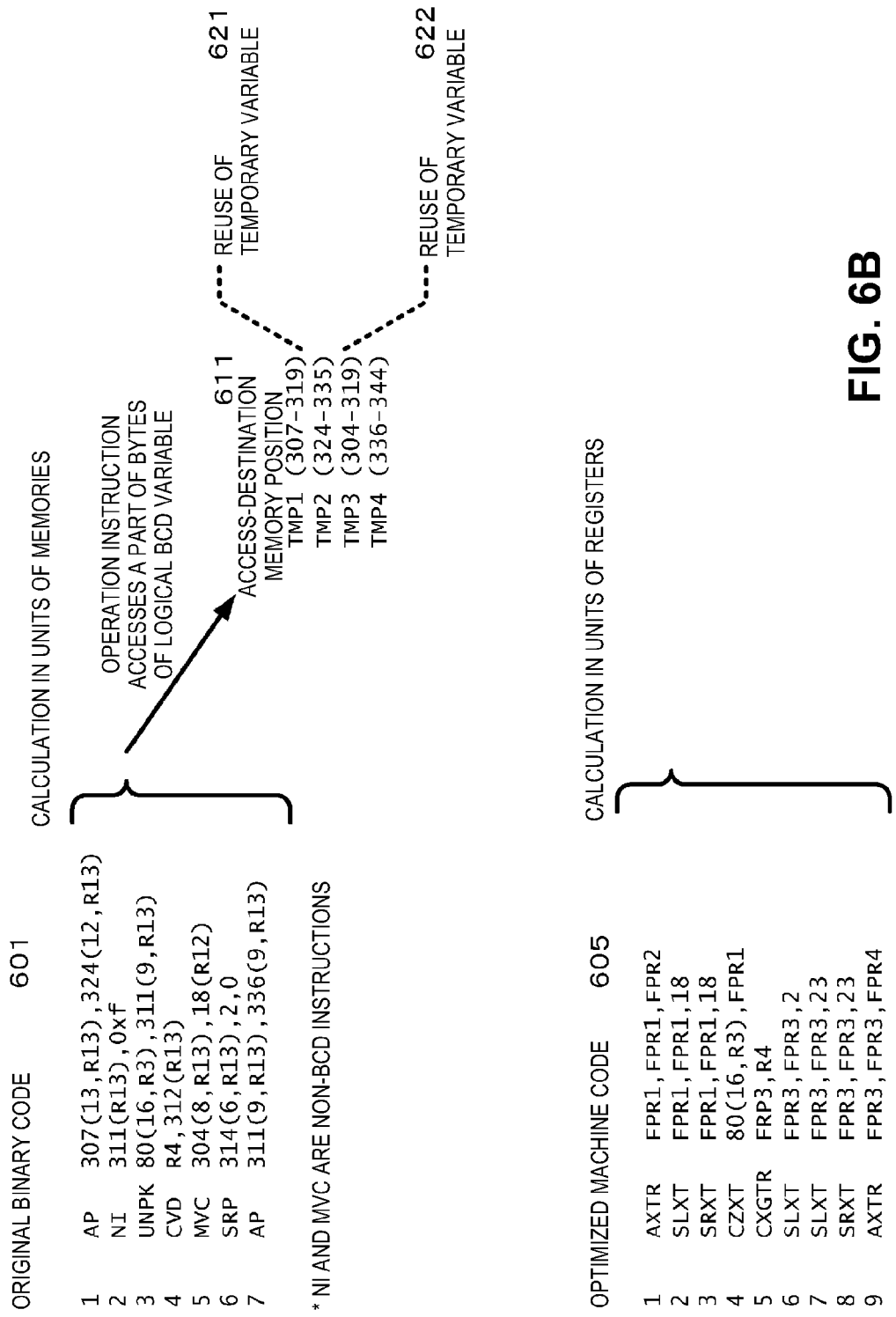
FIG. 6B shows each of descriptions of the original binary code and the optimized machine code shown in FIG. 6A, according to an embodiment of the present invention.

FIG. 6A shows examples of an original binary code before being converted in accordance with the embodiment of the present invention, each compiler expression of the binary code, a compiler expression optimized in accordance with the embodiment of the present invention, and an optimized machine code obtained by converting the optimized compiler expression. FIG. 6B shows each of descriptions of the original binary code and the optimized machine code shown in FIG. 6A. It should be noted that, in the examples of the binary code, the compiler expressions and the machine code, figures shown on the left side are attached for convenience of description and are unnecessary for implementation (the same goes for FIGS. 7A and 7B, FIG. 9B, FIGS. 11A and 11B, FIGS. 11D and 11E, and FIG. 12).

Original binary code (601) is a binary code generated from a language having access to a BCD variable (that is, a binary code in a language having access to a BCD variable). Original binary code (601) is calculation in units of memories as shown in FIG. 6B.

Each operation instruction in original binary code (601) accesses a part of bytes of a logical BCD variable.

Description has been made on memory areas accessed by each instruction in a machine code. Memory areas accessed by each instruction in a compiler expression are similar to the memory areas accessed by each instruction in a machine code. For details of the memory areas accessed by each instruction in a compiler expression, see description about FIG. 11F.

First compiler expression (602) is what is generated from original binary code (601) (611), and it is a compiler expression of the binary code.

Second compiler expression (603) is generated by analyzing UD and/or DU chains for first compiler expression (602), identifying logical BCD variables in the first compiler expression on the basis of a result of the analysis, and assigning temporary variables TMP1 to TMP4 to identified logical BCD variables (612). Second compiler expression (603) includes one or more packed decimal operations and the assigned temporary variables TMP1 to TMP4. The memory areas of the temporary variables TMP1, TMP2, TMP3 and TMP4 shown in second compiler expression (603) are 307 to 319, 324 to 335, 304 to 319, and 336 to 344, respectively. For example, the memory areas 307 to 319 of the temporary variable TMP1 is reused as a memory are of a different logical BCD variable (TMP3). The temporary variable TMP3 is determined by identifying logical BCD variables on the fifth, sixth and seventh lines in first compiler expression (602).

Third compiler expression (604) is obtained by converting each of the packed decimal operations and the temporary variables TMP1 to TMP4 in second compiler expression (603) to DFP type (dfp and FPR1 to FPR4, respectively) (613). The packed decimal operations in second compiler expression (603) are operations having the word "packed_", and they are shown on the first, second, third, fifth and sixth lines in second compiler expression (603) ("packed_add", "packed_truncate", "packed_to_zoned", "packed_shift_left" and "packed_add"). Sign information and precision information are not lost in conversion from second compiler expression (603) to third compiler expression (604), that is, by conversion from the BCD operation type to the DFP operation type. As for the sign information, results of operations of original binary code (601) are 311(9,R13) on the third line and 311(9,R13) on the seventh line. Both of the operation results have a preferred sign-code because they are operation results of "packed_add". In third compiler expression (604), FPR1 and FPR3 corresponding to 311(9,R13) and 311(9,R13) described above are regarded as having a preferred sign, and, therefore, sign information is not lost. As for the precision information, FPR with a precision high enough to express TMP1 to TMP4 are assigned to FPR1 to FPR4, and, if there is a possibility of occurrence of digit overflow thereby, digit adjustment is performed such that "dfp_truncate" in third compiler expression (604) is realized. Thereby, the precision of the original binary code is maintained. Third compiler expression (604) is an optimized compiler expression obtained in accordance with the embodiment of the invention as claimed in the application concerned.

Optimized machine code (605) is obtained by converting third compiler expression (604) to a machine code and is obtained in accordance with the embodiment of the invention as claimed in the application concerned. Optimized machine code (605) is calculation in units of registers as shown in FIG. 6B.

FIG. 6C shows examples of operations which can be used in a machine code when a compiler expression optimized in accordance with the embodiment of the present invention is converted to the machine code. The operations in FIG. 6C show examples of operations which can be used on IBM (registered trademark) System z (registered trademark), which is a mainframe sold by International Business Machines Corporation. The present invention, however, is not limited thereto.

FIGS. 7A and 7B show examples of an original binary code before being converted in accordance with the embodiment of the present invention, each compiler expression of the binary code, a compiler expression optimized in accordance with the embodiment of the present invention, and a machine code obtained by converting the optimized compiler expression.

Original binary code (701) is a binary code in a language having access to a BCD variable.

First compiler expression (702) is what is generated from original binary code (701) (711), and it is a compiler expression of the binary code.

Compiler expression (703) is what is generated from first compiler expression (702) (712), and it is a compiler expression after combination of two BCD operations (zoned_to_packed) written on the first and second lines in first compiler expression (702), respectively, into one BCD operation (zoned_to_packed) (712). In compiler expression (703), the BCD operation after the combination is as shown on the first line. As for the details of the process of combining two BCD operations into one BCD operation, see FIG. 3A and FIG. 8.

Compiler expression (704) is what is generated from compiler expression (703) (713), and it is a compiler expression after conversion of the non-BCD operation (byte_and) written on the sixth line in compiler expression (703) to a BCD operation (packed_truncate). In compiler expression (704), the BCD operation after the conversion is as shown on the sixth line. As for the details of the process of converting a non-BCD operation to a BCD operation, see FIGS. 3B to 3E and FIGS. 9A and 9B.

Compiler expression (705) is obtained by writing information obtained by analyzing the number of zero digits from the left-end digits of operands in the compiler expression (704) ("#8(R13)==0&&9(R13)==0" on the second line and "#18(R12) is an array of zeros" on the third line) also in compiler expression (704). It is known from analysis of the operation "int_to_packed" on the second line in compiler expression (704) that "8(R13)==0" and "9(R13)==0" described above are satisfied. Next, from analysis of the operation "memory_copy" on the third line, it is known that "0(8,R13)==0" is satisfied. Then, from combination of the above two analysis results, it is known that "0(10,R13)==0" is satisfied. Because of "left_zero_len"=8−6=2, 2 bytes of "8(R13)" and "9(R13)" are zeros. The above "#18(R12) is an array of zeros" describes that "18(R12)" is an array of zeros. It should be understood that compiler expression (705) is shown to facilitate understanding of the information obtained by the above analyses. As for the details of the process of analyzing the number of zero digits from the left-end digit of each operand, see FIG. 3E and FIG. 10.

Second compiler expression (706) is what is generated from compiler expression (704) or compiler expression (705) (714 or 715), and it is a compiler expression after conversion of the logical BCD variables in compiler expression (704 or 705) to the temporary variables TMP1 to TMP3 and inserting an instruction for digit adjustment on each of the third and fifth lines as shown in second compiler expression (706).

In compiler expression (705), "32(14,R13)" in "zoned_to_packed 32(14,R13), 112(18,R2)" on the first line is def, which is a UD and/or DU chain analysis result, and "36(10,R13)" in "packed_add 7(9,R13), 36(10,R13)" on the fifth line is use, which is also the analysis result. That is, "def=32(14,R13)" and "use=36(10,R13)" are satisfied; the def dominates the use; there is not another def for the use in any of paths between the def and the use; and the use exists for the def as only one use. Furthermore, both of the right-end addresses of the use and def operands are R13+45, being the same (right aligned); the types of the use and def operands are the same BCD type; and the size of the use operand (sizeof(use)) is smaller than the size of the def operand (sizeof(def)) (sizeof(def)>sizeof(use)). Therefore, "32(14,R13)" in "zoned_to_packed 32(14,R13), 112(18, R2)" on the first line and "36(10,R13)" in "packed_add 7(9,R13), 36(10,R13)" on the fifth line are regarded as the same logical BCD variables. As a result, in second compiler expression (706), the same temporary variable TMP1 is assigned into each of "zoned_to_packed$_{27}$" on the first line and "packed_add_17" on the sixth line. In second compiler expression (706), "packed_truncate_19 TMP1,19digits", an instruction for digit adjustment, is inserted on the fifth line.

In compiler expression (705), "8(8,R13)" in "int_to_packed R4,8(8,R13)" on the second line is def, which is a UD and/or DU chain analysis result, and "10(6, R13)" in "packed_shift_left 10(6,R13),2" on the fourth line is use, which is also the analysis result. That is, def=8(8, R13) and use=10(6,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the use operand (sizeof(use)) is smaller than the size of the def operand (sizeof(def)) (sizeof(def)>sizeof(use)). Therefore, "8(8, R13)" in "int_to_packed R4,8(8,R13)" on the second line and "10(6,R13)" in "packed_shift_left 10(6,R13),2" on the fourth line are regarded as the same logical BCD variables. As a result, in second compiler expression (706), the same temporary variable TMP2 is assigned into each of "int_to_packed_15" on the second line and "packed_shift_left" on the fourth line. Furthermore, in second compiler expression (706), "packed_truncate_11 TMP2,11digits", an instruction for digit adjustment, is inserted on the third line.

In compiler expression (705), "10(6,R13)" in "packed_shift_left 10(6,R13),2" on the fourth line is def, which is a UD and/or DU chain analysis result, and "7(9, R13)" in "packed_add 7(9,R13),36(10,R13)" on the fifth line is use, which is also the analysis result. That is, def=10(6,R13) and use=7(9,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the def operand (sizeof(def)) is smaller than the size of the use operand (sizeof(use)) (sizeof(def)<sizeof(use)). Furthermore, "7(R13)==0&&8(R13)==0&&9(R13)==0" is satisfied (see "#8(R13)==0&&9(R13)==0" on the second line in the compiler expression (705)). As described above, "8(R13)==0" and "9(R13)" are a result of analysis of the operation "int_to_packed" on the second line in the compiler expression (704), and "7(R13)" is a result of analysis of the operation "memory_copy" on the third line. Therefore, "10(6,R13)" in "packed_shift_left 10(6,R13),2" on the fourth line and "7(9,R13)" in "packed_add 7(9,R13),36(10, R13)" on the fifth line are regarded as the same logical BCD variables. As a result, in second compiler expression (706), the same temporary variable TMP2 is assigned into each of "packed_shift_left_11" on the fourth line and "packed_add_17" on the sixth line.

In compiler expression (705), "7(9,R13)" in "packed_add 7(9,R13),36(10,R13)" on the fifth line is def, which is a UD and/or DU chain analysis result, and "7(9,R13)" in "packed_truncate 7(9,R13),16digits" on the sixth line is use, which is also the analysis result. That is, def=7(9,R13) and use=7(9,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the def operand (sizeof(def)) is the same as the size of the use operand (sizeof(use)) (sizeof(def)=sizeof(use)). Therefore, "7(9,R13)" in "packed_add 7(9,R13),36 (10,R13)" on the fifth line and "7(9,R13))" in "packed_truncate 7(9,R13),16digits" on the sixth line are regarded as the same logical BCD variables. As a result, in second compiler expression (706), the same temporary variable TMP2 is assigned into each of "packed_add_17" on the sixth line and "packed_truncate_16" on the seventh line.

In compiler expression (705), "7(9,R13)" in "packed_truncate 7(9,R13),16digits" on the sixth line is def, which is a UD and/or DU chain analysis result, and "7(9, R13)" in "packed_to_zoned 96(16,R3),7(9,R13)" on the seventh line is use, which is also the analysis result. That is, def=7(9,R13), and use=7(9,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the def operand (sizeof(def)) is the same as the size of the use operand (sizeof(use)) (sizeof(def)=sizeof(use)). Therefore, "7(9, R13)" in "packed_truncate 7(9,R13),16digits" on the sixth line and "7(9,R13)" in "packed_to_zoned 96(16,R3),7(9, R13)" on the seventh line are regarded as the same logical BCD variables. As a result, in second compiler expression (706), the same temporary variable TMP2 is assigned into each of "packed_truncate_16" on the seventh line and "packed_to_zoned_16" on the eighth line.

The figure after the last underline in each operation in second compiler expression (706) indicates the precision (the number of digits) of the operation. In the case of the "packed" type, it is calculated by the number of bytes×2−1. For example, from "32(14,R13)" in "zoned_to_packed 32(14,R13),112(18,R2)" on the first line in the original compiler expression (704, 705) corresponding to "zoned_to_packed_27", an operation on the first line in second compiler expression (706), the precision is determined as 14×2−1=27 digits. Therefore, since the figure after the last underline in the operation "zoned_to_packed_27" on the first line in second compiler expression (706) is 27, the precision (the number of digits) of the operation corresponds to the calculated precision 27. Similarly, from "8(8,R13))" in "int_to_packed R4,8(8,R13)" on the second line in original compiler expression (704, 705) corresponding to "Int_to_packed_15 R4,TMP2", an operation on the second line in second compiler expression (706), the precision is determined as 8×2−1=15 digits. Therefore, since the figure after the last underline in the operation "Int_to_packed_15" on the second line in second compiler expression (706) is 15, the precision (the number of digits) of the operation corresponds to the calculated precision 15. Similarly, from "10 (6,R13)" in "packed_shift_left 10(6,R13),2" on the fourth line in original compiler expression (704, 705) corresponding to "packed_shift_left_11 TMP2,2", an operation on the fourth line in second compiler expression (706), the precision is determined as 6×2−1=11 digits. Therefore, since the figure after the last underline in the operation "packed_shift_left_11" on the fourth line in second compiler expression (706) is 11, the precision (the number of digits) of the operation corresponds to the calculated precision 11. Similarly, from "7(9,R13)" in "packed_add 7(9,R13),36(10, R13)" on the fourth line in original compiler expression (704, 705) corresponding to "packed_add_17 TMP2, TMP1", an operation on the sixth line in second compiler expression (706), the precision is determined as 9×2−1=17 digits. Therefore, since the figure after the last underline in the operation "packed_add_17" on the sixth line in second compiler expression (706) is 17, the precision (the number of digits) of the operation corresponds to the calculated precision 17. Similarly, from "7(9,R13)" in "packed_truncate 7(9,R13),16digits" on the sixth line in the original compiler expression (704, 705) corresponding to "packed_truncate_16 TMP2,16digits", an operation on the seventh line in second compiler expression (706), the precision is determined as 9×2−1=17 digits. However, in this operation, the digits are adjusted to be 16 digits because "16digits" is specified in "packed_truncate_16 TMP2,16digits", an operation on the seventh line in second compiler expression (706). Therefore, since the figure after the last underline in the operation "packed_truncate_16" on the sixth line in second compiler expression (706) is 16, the precision (the number of digits) of the operation corresponds not to the calculated precision 17 but to the adjusted 16 digits. As for "packed_to_zoned_16 96(16,R3),TMP2", an operation on the eighth line in second compiler expression (706), the number of zoned decimal digits is equal to the number of bytes. Therefore, the number of digits of the operand "96(16,R3)" is 16.

Third compiler expression (707) is what is generated from second compiler expression (706) (716), and it is a compiler expression after converting the type of packed decimal operations (operations including the expression of "packed") in second compiler expression (706) and the type of temporary variables (TMP1 to TMP3) to the DFP type (operations including the expression of dfp, and VFPR1 to VFPR3, respectively) and inserting an instruction for digit adjustment onto each of the fifth and eighth lines as shown in third compiler expression (707). Third compiler expression (707) is also a compiler expression optimized in accordance with the embodiment of the present invention. Since the maximum precision of second compiler expression (706) is 27 ("zoned_to_packed_27" on the first line), an extended precision register (having, for example, a precision of 34 digits) can be adopted as a floating point register.

The reason for an operation "dfp_truncate VFPR2,11digits" being added to the fifth line in third compiler expression (707) is that, since "dfp_shift_left" on the fourth line shifts a 11-digit value to the left by 2 digits and stores the value in 11 digits, a result of the "dfp_shift_left" can possibly overflow. Similarly, the reason for an operation "dfp_truncate VFPR2,17digits" being added to the eighth line in third compiler expression (707) is that, since "dfp_add" on the seventh line adds up a 19-digit value and a 11-digit value and stores the result in 17 digits, a result of the "dfp_add" can possibly overflow.

Compiler expression (708) is a compiler expression after judging whether there is a deletable or combinable operation and adding a result of the judgment into third compiler expression (707) as a comment in order to optimize the third compiler expression (707) using an optimization technique other than the embodiment of the present invention. It should be understood that compiler expression (708) is shown to facilitate understanding of the result of the judgment. Compiler expression (708) shows that operations on the third, sixth, eighth and ninth lines are deletable.

The reason why the operation "dfp_truncate VFPR2, 11digits" on the third line in compiler expression (708) is deletable is that "int_to_dfp" on the second line has 11 digits (6×2−1=11 digits because the maximum size of "int_to_packed" is 6 bytes). The reason why the operation "dfp_truncate VFPR1,19digits" on the sixth line in compiler expression (708) is deletable is that an operation result of "zoned_to_dfp" on the first line has 18 digits since the number of zoned decimal digits is equal to the number of bytes. The reason why the operation "dfp_truncate" on the eighth and ninth lines in compiler expression (708) is deletable is that, at the time of converting the DFP type to the zoned decimal type by "dfp_to_zoned" on the tenth line, digit adjustment is also performed.

Compiler expression (709) is what is generated from third compiler expression (707) or compiler expression (708) (717 or 718), and it is a compiler expression after deletion of operations on the third, sixth, eighth and ninth lines as shown in compiler expression (708).

Since the maximum number of digits of an operand "112(18,R2)" is 18 in an operation "zoned_to_dfp VFPR1, 112(18,R2)" on the first line in compiler expression (709), truncation to 19 digits is not necessary. Similarly, in an operation "dfp_to_zoned VFPR2,96(16,R3)" on the sixth line in compiler expression (709), digit truncation to 16 digits is performed. In the case of the zoned type, since the number of bytes=the number of digits is satisfied, the number of digits is 16.

Machine code (710) is what is converted from compiler expression (709) (719), and it is an optimized machine code obtained from a result of applying various optimization processes to the compiler expression of original binary code (701).

FIG. 8, FIGS. 9A and 9B, and FIG. 10 show specific examples of the processes for converting an operation in a compiler expression corresponding to a particular pattern to a different operation shown in FIG. 3A, FIGS. 3B to 3D, and FIG. 3E (the process of combining two BCD operations into one BCD operation, the process of converting a non-BCD operation to a BCD operation; and the process of analyzing zero digits on the left of each operand, respectively), respectively.

FIG. 8 shows examples (1) and (2) of the process of combining two BCD operations into one BCD operation in the process of converting an operation in a compiler expression corresponding to a particular pattern to a different operation shown in FIGS. 3A to 3E, and a compiler expression generated by each process.

Both of two combination examples shown in the example (1) show an example of combining BCD operations of zoned_to_packed, which are two consecutive first (first line) and second (second line) instructions, into one BCD operation zoned_to_packed.

In a first compiler expression (802), the memory addresses of an operand 32(7,R13) in the first instruction zoned_to_packed are R13+32 to R13+38, and the memory addresses of an operand 38(8,R13) in the second instruction zoned_to_packed is R13+38 to R13+45. Therefore, the operand 32(7,R13) in the first instruction zoned_to_packed and the operand 38(8,R13) in the second instruction zoned_to_packed are combined and converted to an operand 32(14,R13) in combined instruction zoned_to_packed (803). The memory addresses of the operand 32(14,R13) are R13+32 to R13+45, and it covers all the memory addresses of the two consecutive first and second instructions zoned_to_packed before combination (R13+32 to R13+38, and R13+38 to R13+45, respectively). Similarly, the memory addresses of an operand 112(4,R3) in the first instruction zoned_to_packed are R3+112 to R3+115, and the memory addresses of an operand 115(15,R3) in the second instruction zoned_to_packed are R3+115 to R3+129. Therefore, the operand 112(4,R3) in the first instruction zoned_to_packed and the operand 115(15,R3) in the second instruction zoned_to_packed are combined and converted to an operand 112(18,R3) in combined instruction zoned_to_packed (803). The memory addresses of the operand 112(18,R3) are R3+112 to R3+129, and it covers the memory addresses of the two consecutive first and second instructions zoned_to_packed before combination (R3+112 to R3+115, and R3+115 to R3+129, respectively). As a result, compiler expression (803) has the two operands 32(14,R13) and 112(18,R3), and each of these two operands is logically a single logical BCD variable.

In a first compiler expression (812), the memory addresses of an operand 368(7,R13) in the first instruction zoned_to_packed are R13+368 to R13+374, and the memory addresses of an operand 374(8,R13) in the second instruction zoned_to_packed are R13+374 to R13+381. Therefore, the operand 368(7,R13) in the first instruction zoned_to_packed and the operand 374(8,R13) in the second instruction zoned_to_packed are combined and converted to an operand 368(14,R13) in combined instruction zoned_to_packed (813). The memory addresses of the operand 368(14,R13) are R13+368 to R13+381, and it covers the memory addresses of the two consecutive first and second instructions zoned_to_packed before combination (R13+368 to R13+374, and R13+374 to R13+381, respectively). Similarly, the memory addresses of an operand 800(4,R2) in the first instruction zoned_to_packed are R2+800 to R2+803, and the memory addresses of an operand 803(15, R2) in the second instruction zoned_to_packed are R2+803 to R2+817. Therefore, the operand 800(4,R2) in the first instruction zoned_to_packed and the operand 803(15,R2) in the second instruction zoned_to_packed are combined and converted to an operand 800(18,R2) in combined instruction zoned_to_packed (813). The memory addresses of the operand 800(18,R2) are R2+800 to R2+817, and it covers the memory addresses of the two consecutive first and second instructions zoned_to_packed before combination (R2+800 to R2+803, and R2+803 to R2+817, respectively). As a result, the compiler expression (813) has the two operands 368(14,R13) and 800(18,R2), and each of these two operands is logically a single logical BCD variable.

A combination example shown in the example (2) shows an example of combining BCD operations of packed_to_zoned, which are two consecutive first (first line) and second (second line) instructions, into one BCD operation packed_to_zoned.

In a first compiler expression (822), the memory addresses of an operand 836(4,R2) in the first instruction packed_to_zoned are R2+836 to R2+839, and the memory addresses of an operand 839(15,R2) in the second instruction packed_to_zoned are R2+839 to R2+853. Therefore, the operand 836(4,R2) in the first instruction packed_to_zoned and the operand 839(15,R2) in the second instruction packed_to_zoned are combined and converted to an operand 836(18,R2) in combined instruction packed_to_zoned (823). The memory addresses of the operand 836(18,R2) are R2+836 to R2+853, and it covers all the memory addresses of the two consecutive first and second instructions packed_to_zoned before combination (R2+836 to R2+839, and R2+839 to R2+853, respectively). Similarly, the memory addresses of an operand 368(3,R13) in the first instruction packed_to_zoned are R13+368 to R13+370, and the memory addresses of an operand 370(8,R13) in the second instruction packed_to_zoned are R13+370 to R13+377. Therefore, the operand 368(3,R13) in the first instruction packed_to_zoned and the operand 370(8,R13) in the second instruction packed_to_zoned are combined and converted to an operand 368(10,R13) in combined instruction zoned_to_packed (823). The memory addresses of the operand 368(10,R13) are R13+368 to R13+377, and it covers the memory addresses of the two consecutive first and second instructions packed_to_zoned before combination (R13+368 to R13+370, and R13+370 to R13+377, respectively). As a result, compiler expression (823) has the two operands 836(18,R2) and 368(10,R13), and each of these two operands is logically a single logical BCD variable.

FIGS. 9A and 9B show examples (1) to (4) of the process of converting a non-BCD operation to a BCD operation in the process of converting an operation in a compiler expression corresponding to a particular pattern to a different operation shown in FIGS. 3A to 3E, and a compiler expression generated by each process.

The example (1) is an example in which a non-BCD operation is a logical sum operation of constant values for a byte-length operand, and the logical sum operation is converted to an operation of, for the packed decimal type and or the zoned decimal type, causing all sign bits to be 1 (see steps 311 to 315 in FIG. 3B). As an example thereof, an example of converting "byte_or" to "packed_set_sign" or "zoned_set_sign" is shown.

A condition for a non-BCD logical sum operation "byte_or" on the second line in a first compiler expression (902) to be converted to "packed_set_sign" (903) or a condition for "byte_or" on the second line in a first compiler expression (912) to be converted to "zoned_set sign" (913) is as follows:

def for use of the byte-length operand uniquely exists, and the def is of the packed decimal type or the zoned decimal type; the address of the use of the operand and the right-end address of the def for the use are the same; and a constant value is a value which causes only all bits of sign parts to be 1.

In the first compiler expression (902), def "376(6,R13)" for use "381(R13)" uniquely exists; the def "376(6,R13)" is of the packed decimal type; the address of the operand "381(R13)" and the byte address of the right end of the operand "376(6,R13)" are the same; and a constant value 0xf is a value which causes all low-order four bits corresponding to a sign part to be 1.

In an original binary code (901), which is a source of generating a first compiler expression (902), "OI" on the second line is a general instruction of "OR IMMEDIATE". The "OI" is an instruction having a problem of accessing a part of bytes. However, "OI" is used to set a BCD sign. The "OI" is converted to an operation "packed_set_sign" (intended to perform setting of a BCD sign, which is the original purpose) on the second line in a compiler expression (903) after conversion of a non-BCD operation to a BCD operation.

The example (2) is an example in which a non-BCD operation is a logical product operation of constant values for a byte-length operand, and the logical product operation is converted to a packed-decimal-type high-order digit truncation operation (see steps 321 to 325 in FIG. 3B). As an example thereof, an example of converting "byte_and" to "packed_truncate" is shown.

A condition for a non-BCD operation of a logical product on the second line in a first compiler expression (922 or 932), "byte_and" to be converted to "packed_truncate" (923 or 933) is as follows:

def for use of the byte-length operand uniquely exists, and the def is of the packed decimal type; the address of the use of the operand is different from the right-end address of the def for the use; and a constant value is a value which causes high-order digits to be zero.

In first compiler expression (922), def "307(13,R13)" for use "311(R13)" uniquely exists; the def "307(13,R13)" is of the packed decimal type; the operand "311(R13)" is not the byte address of the right end of the operand "307(13,R13)"; and a constant value 0xf is a value which causes all high-order four bits to be zero.

The example (3) is an example in which a non-BCD operation is a memory comparison operation, and the memory comparison operation is converted to a packed decimal comparison operation (steps 331 to 340 in FIG. 3C). As an example thereof, an example of converting "memory_cmp" to "packed_cmp" is shown.

A condition for a non-BCD memory comparison operation "memory_cmp" on the fifth line in a first compiler expression (942) to be converted to "packed_cmp" (944) is as follows:

in the UD and/or DU chains in a first operand, (a1) there is use which def dominates, there is not another def for the use in any of paths between the def and the use, and the use exists for the def as only one use; (b1) the right-end address of the use is the same as the right-end address of the def; (c1) the def is of the packed decimal type; and (d1) any one of the following three conditions (i) to (iii) is satisfied: (i) the size of the use (sizeof(use)) is the same as the size of the def (sizeof(def)) (sizeof (use)==sizeof(def)); (ii) sizeof(use)<sizeof(def) is satisfied; and (iii) sizeof(use)>sizeof(def) is satisfied, and zero is put in an area where the use and the def do not overlap; and in the UD and/or DU chains in a second operand, (a2) there is use which def dominates, there is not another def for the use in any of paths between the def and the use, and the use exists for the def as only one use; (b2) the right-end address of the use is the same as the right-end address of the def; (c2) the def is of the packed decimal type; and (d2) any one of the following three conditions (i) to (iii) is satisfied: (i) the size of the use (sizeof(use)) is the same as the size of the def (sizeof(def)) (sizeof(use)==sizeof(def)); (ii) sizeof(use) <sizeof(def) is satisfied; and (iii) sizeof(use)>sizeof (def) is satisfied, and zero is put in an area where the use and the def do not overlap.

In compiler expression (943), a first operand "264(3, R13)" is use, and def for the use is an operand "264(3,R13)" of an operation instruction "packed_set_sign" on the second line. The def and the use satisfy the above requirements (a1), (b1) and (c1). Since "sizeof(use)==sizeof(def)" is satisfied, the requirement (d1) is also satisfied. Similarly, in the compiler expression (943), a second operand "272(3,R13)" is use, and def for the use is an operand "272(3,R13)" of an operation instruction "packed_set_sign" on the fourth line. The def and the use satisfy the above requirements (a2), (b2) and (c2). Since "sizeof(use)==sizeof(def)" is satisfied, the requirement (d2) is also satisfied.

Compiler expressions (942 to 944) shown in the example (3) also show an example of compiler expressions (942 to 943) through which a logical sum operation ("byte_or" in first compiler expression (942)) is converted to an operation of, for the packed decimal type, causing all sign bits to be 1 ("packed_set_sign" in compiler expression (943)) as well as the example of converting "memory_cmp" to the "packed_cmp".

The example (4) is an example in which a non-BCD operation is a memory copy operation, and the memory copy operation is converted to an operation of copying a packed decimal value. As an example thereof, an example of converting "memory_copy" to "packed_copy" is shown.

A condition for a non-BCD memory copy operation "memory_copy" on the second line in a first compiler expression (952) to be converted to "packed_copy" (953) is as follows:

in the UD and/or DU chains in a copy-source operand, (a) there is use which def dominates; there is not another def for the use in any of paths between the def and the use; and the use exists for the def as only one use; (b) the right-end address of the use is the same as the right-end address of the def; (c) the def is of the packed decimal type; and (d) any one of the following three conditions (i) to (iii) is satisfied: (i) the size of the use (sizeof(use)) of the copy-source operand is the same as the size of the def (sizeof(def)) of the copy-source operand (sizeof(use)==sizeof(def)); (ii) the size of the use of the copy-source operand is smaller than the size of the def of the copy-source operand (sizeof (use)<sizeof(def)); and (iii) the size of the use of the copy-source operand is larger than the size of the def of the copy-source operand (sizeof(use)>sizeof(def)), and zero is put in an area where the use of the copy-source operand and the def of the copy-source operand, do not overlap.

The use of the copy-source operand in first compiler expression (952) is "307(R13)" (an abbreviation of "307 (13,R13)") on the second line, and def for the use is an operand "308(12,R13)" of an operation instruction "packed_mul" on the first line. The def and the use satisfy the above requirements (a), (b) and (c). Since "sizeof(use) >sizeof(def)" is satisfied, and zero is put in an area where the use and the def do not overlap (on the assumption of 307(R13)==0), the above requirement (d) is also satisfied.

FIG. 10 shows examples (1) to (4) of a process of analyzing the number of zero digits from the left-end digit of each operand in the process of converting an operation in a compiler expression corresponding to a particular pattern to a different operation shown in FIGS. 3A to 3E, and a compiler expression generated by each process.

The example (1) is an example of, when operation is conversion from the zoned decimal type to the packed decimal type (for example, "zoned_to_packed"), analyzing that "the number of zero bytes from left-end digit=packed decimal operand length-(zoned decimal operand length+2)/ 2" (rounding off is adopted for division; in the case of being larger than 0) (that is, "left_zero_len=packed_len-(zoned_len+2)/2") is satisfied (see steps 361 and 362 in FIG. 3E).

In a first compiler expression (1002), operation is an operand "304(16,R13)" of "zoned_to_packed". Therefore, by putting "packed_len"=16 and "zoned_len"=10 into the expression of "left_zero_len=packed_len-(zoned_len+2)/2", it is analyzed that "left_zero_len"="left_zero_lenof zoned_to_packed"=16-(10+2)/2=10 is satisfied (1003).

The example (2) is an example of, when operation is to perform setting of a sign bit for the packed decimal type (for example, "packed_set_sign", analyzing that "the number of zero bytes from left-end digit=the number of zero bytes from left-end digit of def uniquely determined for use which performs setting of sign bit" (in the case where an analysis result exists) (that is, "left_zero_len= left_zero_len_of_prev_def") is satisfied (see steps 363 and 364 in FIG. 3E).

In a first compiler expression (1012), def is an operand "304(16,R13)" of "zoned_to_packed". Therefore, it is analyzed that "left_zero_len="left_zero_len_of_prev_def"= "left_zero_lenof zoned_to_packed"=16-(10+2)/2=10" is satisfied (1013).

The example (3) is an example of, when operation is conversion from the 4-byte length integer type to the packed decimal type (for example, "int_to_packed"), analyzing that "the number of zero bytes from left-end digit=packed decimal operand length-6" (in the case of being larger than 0) (that is, "left_zero_len=packed_len-6") (from -2147483648 to +2147483647: fittable within 6 bytes) is satisfied (see steps 365 and 366 in FIG. 3E).

In a first compiler expression (1022), operation is an operand "312(8,R13)" of "int_to_packed". Therefore, it is analyzed that "left_zero_len=8-6=2" is satisfied (1023).

The example (4) is an example of, when operation is memory copying from an array of constant zeros in a literal pool (for example, "memory_copy"), analyzing that "the number of zero bytes from left-end digit=the number of bytes of memory copy" (that is, "left_zero_len=copy_length") is satisfied (see steps 367 and 368 in FIG. 3E).

In a first compiler expression (1032) (assuming that 18(R12) is an array of constant zeros in a literal pool), operation is an operand "18(R12)" of "memory_copy". Therefore, it is analyzed that "left_zero_len=8" (that is, copy_length) is satisfied (1033). The operand "18(R12)" in an original binary code (1031) and first compiler expression (1032) has the same meaning as "18(8,R12)". That is, "18(R12)" is expressed with 8, the operand length, being omitted. The reason is that, since the first and second operands of "memory_copy" necessarily have the same length, writing of the length of the second operand can be omitted.

FIGS. 11A to 11C shows conditions (1) to (3) for regarding a def operand and a use operand as the same logical BCD variables in the process of identifying logical BCD variables shown in FIGS. 4A and 4B.

Condition (1) shown in FIG. 11A is to, when there is def which dominates use of an operand, there is not another def for the use in any of paths between the def and the use, and the use exists for the def as only one use, satisfy the following:
  the size of the use operand (sizeof(use)) and the size of the def operand (sizeof(def)) are the same (sizeof (def)=sizeof(use));
  the right-end addresses of the use and def operands are the same (right aligned); and
  the types of the use and def operands are the same BCD type.

In a compiler expression (1101), "7(9,R13)" in "packed_add 7(9,R13),36(10,R13)" on the fifth line is def, which is a UD and/or DU chain analysis result, and "7(9,R13)" in "packed_truncate 7(9,R13),16digits" on the sixth line is use, which is also the analysis result. That is, def=7(9,R13) and use=7(9,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the def operand (sizeof(def)) is the same as the size of the use operand (sizeof(use)) (sizeof(def)=sizeof (use)) (1103). Therefore, "7(9,R13)" in "packed_add 7(9, R13),36(10,R13)" on the fifth line and "7(9,R13))" in "packed_truncate 7(9,R13),16digits" on the sixth line are regarded as the same logical BCD variables. As a result, in a compiler expression (1102), the same temporary variable TMP2 is assigned into each of "packed_add_17" on the sixth line and "packed_truncate_16" on the seventh line.

In compiler expression (1101), "7(9,R13)" in "packed_truncate 7(9,R13),16digits" on the sixth line is def, which is a UD and/or DU chain analysis result, and "7(9, R13)" in "packed_to_zoned 96(16,R3),7(9,R13)" on the seventh line is use, which is also the analysis result. That is, def=7(9,R13) and use=7(9,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the def operand (sizeof(def)) is the same as the size of the use operand (sizeof (def)=sizeof (use)) (1104). Therefore, "7(9,R13)" in "packed_truncate 7(9,R13),16digits" on the sixth line and "7(9,R13)" in "packed_to_zoned 96(16,R3), 7(9,R13)" on the seventh line are regarded as the same logical BCD variables. As a result, in compiler expression (1102), the same temporary variable TMP2 is assigned into each of "packed_truncate_16" on the seventh line and "packed_to_zoned_16" on the eighth line.

Condition (2) shown in FIG. 11B is to, when there is def which dominates use of an operand, there is not another def for the use in any of paths between the def and the use, and the use exists for the def as only one use, satisfy the following:
  the size of the use operand (sizeof(use)) is smaller than the size of the def operand (sizeof(def));
  the right-end addresses of the use and def operands are the same (right aligned);
  the types of the use and def operands are the same BCD type; and
  an instruction for digit adjustment is inserted into a first compiler expression in generation of a second compiler expression.

In a compiler expression (1111), "32(14,R13)" in "zoned_to_packed 32(14,R13),112(18,R2)" on the first line is def, which is a UD and/or DU chain analysis result, and "36(10,R13)" in "packed_add 7(9,R13),36(10,R13)" on the fifth line is use, which is also the analysis result. That is, def=32(14,R13) and use=36(10,R13) are satisfied; the def dominates the use; there is not another def for the use in any of paths between the def and the use; and the use exists for the def as only one use. Furthermore, both of the right-end addresses of the use and def operands are R13+45, being the same (right aligned); the types of the use and def operands are the same BCD type; and the size of the use operand (sizeof(use)) is smaller than the size of the def operand (sizeof(def)) (sizeof(def)>sizeof(use)). Therefore, "32(14, R13)" in "zoned_to_packed 32(14,R13),112(18,R2)" on the first line and "36(10,R13)" in "packed_add 7(9,R13),36(10, R13)" on the fifth line are regarded as the same logical BCD variables. As a result, in second compiler expression (1112), the same temporary variable TMP1 is assigned into each of "zoned_to_packed_27" on the first line and "packed_add_17" on the sixth line. In second compiler expression (1112), "packed_truncate_19 TMP1,19digits", an instruction for digit adjustment, is inserted on fifth line (1113).

In compiler expression (1111), "8(8,R13)" in "int_to_packed R4,8(8,R13)" on the second line is def, which is a UD and/or DU chain analysis result, and "10(6, R13)" in "packed_shift_left 10(6,R13),2" on the fourth line is use, which is also the analysis result. That is, def=8(8, R13) and use=10(6,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the use operand (sizeof(use)) is smaller than the size of the def operand (sizeof(def)) (sizeof(def)>sizeof(use)). Therefore, "8(8, R13)" in "int_to_packed R4,8(8,R13)" on the second line and "10(6,R13)" in "packed_shift_left 10(6,R13),2" on fourth line are regarded as the same logical BCD variables. As a result, in second compiler expression (1112), the same temporary variable TMP2 is assigned into each of "int_to_packed_15" on the second line and "packed_shift_left_11" on the fourth line. In second compiler expression (1112), "packed_truncate_11 TMP2,11digits", an instruction for digit adjustment, is inserted on third line (1114).

Condition (3) shown in FIG. 11C is to, when there is def which dominates use of an operand, there is not another def for the use in any of paths between the def and the use, and the use exists for the def as only one use, satisfy the following:
  the size of the use operand (sizeof(use)) is larger than the size of the def operand (sizeof(def));
  the right-end addresses of the use and def operands are the same (right aligned);
  the types of the use and def operands are the same BCD type; and
  zero is put in an area where the use and def operands do not overlap.

In a compiler expression (1121), "10(6,R13)" in "packed_shift_left 10(6,R13),2" on the fourth line is def, which is a UD and/or DU chain analysis result, and "7(9, R13)" in "packed_add 7(9,R13),36(10,R13)" on the fifth line is use, which is also the analysis result. That is, def=10(6,R13) and use=7(9,R13) are satisfied; the def dominates the use; there is not another def for the use in any of paths between the def and the use; and the use exists for the def as only one use. Furthermore, both of the right-end addresses of the use and def operands are R13+15, being the same (right aligned); the types of the use and def operands are the same BCD type; and the size of the def operand (sizeof(def)) is smaller than the size of the use operand (sizeof(use)) (sizeof(def)<sizeof(use)). It is known from analysis of an operation "int_to_packed" on the second line in compiler expression (1121) that "8(R13)==0" and "9(R13)==0" described above are satisfied. Next, from analysis of an operation "memory_copy" on the third line, it is known that "0(8,R13)==0" is satisfied. Then, from combination of the above two analysis results, it is known that "0(10,R13)==0" is satisfied. Therefore, "10(6,R13)" in "packed_shift_left 10(6,R13),2" on the fourth line and "7(9,R13)" in "packed_add 7(9,R13),36(10,R13)" on the fifth line are regarded as the same logical BCD variables. As a result, in second compiler expression (1122), the same temporary variable TMP2 is assigned into each of "packed_shift_left_11" on the fourth line and "packed_add_17" on the sixth line.

FIG. 11D shows a second compiler expression generated by identifying logical BCD variables and assigning temporary variables to the identified logical BCD variables in the process of identifying logical BCD variables shown in FIGS. 4A and 4B.

A first compiler expression (1132) is what is converted from an original binary code (1131) to a compiler expression. Here, it is assumed that, in original binary code (1131), 336(9,R13) and 376(6,R13) are dead (that is, a written value is not referred to by a subsequent code).

In first compiler expression (1132), "336(9,R13)" on the first line and "336(9,R13)" on the third line are regarded as the same logical BCD variables because they satisfy condition (1) shown in FIG. 11A. Similarly, "336(9,R13)" on the third line and "336(9,R13)" on the fourth line are regarded as the same logical BCD variables because they satisfy condition (1) shown in FIG. 11A.

In first compiler expression (1132), "376(6,R13)" on the second line and "376(6,R13))" on the third line are regarded as the same logical BCD variables.

A second compiler expression (1133) is what is generated by assigning temporary variables to logical BCD variables identified in the first compiler expression (1132).

FIG. 11E shows a second compiler expression generated by identifying logical BCD variables and assigning temporary variables to the identified logical BCD variables in the process of identifying logical BCD variables shown in FIGS. 4A and 4B.

A first compiler expression (1142) is what is converted from an original binary code (1141) to a compiler expression. Here, it is assumed that, in original binary code (1141), "18(R12)" (the same as "18(8,R12)") corresponding to a second operand in an operand "304(8,R13),18(R12)" of an operation instruction "MVC" on the second line is an array of zeros, and 304(16,R13) and 336(9,R13) are dead. In original binary code (1141), an operation instruction SRP on the third line accesses 314(6,R13), which is a truncation result of an operation instruction CVD on the first line, and an operation instruction AP on the fifth line accesses 311(9, R13), which is result of zero extension (filling high-order digits with zeros) of the operation instruction SRP.

Using a result of analyzing the number of zero digits from the left-end digit of each operand ("left_zero_len=2" on the first line and "left_zero_len=8" on the second line), "314(6, R13)" on the third line and "311(9,R13)" on the fifth line in first compiler expression (1142) are regarded as the same logical BCD variables because they satisfy the condition (3) shown in FIG. 11A.

In first compiler expression (1142), "311(9,R13))" on the fifth line and "311(9,R13)" on the sixth line are regarded as the same logical BCD variables because they satisfy the condition (1) shown in FIG. 11A. In first compiler expression (1142), "336(9,R13))" on the fourth line and "336(9, R13)" on the fifth line are regarded as the same logical BCD variables because they satisfy condition (1) shown in FIG. 11A.

A second compiler expression (1143) is what is generated by assigning temporary variables to logical BCD variables identified in the first compiler expression (1142).

Figure 11F:
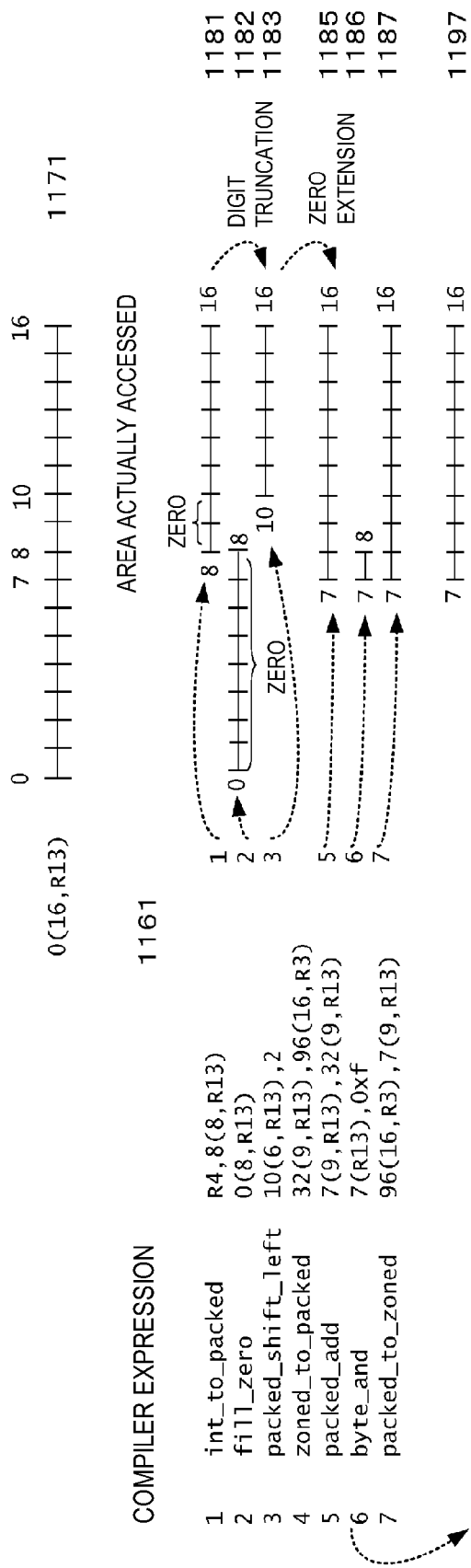
FIG. 11F shows memory areas actually accessed by each operation in a compiler expression, according to an embodiment of the present invention.

FIG. 11F shows memory areas which each instruction in a compiler expression (1161) actually accesses.

An operand 0(16,R13) accesses memory areas R13+0 to R13+15. As for memory areas accessed by Disp(Len,Rn), a start point and an end point are expressed as Rn+Disp and Rn+Disp+Len−1, respectively. Therefore, for example, the operand 0(16,R13) accesses the memory areas R13+0 to R13+15 (R13+0+(16−1)) (1171).

Operations in compiler expression (1161) accesses the following memory areas, respectively:

an operand 8(8,R13) on the first line accesses memory areas R13+8 to R13+15 (1181);
an operand 0(8,R13) on the second line accesses memory areas R13+0 to R13+7 (1182);
an operand 10(6,R13) on the third line accesses memory areas R13+10 to R13+15 (1183);
an operand 7(9,R13) on the fifth line accesses memory areas R13+7 to R13+15 (1185);
an operand 7(R13) on the sixth line accesses the memory area R13+7 (1186); and
an operand 7(9,R13) on the seventh line accesses memory areas R13+7 to R13+15 (1187).

Zero extension is performed in the operation on the third line to the operation on the fifth line.

If a non-BCD operation (byte_and) on the sixth line in compiler expression (1161) is converted to a BCD operation (packed_truncate) (see (2) in FIG. 9A) (1162), the operand 7(9,R13) after the conversion accesses the memory areas R13+7 to R13+15 (1197).

FIG. 12 shows examples of a compiler expression generated by converting the type of packed decimal operations and the type of temporary variables to a DFP type and an optimized machine code obtained by converting the compiler expression, in accordance with the embodiment of the present invention.

A third compiler expression (1203) is what is generated via transition through a first compiler expression (1201) and then a second compiler expression (1202).

In conversion from second compiler expression (1202) to third compiler expression (1203), the type of the packed decimal operations and the type of temporary variables in second compiler expression (1202) are converted to the DFP type. In the conversion to the DFP type, processes shown in (1) and (2) below can be performed.

A DFP type sign-code is regarded as a preferred sign-code among sign-codes held by the BCD type, and the conversion to the DFP type is performed on condition that, even in the case where all sign-codes of logical BCD variables for operations in second compiler expression (1202) are replaced with the preferred sign-codes, the same result is obtained from operations for which all the sign-codes are replaced with the preferred sign-codes.

A BCD instruction has a 4-bit sign-code while a DFP instruction has a 1-bit sign-code. A processor treats "0xc" and "0xd" of a BCD instruction as plus and minus preferred sign-codes, respectively. The processor treats other 4-bit values of a BCD instruction as unpreferred sign-codes. Though being architecture-dependent, a lot of BCD operation instructions generate a result having a preferred sign-code from an operand having a preferred or unpreferred sign-code. Therefore, logical BCD variables used in the operations are replaced with DFP variables. For example, for each of the operands of (3) "packed_shift_left" and (5) "packed_add" in the first compiler expression (1201), an operand having a preferred sign-code or an unpreferred code is used. Each of the operands of (3) "packed_shift_left" and (5) "packed_add" always generates a result having a preferred sign-code. This means that, even if each of the operands of (3) "packed_shift_left" and (5) "packed_add" is converted to the DFP type, sign information is not lost.

(2) A floating point register with a precision higher than the maximum precision of logical BCD variables is assigned; for each BCD operation instruction, it is analyzed whether there is a possibility of occurrence of overflow, on the basis of a result of analysis of UD and/or DU chains; and, on the basis of a result of the analysis, an instruction for digit adjustment is inserted into second compiler expression (1202) if the possibility of occurrence of overflow exists.

A BCD instruction can show the precision of each operand in units of bytes. On the other hand, a DFP-type instruction has only three precision types, that is, single precision (for example 7 digits), double precision (for example, 16 digits) and extended precision (for example, 34 digits). It is necessary to analyze each BCD instruction, assign a sufficient floating point register length for BCD calculation and add an instruction for digit adjustment. Digit adjustment can be executed by shifting a mantissa to the left and right without changing a characteristic.

The analysis about whether overflow will occur can be performed in accordance with the flowchart shown in FIG. 5B. The precision of the result of (3) in first compiler expression (1201) is 11 digits (because the precision of the packed decimal type is calculated by "length×2−1", length 6×2−1=11 digits is obtained), and the maximum length of an operand is also 11 digits. Therefore, if the operand of (3) is shifted to the left by 2 digits, the 11 digits is exceeded, and overflow can occur. Therefore, an instruction for digit adjustment "dfp_truncate VFPR1,11digits" (to truncate the digits of operand in an FPR-type instruction to be 11 digits) is inserted in (3) in third compiler expression (1203). The precision of the operation result of (5) in first compiler expression (1201) is 17 digits (length 9×2−1=17 digits), and the maximum length of an operand is 11 digits of the operation result of (3) and the 16 digits of the operation result of (4) (because the precision of the zoned decimal type is equal to length, length=16 digits is obtained). Therefore, the possibility of overflow does not exist. Therefore, it is not necessary to insert an instruction for digit adjustment for the operation instruction of (5) in first compiler expression (1201), into third compiler expression (1203).

An optimized machine code (1204) is a code obtained by converting a third compiler expression (1203).

FIG. 13 shows a COBOL source code (1301), which is a language having access to a BCD variable, an original binary code (1302) obtained by converting COBOL source code (1301), and an optimized binary code (1303) obtained by converting original binary code (1302). According to an embodiment of the present invention, it is possible to start a process from COBOL source code (1301), convert COBOL source code (1301) to original binary code (1302), and apply the optimization of the present invention to converted original binary code (1302) as shown in FIG. 13. Alternatively, it is also possible to start a process from original binary code (1302) and apply the optimization of the present invention to original binary code (601, 701) as shown in FIG. 6A and FIGS. 7A and 7B. In the latter case, even when the COBOL source code is lost, the binary code itself can be optimized in accordance with the embodiment of the present invention.

In the embodiment of the present invention, the problem that identification of a logical BCD variable is difficult because the logical BCD variable does not correspond to an operand of a BCD instruction is solved by the process shown below.

Figure 3A:
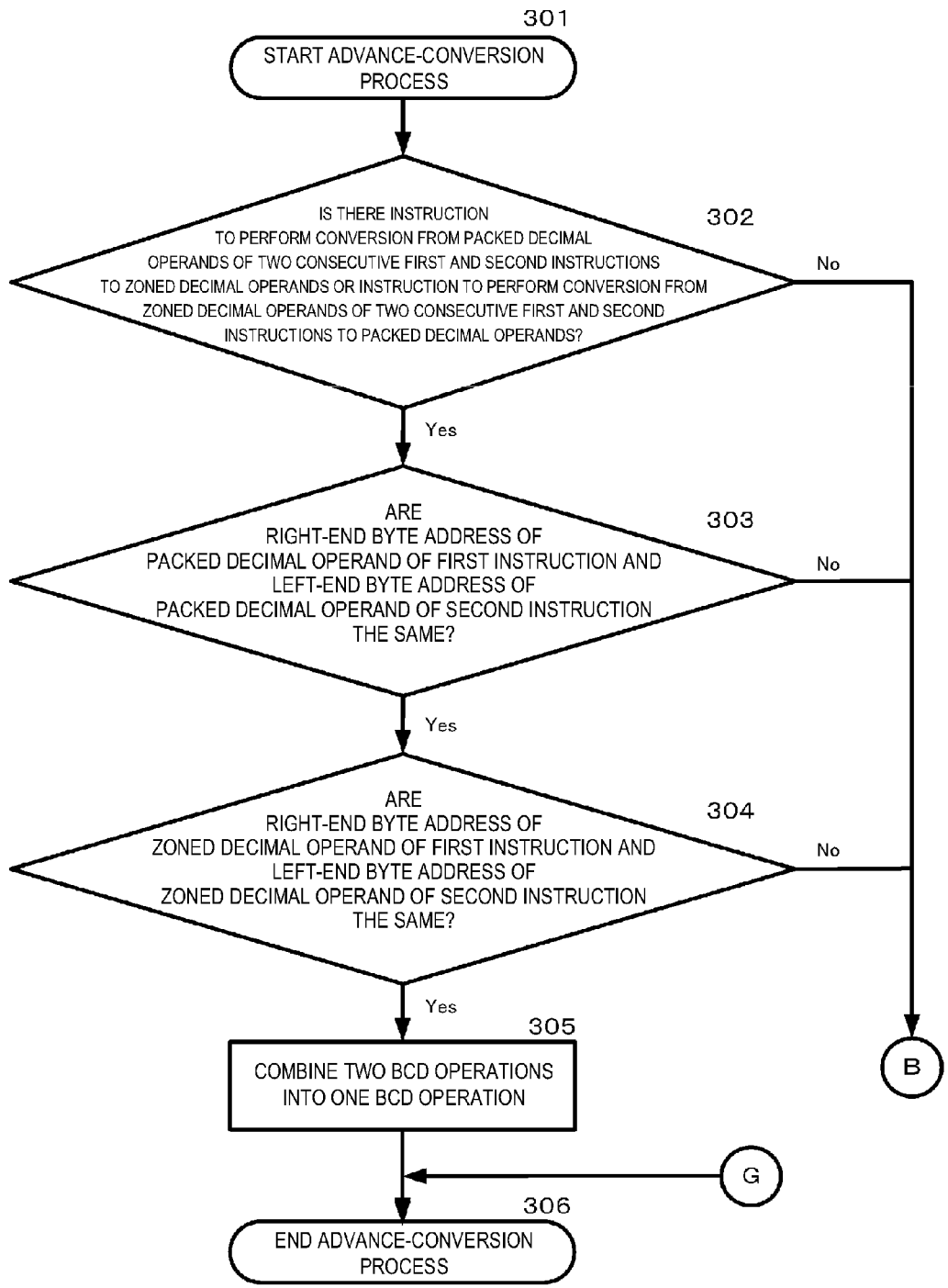
FIG. 3A shows a detailed flowchart of a step of converting an operation in a compiler expression corresponding to a particular pattern to a different operation, among steps of the flowchart shown in FIG. 2, according to an embodiment of the present invention.
Figure 3B:
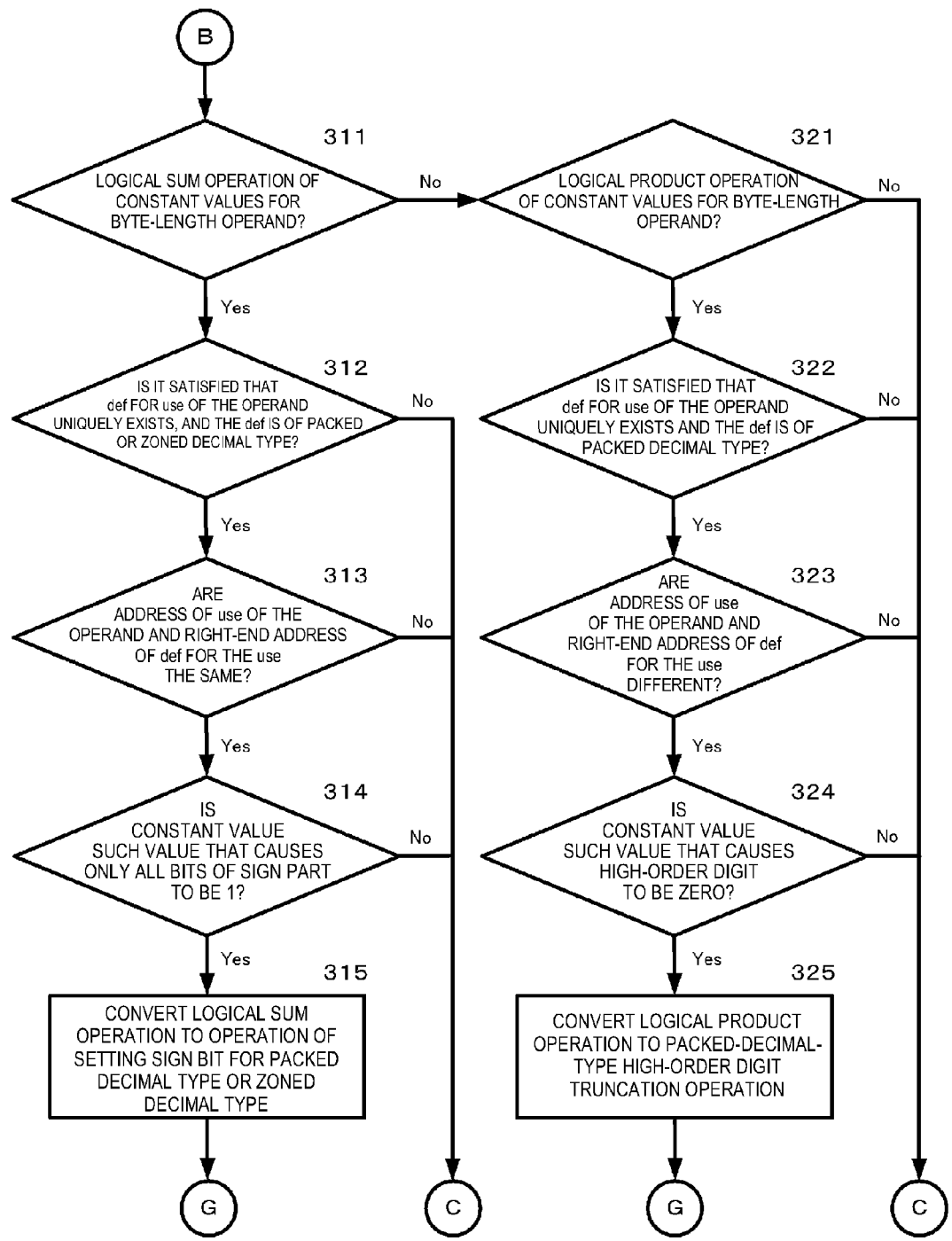
FIG. 3B shows a detailed flowchart of the step of converting an operation in a compiler expression corresponding to a particular pattern to a different operation, among the steps of the flowchart shown in FIG. 2, according to an embodiment of the present invention.
Figure 3C:
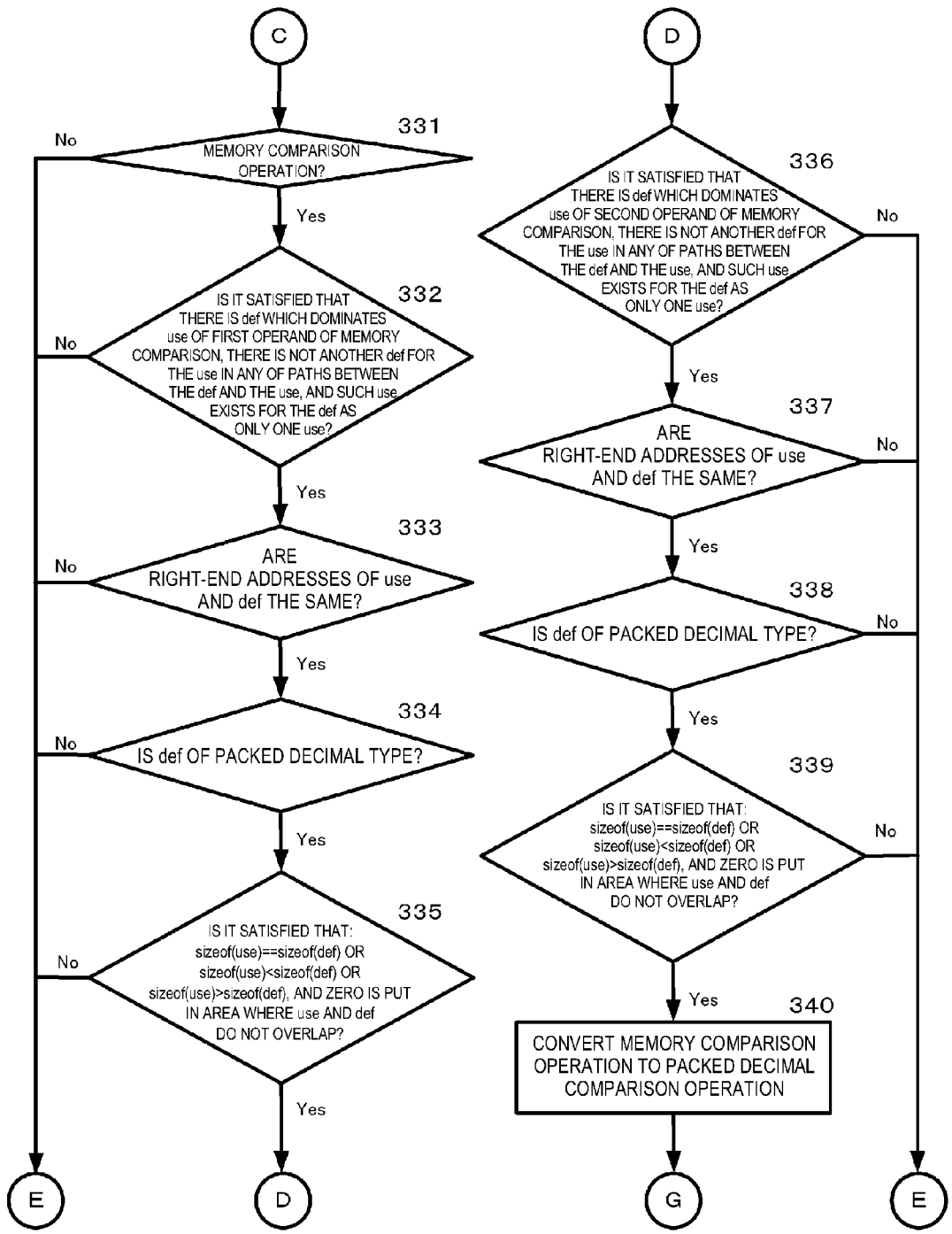
FIG. 3C shows a detailed flowchart of the step of converting an operation in a compiler expression corresponding to a particular pattern to a different operation, among the steps of the flowchart shown in FIG. 2, according to an embodiment of the present invention.
Figure 3D:
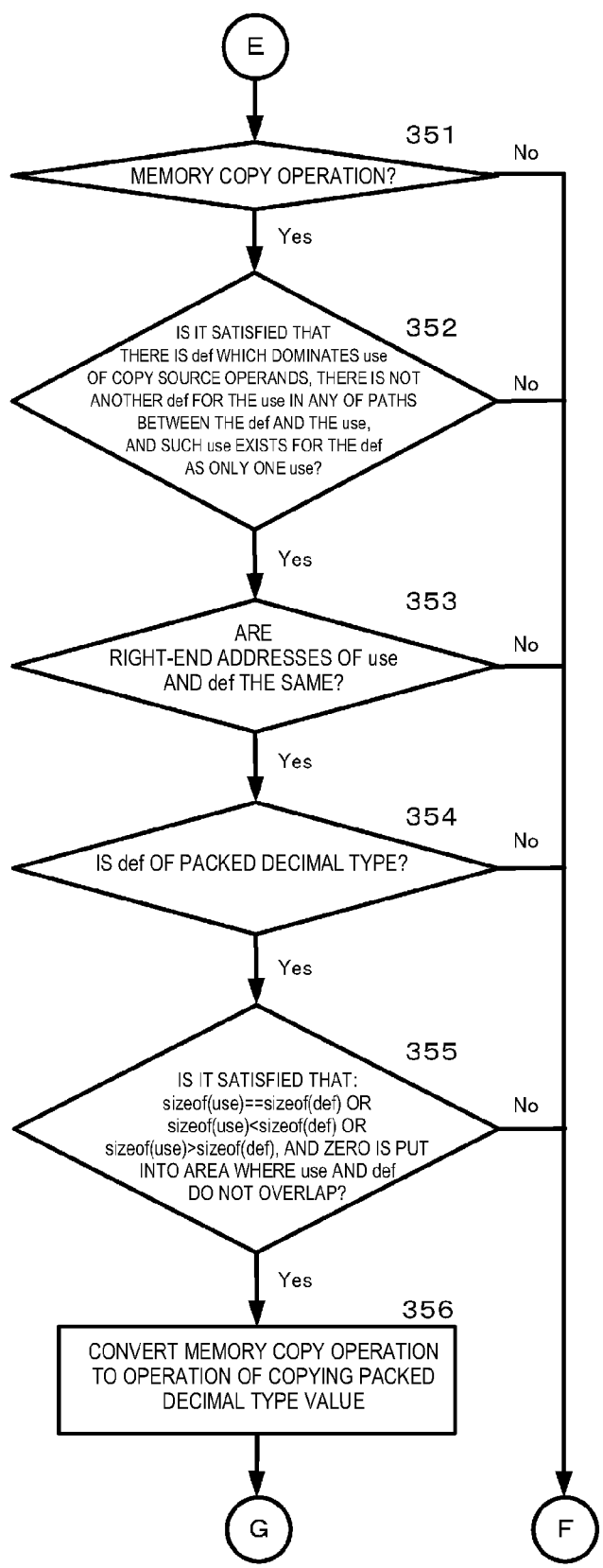
FIG. 3D shows a detailed flowchart of the step of converting an operation in a compiler expression corresponding to a particular pattern to a different operation, among the steps of the flowchart shown in FIG. 2, according to an embodiment of the present invention.
Figure 3E:
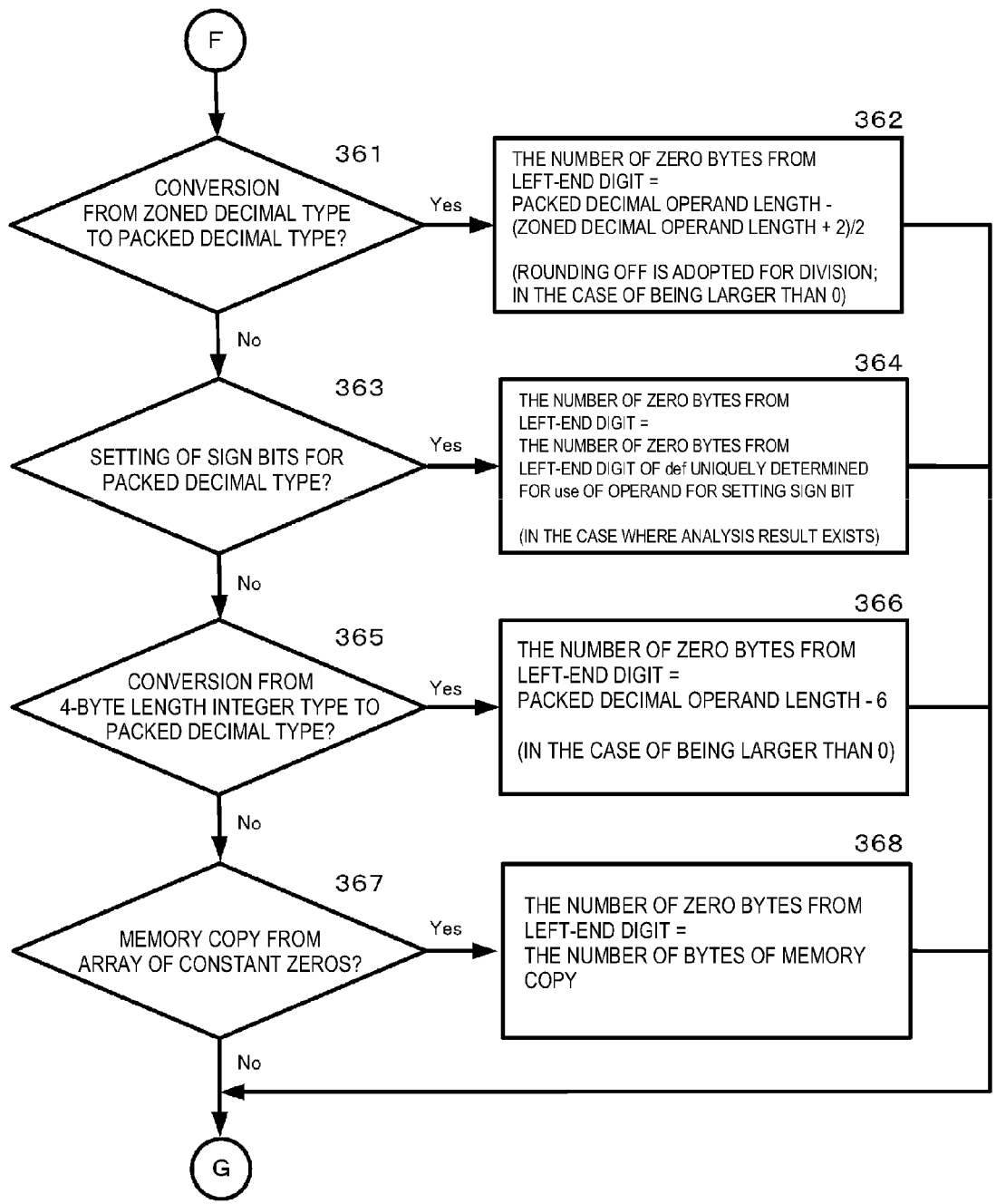
FIG. 3E shows a detailed flowchart of the step of converting an operation in a compiler expression corresponding to a particular pattern to a different operation, among the steps of the flowchart shown in FIG. 2, according to an embodiment of the present invention.

As for the point that an operation instruction in a binary code accesses a part of bytes of a logical BCD variable, the point is solved by combining two BCD operations into one BCD operation as an advance-conversion process (see FIG. 3A and FIG. 8). For example, second compiler expression (813) shown in FIG. 8 has operands 368(14,R13) and 800(18,R2) which a logical BCD variables, and each of these operands is an operand generated by combining two operation instructions shown in first compiler expression (812) so that it becomes a logically single logical BCD variable.

As for the point that a BCD instruction accesses a result of an original instruction with a different precision, the point is solved by analyzing the number of zero digits from the left-end digit of each operand as an advance-conversion process (see FIG. 3E, FIG. 10 and FIG. 11D) and by regarding two operands as the same logical BCD variables (see FIGS. 4A to 4C, FIGS. 11A to 11C, and FIG. 11E). For example, in the example shown in FIG. 11E, "314(6,R13)" on the third line and "311(9,R13)" on the fifth line in first compiler expression (1142) are regarded as the same logical BCD variables because condition (3) shown in FIG. 11A is satisfied.

As for the point that a non-BCD instruction accesses a logical BCD variable, the point is solved by converting non-BCD operations to BCD operations, specifically, converting any instruction (non-BCD operation) that can be used for a BCD operation instruction to a BCD operation in accordance with a purpose originally intended by the instruction. For example, in example (1) shown in FIG. 9A, "OI" on the second line in original binary code (901) is a general instruction of "OR IMMEDIATE". However, in original binary code (901), "OI" is used to set a BCD sign. Therefore, the "OI" can be converted to an operation "packed_set_sign" (intended to set a BCD sign, which is the original purpose) on the second line in compiler expression (903) after a non-BCD operation being converted to a BCD operation and can be used for identification of logical BCD variables.

As for the point that the same memory position is reused for a different purpose, the point is solved by using a result of analysis of UD and/or DU chains and identifying different logical BCD variables for the same memory areas as being different as shown in the process in FIGS. 4A to 4C. For example, in binary code (601) in FIG. 6A, operations AP (307 to 319 on the first line), NI (311 on the second line) and UNPK (311 to 319 on the third line), CVD (312 on the fourth line), MVC (304 to 311 on the fifth line), SRP (314 to 319 on the sixth line) and AP (311 to 319 on the seventh line) access the same memory position, and they are two different logical BCD variables (though both of the operation instruction NI and the operation MVC are non-BCD instructions, they can be said to be different logical BCD variables because they are identified as logical BCD variables in the end). Therefore, as shown in second compiler expression (603), different temporary variable (TMP1 and TMP3) are assigned to different logical BCD variables. In second compiler expression (603), operations related to reuse are the temporary variable TMP1 on the first, second and third lines and the temporary variable TMP3 on the fifth, sixth and seventh lines.

In the embodiment of the present invention, the problem that conversion from the BCD operation type to the DFP operation type is difficult because the BCD operation type and the DFP operation type have very different features is solved by the process shown below.

As for the point that the BCD type has a 4-bit sign-code while the DFP type has a 1-bit sign-code, the point is solved by treating the DFP sign-code as a preferred sign-code (see FIG. 12). As for each of operands of (3) "packed_shift_left" and (5) "packed_add" in first compiler expression (1201) shown in FIG. 12, sign information is not lost even if each of the operands of (3) "packed_shift_left" and (5) "packed_add" is converted to the DFP type.

As for the point that the DFP type has only three types of precisions, the point is solved by determining the precision of a DFP register so that the maximum length of temporary variables in a first compiler expression can be expressed with the maximum digit length of the DFP register.

Figure 14:
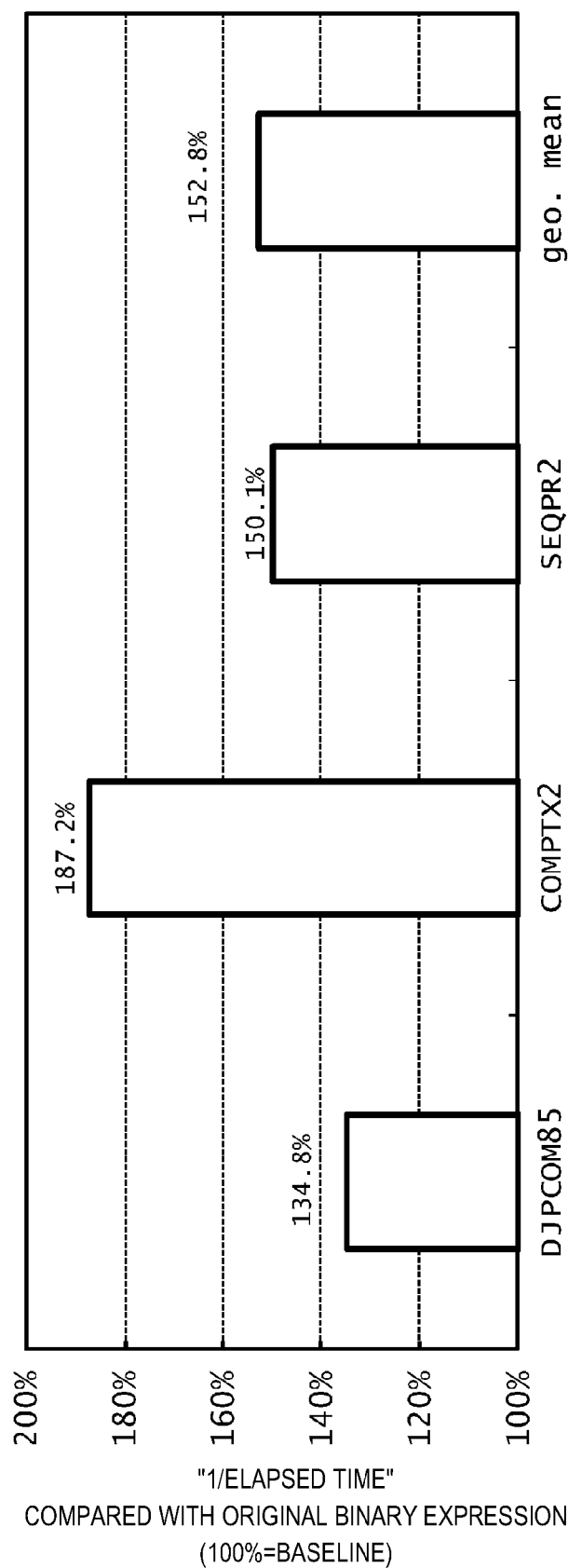
FIG. 14 shows a benchmark result of a machine code optimized, according to an embodiment of the present invention.

FIG. 14 shows a benchmark result of operation processing of a machine code converted from a compiler expression optimized in accordance with the embodiment of the present invention.

Three decimal benchmark tests (DJPCOM85, COMPTX2 and SEQPR2) are used. Regarding a benchmark result of a machine code converted from an original source code as 100%, the performance of the machine code converted from the compiler expression optimized in accordance with the embodiment of the present invention for the compiler expression of an original binary code is compared. In the case of the machine code converted from the compiler expression optimized in accordance with the embodiment of the present invention, the performance is improved up to 87.2% (COMPTX2). In terms of the geometric mean (geo.mean) of the three benchmark tests, the performance is improved by 52.8%.

Figure 15:
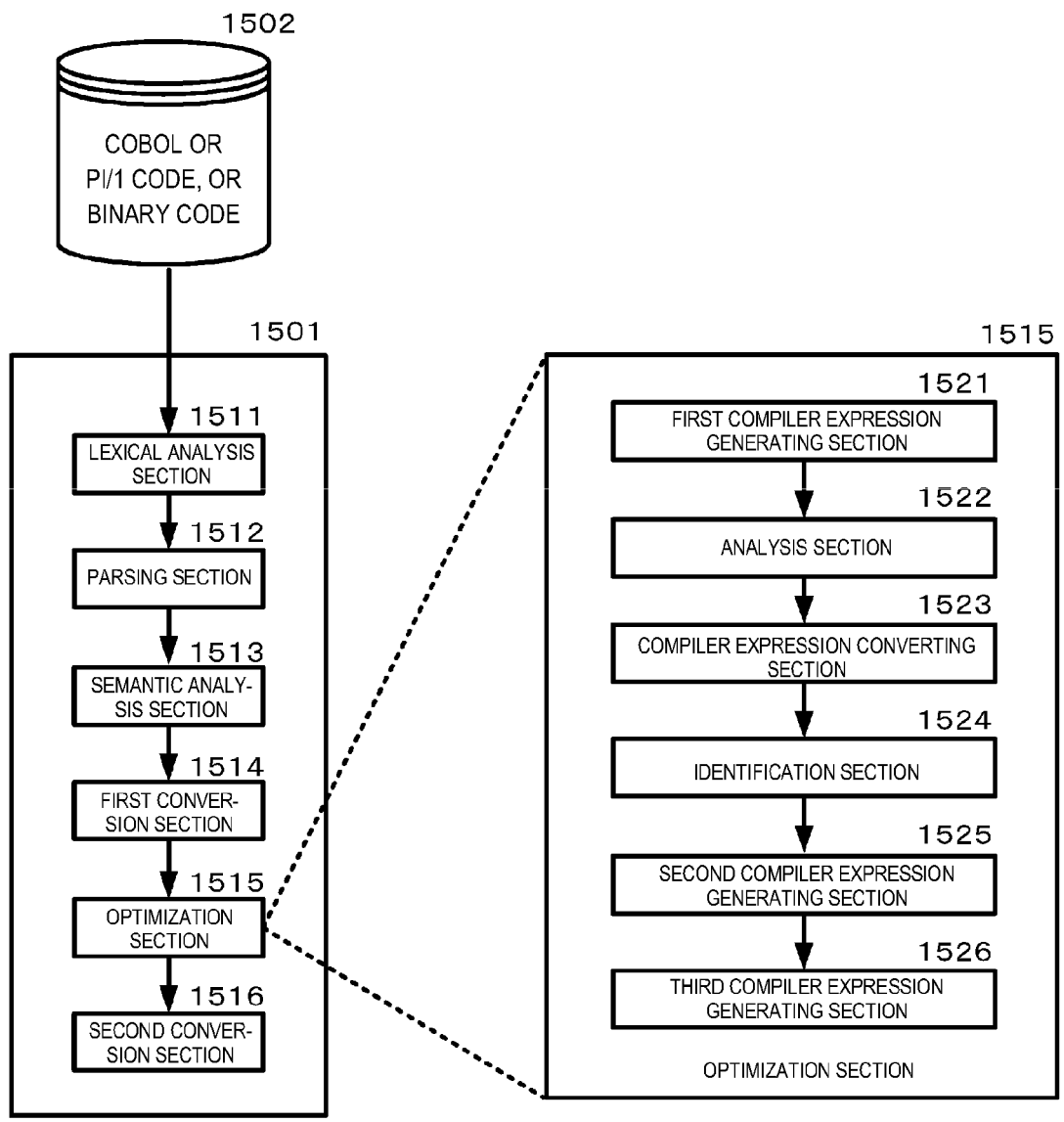
FIG. 15 is a diagram showing an example of a functional block diagram of a computer, according to an embodiment of the present invention, the computer being preferably provided with a hardware configuration in accordance with FIG. 1.

FIG. 15 is a diagram showing an example of a functional block diagram of a computer in accordance with the embodiment of the present invention, the computer being preferably provided with a hardware configuration in accordance with FIG. 1. In the description below, it is assumed that the def dominates the use, that there is not another def for the use in any of paths between the def and the use, and that the use exists for the def as only one use.

A computer (1501) corresponds to computer (101) in FIG. 1. Computer (1501) is provided with the configuration shown for the computer (101) in FIG. 1, for example, CPU (102), main memory (103), and disk (108). Computer (1501) is a binary code optimization apparatus or a compiler apparatus for implementing the optimization technique in accordance with the present invention.

A storage section (1502) stores a source code in a language having access to a BCD variable (for example, a COBOL or PL/I source code) and a binary code in a language having access to a BCD variable (for example, a COBOL or PL/I binary code). Storage section (1502) also stores a binary code and/or machine code optimized in accordance with the optimization technique in accordance with the present invention.

A COBOL source code will be described as an example of the source code in a language having access to a BCD variable. Similarly, a COBOL binary code (an original binary code stated in the invention as claimed in the application concerned) will be described as an example of the binary code in a language having access to a BCD variable.

Storage section (1502) can be an internal storage medium provided in computer (1501) or an external storage medium connected to computer (1501) directly or via a network. Storage section (1502) can be, for example, a hard disk or a solid state disk but is not limited thereto.

Computer (1501) is provided with at least an optimization section (1515) for implementing the optimization technique in accordance with the present invention and can be arbitrarily provided with a lexical analysis section (1511), a parsing section (1512) and a semantic analysis section (1513). In the case where computer (1501) is provided with a compiler (not shown), the compiler can be provided with a first conversion section (1514) for converting a COBOL source code to an original binary code and a second conversion section (1516) for converting an optimized compiler expression to a machine code, in addition to lexical analysis (1511), parsing section (1512), semantic analysis section (1513), and optimization section (1515). If a character string read from storage section (1502) is a COBOL source code, computer (1501) hands the source code to lexical analysis (1511). On the other hand, if the character string read from storage section (1502) is a COBOL binary code, computer (1501) hands the binary code to a first compiler expression generating section (1521) in optimization section (1515).

Lexical analysis (1511) performs lexical analysis of the read-out COBOL source code.

Parsing section (1512) performs parsing of a result of the lexical analysis by lexical analysis section (1511).

Semantic analysis section (1513) performs semantic analysis of a result of the parsing by parsing section (1512).

First conversion section (1514) converts the COBOL source code to an original binary code.

Optimization section (1515) optimizes the original binary code in accordance with the optimization technique in accordance with the present invention. Optimization section (1515) can include optimization techniques other than the optimization technique of the present invention, for example, a source code optimization technique and a binary code optimization technique.

Optimization section (1515) is provided with at least first compiler expression generating section (1521), an analysis section (1522), an identification section (1524), a second compiler expression generating section (1525), and a third compiler expression generating section (1526) and can be arbitrarily provided with a compiler expression converting section (1523). First compiler expression generating section (1521), analysis section (1522), compiler expression converting section (1523), identification section (1524), second compiler expression generating section (1525), and third compiler expression generating section (1526) are implemented by a computer program equipped with a function of giving a start signal or can be realized by dedicated hardware (circuits). Especially in the case where, in the computer program in accordance with the invention as claimed in the application concerned, the subject of each step can be any of first compiler expression generating section (1521), analysis section (1522), compiler expression converting section (1523), identification section (1524), second compiler expression generating section (1525), and third compiler expression generating section (1526), a part or all of each of the sections (1521 to 1526) can be realized by dedicated hardware (circuits), and sections which are not realized by the dedicated hardware (circuits) (at least one of 1521 to 1526) or all the sections (1521 to 1526) can be implemented as program codes.

First compiler expression generating section (1521) generates a first compiler expression from a binary code in a language having access to a BCD variable.

First compiler expression generating section (1521) executes step 203 shown in FIG. 2.

Analysis section (1522) analyzes UD and/or DU chains for the first compiler expression generated by first compiler expression generating section (1521).

Analysis section (1522) executes step 204 shown in FIG. 2.

Compiler expression converting section (1523) converts one or more such instructions that the right-end addresses of use and def operands are not the same, to another instruction or other instructions to which the step of regarding operands as the same logical BCD variables can be applied. Furthermore, compiler expression converting section (1523) converts one or more such instructions that are not of the same BCD-type and that the right-end addresses of the use and def operands are not the same, to another instruction or other instructions to which the process of regarding operands as the same logical BCD variables can be applied.

Compiler expression converting section (1523) especially performs combination of two BCD operations in the first compiler expression into one BCD operation.

Compiler expression converting section (1523) can execute combination of two BCD operations in the first compiler expression into one BCD operation on condition that:

an operation to perform conversion from packed decimal operands of two consecutive first and second instructions to zoned decimal operands is issued, the right-end byte address of the packed decimal operand of the first instruction is the same as the left-end byte address of the packed decimal operand of the second instruction, and the right-end byte address of a zoned decimal operand of the first instruction obtained by converting the packed decimal operand of the first instruction to the zoned decimal type is the same as the left-end byte address of a zoned decimal operand of the second instruction obtained by converting the packed decimal operand of the second instruction to the zoned decimal type. By executing the combination, an operand obtained by combining the packed decimal operand of the first instruction and the packed decimal operand of the second instruction is converted to an operand obtained by combining the zoned decimal operand of the first instruction and the zoned decimal operand of the second instruction.

Compiler expression converting section (1523) can execute combination of two BCD operations in the first compiler expression into one BCD operation on condition that:

an operation to perform conversion from zoned decimal operands of two consecutive first and second instructions to packed decimal operands is issued, the right-end byte address of the zoned decimal operand of the first instruction is the same as the left-end byte address of the zoned decimal operand of the second instruction, and the right-end byte address of a packed decimal operand of the first instruction obtained by converting the zoned decimal operand of the first instruction to the packed decimal type is the same as the left-end byte address of a packed decimal operand of the second instruction obtained by converting the zoned decimal operand of the second instruction to the packed decimal type. By executing the combination, an operand obtained by combining the zoned decimal operand of the first instruction and the zoned decimal operand of the second instruction is converted to an operand obtained by combining the packed decimal operand of the first instruction and the packed decimal operand of the second instruction.

Compiler expression converting section (1523) especially performs conversion of non-BCD operations in the first compiler expression to BCD operations.

Compiler expression converting section (1523) can perform the conversion of non-BCD operations in the first compiler expression to BCD operations when any of the following conditions (1) to (4) is satisfied.

(1) a condition that the non-BCD operation is a logical sum operation of constant values for a byte-length operand;

def for use of the byte-length operand uniquely exists, and the def is a packed decimal operand or a zoned decimal operand;

the address of the use of the byte-length operand (left-end address=right-end address is satisfied because of the byte length) is the same as the right-end address of the def for the use; and a value expressed as a constant in the first compiler expression (that is, a constant operand of a logical sum) is a value which causes only all bits of sign parts to be 1;

(2) a condition that the non-BCD operation is a logical product operation of constant values for a byte-length operand;

def for use of the byte-length operand uniquely exists, and the def is a packed decimal operand;

the address of the use of the byte-length operand (left-end address=right-end address is satisfied because of the byte length) is different from the right-end address of the def for the use; and a value expressed as a constant in the first compiler expression (that is, a constant operand of a logical product) is a value which causes high order digits to be zero;

(3) a condition that the non-BCD operation is a memory comparison operation;

as for use and def in UD and/or DU chains of a first operand for memory comparison in the first compiler expression, there is use which def dominates, there is not another def for the use in any of paths between the def and the use, and the use exists for the def as only one use;

the right-end address of the use of the first operand is the same as the right-end address of the def of the first operand;

the def of the first operand is a packed decimal operand;

the size of the use of the first operand is the same as the size of the def of the first operand, (ii) the size of the use of the first operand is smaller than the size of the def of the first operand, or (iii) the size of the use of the first operand is larger than the size of the def of the first operand, and zero is put in an area where the use of the first operand and the def of the first operand do not overlap;

as for use and def in UD and/or DU chains of a second operand for memory comparison in the first compiler expression, there is use which def dominates, there is not another def for the use in any of paths between the def and the use, and the use exists for the def as only one use;

the right-end address of the use of the second operand is the same as the right-end address of the def of the second operand;

the def of the second operand is a packed decimal operand;

the size of the use of the second operand is the same as the size of the def of the second operand, (ii) the size of the use of the second operand is smaller than the size of the def of the second operand, or (iii) the size of the use of the second operand is larger than the size of the def of the second operand, and zero is put in an area where the use of the second operand and the def of the second operand do not overlap; or (4) a condition that the non-BCD operation is a memory copy operation;

as for use and def in UD and/or DU chains of a memory copy source operand in the first compiler expression, there is use which def dominates, there is not another def for the use in any of paths between the def and the use, and the use exists for the def as only one use;

the right-end address of the use of the memory copy source operand is the same as the right-end address of the def of the memory copy source operand;

the def of the memory copy source operand is a packed decimal operand;

the size of the use of the memory copy source operand is the same as the size of the def of the memory copy source operand, (ii) the size of the use of the memory copy source operand is smaller than the size of the def of the memory copy source operand, or (iii) the size of the use of the memory copy source operand is larger than the size of the def of the memory copy source operand, and zero is put in an area where the use of the memory copy source operand and the def of the memory copy source operand do not overlap.

Compiler expression converting section (1523) can analyze the number of zero digits from the left-end digit of the def of operands in the first compiler expression. A result of the analysis is used by identification section (1524) to judge whether zero is put in an area where the use operand and the def operand do not overlap in UD and/or DU chains of the operands in the first compiler expression. For example, the analysis result is used in conversion of a non-BCD operation in the first compiler expression to a BCD operation, for making a judgment in case (3) where the non-BCD operation is a memory comparison operation and in case (4) where the non-BCD operation is a memory copy operation.

Compiler expression converting section (1523) executes steps 205 and 206 shown in FIG. 2. Compiler expression converting section (1523) also executes each step shown in FIGS. 3A to 3E.

Identification section (1524) identifies logical BCD variables in a first compiler expression on the basis of a result of the analysis of UD and/or DU chains for the first compiler expression by analysis section (1522).

Identification section (1524) can execute a process of regarding a use operand and a def operand as the same logical BCD variables if any one of the conditions (1) to (3) shown below is satisfied.

If there is def which dominates use of an operand, there is not another def for the use in any of paths between the def and the use, and the use exists for the def as only one use, then identification section (1524) can execute a process of regarding the use operand and the def operand as the same logical BCD variables on condition that:

the sizes of the use and def operands are the same;
the right-end addresses of the use and def operands are the same; and
the types of the use and def operands are the same BCD type.

(2) If there is def which dominates use of an operand, there is not another def for the use in any of paths between the def and the use, and the use exists for the def as only one use, then identification section (1524) can execute a process of regarding the use operand and the def operand as the same logical BCD variables on condition that:

the size of the use operand is smaller than the size of the def operand;
the right-end addresses of the use and def operands are the same;
the types of the use and def operands are the same BCD type; and
an instruction for digit adjustment is inserted into the first compiler expression in generation of the second compiler expression.

(3) If there is def which dominates use of an operand, there is not another def for the use in any of paths between the def and the use, and the use exists for the def as only one use, then identification section (1524) can execute a process of regarding the use operand and the def operand as the same logical BCD variables on condition that:

the size of the use operand is larger than the size of the def operand;
the right-end addresses of the use and def operands are the same;
the types of the use and def operands are the same BCD type; and
zero is put in an area where the use and def operands do not overlap.

Identification section (1524) executes steps 207 and 208 shown in FIG. 2. Identification section (1524) also executes each step shown in FIGS. 4A and 4B.

Second compiler expression generating section (1525) assigns temporary variables to logical BCD variables identified by identification section (1524) to generate a second compiler expression.

Second compiler expression generating section (1525) executes steps 209 and 210 shown in FIG. 2. Second compiler expression generating section (1525) also executes each step shown in FIG. 4C.

Third compiler expression generating section (1526) converts the type of at least one of packed decimal operations in the second compiler expression generated by second compiler expression generating section (1525) and the type of at least one of the assigned temporary variables to the DFP type to generate a third compiler expression on condition that sign information and precision information is not lost by the conversion from the BCD operation type to the DFP operation type.

Third compiler expression generating section (1526) regards a DFP type sign-code as a preferred sign-code among sign-codes held by the BCD type, and performs the above conversion on condition that, even in the case of replacing all sign-codes of logical BCD variables for operations in the second compiler expression with the preferred sign-codes, the same result is obtained for the operations for which all the sign-codes are replaced with the preferred sign-codes.

Third compiler expression generating section (1526) assigns a floating point register with a precision higher than the maximum precision of a logical BCD variable; for each BCD operation instruction, analyzes whether there is a possibility of occurrence of overflow, on the basis of a result of the analysis; and inserts an instruction for digit adjustment into the second compiler expression if the possibility of occurrence of overflow exists.

Third compiler expression generating section (1526) executes steps 211 and 212 shown in FIG. 2. Third compiler expression generating section (1526) also executes each step shown in FIGS. 5A and 5B.

Optimization section (1515) can be provided with a second optimization module (not shown) for performing optimization other than the optimization of the embodiment of the present invention, in addition to first optimization modules (1521 to 1526) for performing the optimization of a compiler expression in accordance with the embodiment of the present invention. The second optimization module executes steps 213 and 214 shown in FIG. 2.

Second conversion section (1516) converts a third compiler expression or a compiler expression obtained by further optimizing the third compiler expression by an optimization technique other than the optimization technique in accordance with the embodiment of the present invention, to a machine code.

Second conversion section (1516) executes step 215 shown in FIG. 2.

What is claimed is:

1. A computer implemented method of optimizing a binary code in a language having access to a binary coded decimal (hereinafter referred to as BCD) variable by converting a BCD operation to a decimal floating point (hereinafter referred to as DFP) operation, the method comprising:
generating a first compiler expression of the binary code;
analyzing a use-definition chain and/or a definition-use chain for the first compiler expression;
generating a second compiler expression by identifying logical BCD variables in the first compiler expression based on a result of the analysis;
assigning temporary variables to the identified logical BCD variables, wherein the second compiler expression includes packed decimal operations and the assigned temporary variables; and
converting at least one of the packed decimal operations in the second compiler expression and at least one of the assigned temporary variables to the DFP operation if sign information and precision information are not lost by the conversion from the BCD operation to the DFP operation,
wherein identifying logical BCD variables in the first compiler expression based the result of the analysis includes, in the use-definition and/or definition-use chains of operands in the first compiler expression, regarding an operand of definition (def) and an operand of use (use) as the same logical BCD variables, and
wherein, regarding the operands as the same logical BCD variables, if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use, regarding operands of the use (use) and the definition (def) as the same logical BCD variables if; right-end addresses of the operands of the use (use) and the definition (def) are the same; the operands of the use (use) and the definition (def) are the same BCD type; a size of the operand of use (use) is larger than the size of the operand of definition (def); and zero is put in an area where the operand of use (use) and the operand of definition (def) do not overlap.

2. The method according to claim 1, wherein regarding the operands as the same logical BCD variables further comprises:
if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use,
regarding operands of the use (use) and the definition (def) as the same logical BCD variables if:
right-end addresses of the operands of the use (use) and the definition (def) are the same;
the operands of the use (use) and the definition (def) are the same BCD type; and
sizes of the operands of the use (use) and the definition (def) are the same.

3. The method according to claim 1, wherein regarding the operands as the same logical BCD variables further comprises:
if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use,
regarding operands of the use (use) and the definition (def) as the same logical BCD variables if:
right-end addresses of the operands of the use (use) and the definition (def) are the same;
the operands of the use (use) and the definition (def) are the same BCD type;
a size of the operand of use (use) is smaller than the size of the operand of definition (def); and
an instruction for digit adjustment is inserted into the first compiler expression in generation of the second compiler expression.

4. The method according to claim 1, further comprising:
if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use,
converting at least one instruction that right-end addresses of the operands of the use (use) and the definition (def) are not the same, to another instruction or other instructions to which regarding the operands as the same logical BCD variables is applicable.

5. The method according to claim 1, further comprising combining two BCD operations in the first compiler expression into one BCD operation.

6. The method according to claim 5, wherein combining two BCD operation in the first compiler expression into one BCD operation comprises:
if:
an operation to perform conversion from packed decimal operands of two consecutive first and second instructions to zoned decimal operands is issued,
a right-end byte address of the packed decimal operand of the first instruction is the same as a left-end byte address of the packed decimal operand of the second instruction, and
a right-end byte address of a zoned decimal operand of the first instruction obtained by converting the packed decimal operand of the first instruction to the zoned decimal operand is the same as a left-end byte address of a zoned decimal operand of the second instruction obtained by converting the packed decimal operand of the second instruction to the zoned decimal operand, converting an operand obtained by combining the packed decimal operand of the first instruction and the packed decimal operand of the second instruction to an operand obtained by combining the zoned decimal operand of the first instruction and the zoned decimal operand of the second instruction; or if:

an operation to perform conversion from zoned decimal operands of two consecutive first and second instructions to packed decimal operands is issued, a right-end byte address of the zoned decimal operand of the first instruction is the same as a left-end byte address of the zoned decimal operand of the second instruction, and a right-end byte address of a packed decimal operand of the first instruction obtained by converting the zoned decimal operand of the first instruction to the packed decimal operand is the same as a left-end byte address of a packed decimal operand of the second instruction obtained by converting the zoned decimal operand of the second instruction to the packed decimal operand, converting an operand obtained by combining the zoned decimal operand of the first instruction and the zoned decimal operand of the second instruction to an operand obtained by combining the packed decimal operand of the first instruction and the packed decimal operand of the second instruction.

7. The method according to claim 1, further comprising converting a non-BCD operation in the first compiler expression to the BCD operation.

8. The method according to claim 7, wherein converting the non-BCD operation in the first compiler expression to the BCD operation is performed if any of following conditions is satisfied:

(1) if the non-BCD operation is a logical sum operation of constant values for a byte-length operand;

a definition (def) for a use (use) of the byte-length operand uniquely exists, and the definition (def) is a packed decimal operand or a zoned decimal operand;

an address of the use (use) of the byte-length operand is the same as a right-end address of the definition (def) for the use (use), and a value expressed as a constant in the first compiler expression is a value which causes only all bits of sign parts to be 1;

(2) if the non-BCD operation is a logical product operation of constant values for a byte-length operand;

a definition (def) for use (use) of the byte-length operand uniquely exists, and the definition (def) is a packed decimal operand;

an address of the use (use) of the byte-length operand is different from a right-end address of the definition (def) for the use (use), and a value expressed as a constant in the first compiler expression is a value which causes high order digits to be zero;

(3) if the non-BCD operation is a memory comparison operation;

in the use-definition and/or definition-use chains of a first operand for memory comparison in the first compiler expression, there is a definition (def) dominating a use (use) of the first operand, there is not another definition (def) for the use (use) in any of paths between the definition (def) and the use (use), and the use (use) exists for the definition (def) as only one use;

a right-end address of the use (use) of the first operand is the same as a right-end address of the definition (def) of the first operand;

the definition (def) of the first operand is a packed decimal operand;

a size of the use (use) of the first operand is the same as a size of the definition (def) of the first operand, or the size of the use (use) of the first operand is smaller than the size of the definition (def) of the first operand, or the size of the use (use) of the first operand is larger than the size of the definition (def) of the first operand and zero is put in an area where the use (use) of the first operand and the definition (def) of the first operand do not overlap;

in the use-definition and/or definition-use chains of a second operand for memory comparison in the first compiler expression, there is a definition (def) dominating a use (use) of the second operand, there is not another definition (def) for the use (use) in any of paths between the definition (def) and the use (use), and the use (use) exists for the definition (def) as only one use;

a right-end address of the use (use) of the second operand is the same as a right-end address of the definition (def) of the second operand;

the definition (def) of the second operand is a packed decimal operand; and a size of the use (use) of the second operand is the same as a size of the definition (def) of the second operand, or the size of the use (use) of the second operand is smaller than the size of the definition (def) of the second operand, or the size of the use (use) of the second operand is larger than the size of the definition (def) of the second operand and zero is put in an area where the use (use) of the second operand and the definition (def) of the second operand do not overlap; or (4) if the non-BCD operation is a memory copy operation;

in the use-definition and/or definition-use chains of a memory copy source operand in the first compiler expression, there is a use (use) dominated by a definition (def), there is not another definition (def) for the use (use) in any of paths between the definition (def) and the use (use), and the use (use) exists for the definition (def) as only one use;

a right-end address of the use (use) of the memory copy source operand is the same as a right-end address of the definition (def) of the memory copy source operand;

the definition (def) of the memory copy source is a packed decimal operand; and a size of the use (use) of the memory copy source operand is the same as a size of the definition (def) of the memory copy source operand, or the size of the use (use) of the memory copy source operand is smaller than the size of the definition (def) of the memory copy source operand, or the size of the use (use) of the memory copy source operand is larger than the size of the definition (def) of the memory copy source operand and zero is put in an area where the use (use) of the memory copy source operand and the definition (def) of the memory copy source operand do not overlap.

9. The method according to claim 1, further comprising analyzing a number of zero digits from a left-end digit of a definition (def) of an operand in the first compiler expression.

10. The method according to claim 9, wherein regarding the operands as the same logical BCD variables further comprises:
judging that zero is put in an area where the operand of use (use) and the operand of definition (def) do not overlap, using a result of the analysis of the number of zero digits.

11. The method according to claim 1, wherein converting at least one of the packed decimal operation in the second compiler expression and at least one of the assigned temporary variable to the DFP operation further comprises, regarding a DFP operation sign-code as a preferred sign-code among sign-codes held by the BCD operation, and performing the conversion if, even in the case of replacing all sign-codes of logical BCD variables, for operations in the second compiler expression with the preferred sign-codes, the same result is obtained from operations for which all the sign-codes are replaced with the preferred sign-codes.

12. The method according to claim 1, wherein converting at least one of the packed decimal operation in the second compiler expression and at least one of the assigned temporary variable to a DFP operation further comprises:
assigning a floating point register with a precision higher than the maximum precision of a logical BCD variable and analyzing, for each BCD operation instruction, whether there is a possibility that overflow occurs, on the basis of a result of the analysis; and
if there is a possibility that the overflow occurs, inserting an instruction for digit adjustment into the second compiler expression.

13. A system for optimizing a binary code in a language having access to a binary coded decimal (hereinafter referred to as BCD) variable by converting a BCD operation to a decimal floating point (hereinafter referred to as DFP) operation, the system comprising:
a memory;
a processor communicatively coupled to the memory; and
a module for optimizing a binary code communicatively coupled to the memory and the processor to carry out the steps of the method according to claim 1.

14. A computer program product for optimizing a binary code in a language having access to a binary coded decimal variable by converting a BCD operation to a decimal floating point operation (hereinafter referred to as DFP), the computer program product comprising a non-transitory computer readable storage medium having program instructions embodied therewith, the program instructions readable/executable by a device to perform the method according to claim 1.

15. A computer implemented method for optimizing a compiler expression generated from a binary code in a language having access to a binary coded decimal (hereinafter referred to as BCD) variable and converting the optimized compiler expression to a machine code by converting a BCD operation to a decimal floating point (hereinafter referred to as DFP) operation, the method comprising:
generating a first compiler expression of the binary code;
analyzing a use-definition chain and/or a definition-use chain for the first compiler expression;
generating a second compiler expression by identifying logical BCD variables in the first compiler expression on the basis of a result of the analysis;
assigning temporary variables to the identified logical BCD variables, wherein the second compiler expression includes packed decimal operations and the assigned temporary variables; and
converting at least one of the packed decimal operations in the second compiler expression and at least one of the assigned temporary variables to the DFP operation if sign information and precision information are not lost by the conversion from the BCD operation to the DFP operation;
wherein identifying logical BCD variables in the first compiler expression on the basis of a result of the analysis further includes, in the use-definition and/or definition-use chains of operands in the first compiler expression, regarding an operand of definition (def) and an operand of use (use) as the same logical BCD variables,
wherein, regarding the operands as the same logical BCD variables, if, in the use-definition and/or definition-use chains of the operands in the first compiler expression, there is a use (use) dominated by a definition (def), there is not another definition (def) for the between the definition (def) and the use (use), and the use (use) exists for the definition (def) as only one use, regarding operands of the use (use) and the definition (def) as the same logical BCD variables if: right-end addresses of the operands of the use (use) and the definition (def) are the same; the operands of the use (use) and the definition (def) are the same BCD type; a size of the operand of use (use) is larger than the size of the operand of definition (def); and zero is put in an area where the operand of use (use) and the operand of definition (def) do not overlap; and
converting a third compiler expression generated by the conversion of at least one of the packed decimal operations in the second compiler expression and at least one of the assigned temporary variables to the DFP operation if sign information and precision information are not lost by the conversion from the BCD operation to the DFP operation to a machine code.

16. A system for optimizing a binary code in a language having access to a binary coded decimal (hereinafter referred to as BCD) variable by converting a BCD operation to a decimal floating point (hereinafter referred to as DFP) operation, the system comprising:
a memory;
a processor coupled to the memory;
a module for optimizing a binary code communicatively coupled to the memory and the processor to carry out the steps of:
generating a first compiler expression of the binary code;
analyzing a use-definition chain and/or a definition-use chain for the first compiler expression;
identifying logical BCD variables in the first compiler expression on the basis of a result of the analysis;
generating a second compiler expression by assigning temporary variables to the identified logical BCD variables, wherein the second compiler expression includes packed decimal operations and the assigned temporary variables; and
generating a third compiler expression by converting at least one of the packed decimal operations in the second compiler expression and at least one of the assigned temporary variables to the DFP operation if sign information and precision information are not lost by the conversion from the BCD operation to the DFP operation, wherein identifying logical BCD variables in the first compiler expression on the basis of a result of the analysis further includes: regarding an operand of definition (def) and an operand of use (use) as the same logical BCD variables in the use-definition and/or definition-use chains of operands in the first compiler expression, and wherein, regarding the operands as the same logical BCD variables, if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use, regarding operands of the use (use) and the definition (def) as the same logical BCD variables if: right-end addresses of the operands of the use (use) and the definition (def) are the same; the operands of the use (use) and the definition (def) are the same BCD type; a size of the operand of use (use) is larger than the size of the operand of definition (def); and zero is put in an area where the operand of use (use) and the operand of definition (def) do not overlap.

17. The system according to claim 16, wherein
if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use,
regarding operands of the use (use) and the definition (def) as the same logical BCD variables if:
right-end addresses of the operands of the use (use) and the definition (def) are the same;
the operands of the use (use) and the definition (def) are the same BCD type; and
sizes of the operands of the use (use) and the definition (def) are the same.

18. The system according to claim 16, wherein
if, in the use-definition and/or definition-use chains of the operands in the first compiler expression, there is a use (use) dominated by a definition (def), there is not another definition (def) for the use (use) in any path between the definition (def) and the use (use), and the use (use) exists for the definition (def) as only one use,
regarding operands of the use (use) and the definition (def) as the same logical BCD variables if:
right-end addresses of the operands of the use (use) and the definition (def) are the same;
the operands of the use (use) and the definition (def) are the same BCD type;
a size of the operand of use (use) is smaller than the size of the operand of definition (def); and
an instruction for digit adjustment is inserted into the first compiler expression in generation of the second compiler expression.

* * * * *